(12) United States Patent
Abdullah et al.

(10) Patent No.: US 8,086,744 B2
(45) Date of Patent: Dec. 27, 2011

(54) META-PROTOCOL

(75) Inventors: Ibrahim S. Abdullah, Jeddah (SA); Daniel A. Menasce, Cabin John, MD (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 0 days.

(21) Appl. No.: 12/858,812

(22) Filed: Aug. 18, 2010

(65) Prior Publication Data

US 2010/0332672 A1    Dec. 30, 2010

Related U.S. Application Data

(63) Continuation of application No. 11/122,099, filed on May 5, 2005, now abandoned.

(60) Provisional application No. 60/568,664, filed on May 7, 2004.

(51) Int. Cl.
*G06F 15/16* (2006.01)

(52) U.S. Cl. ....................................... 709/228

(58) Field of Classification Search .................. 709/230, 709/228
See application file for complete search history.

(56) References Cited

U.S. PATENT DOCUMENTS

| | | | | |
|---|---|---|---|---|
| 5,826,017 A * | 10/1998 | Holzmann | ..................... | 709/230 |
| 6,105,068 A * | 8/2000 | Naudus | ........................... | 709/228 |
| 6,108,350 A * | 8/2000 | Araujo et al. | ................. | 370/467 |
| 6,711,740 B1 * | 3/2004 | Moon et al. | .................... | 709/230 |
| 7,131,077 B1 * | 10/2006 | James-Roxby et al. | ....... | 716/103 |
| 7,509,639 B2 * | 3/2009 | Worley, Jr. | .......................... | 718/1 |
| 2002/0042831 A1 * | 4/2002 | Capone et al. | ................. | 709/230 |
| 2002/0159464 A1 * | 10/2002 | Lewis | ........................... | 370/401 |
| 2002/0178103 A1 * | 11/2002 | Dan et al. | ......................... | 705/37 |
| 2003/0158970 A1 * | 8/2003 | Tofts et al. | ..................... | 709/246 |
| 2004/0053694 A1 * | 3/2004 | Rowe | ............................... | 463/42 |

OTHER PUBLICATIONS

Rebekah Lepro, "Cardea: Dynamic Access Control in Distributed Systems," Nov. 2003, NAS Technical Report NAS-03-020.*

* cited by examiner

*Primary Examiner* — Ajay Bhatia

(74) *Attorney, Agent, or Firm* — David Grossman; Edgar Rodriguez

(57) ABSTRACT

A tangible computer readable medium may include a program of instructions which when executed by one or more processors, may implement a method of managing protocols. Instructions may include agreeing upon one or more protocol specifications. Instructions may include identifying one or more components required to implement one or more protocol specifications. Instructions may include communicating among parties one or more components when one or more components is a missing component. Instructions may include communicating among parties one or more protocol specifications. Instructions may include generating one or more executable codes using one or more protocol specifications. Instructions may include generating one or more executable codes using one or more components.

21 Claims, 67 Drawing Sheets

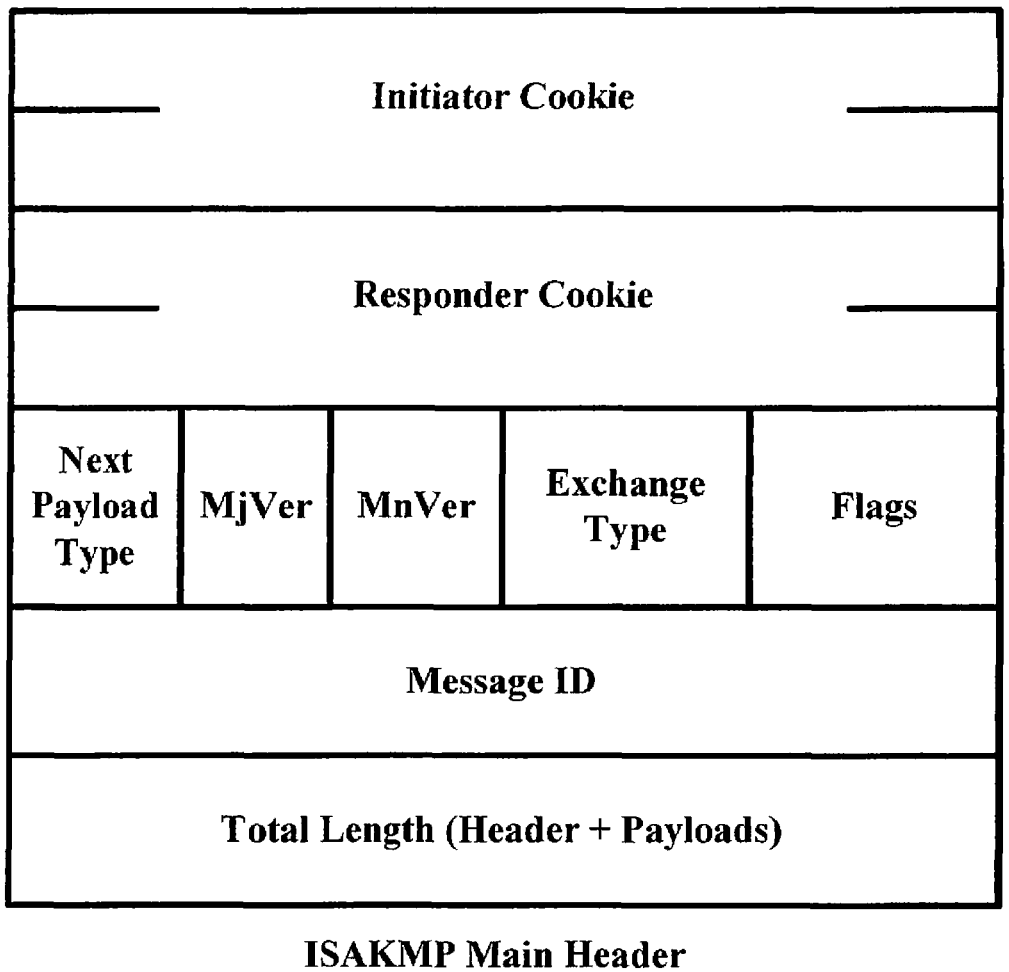
ISAKMP Main Header
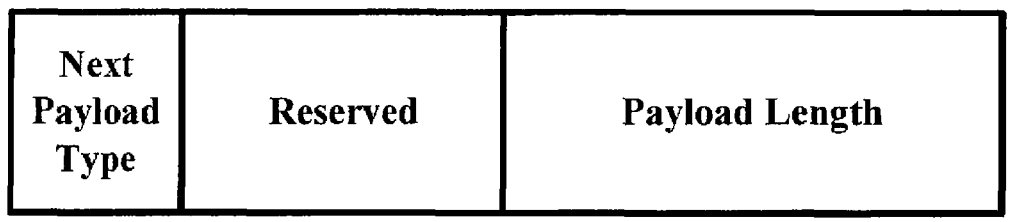
Payload Header
FIG. 6

Bit: 0        8        16        24        31

ISAKMP Header

| Initiator Cookie = MD5 [IP source + IP dist + UDP source port + UDP dist port + local secret] ||||
|---|---|---|---|
| Responder Cookie = null ||||
| Proposal # 1 | MjVer = 1 / MnVer = 5 | Proposal Exchange | Flags |
| Message ID = 100 ||||
| Total Length = 32 + 256 + 512 = 800 bits ||||

Proposal Payload

| Protocol Location | Reserved | Payload Size = 256 ||
|---|---|---|---|
| Proposal # 1 | Proto. ID = 500 | MjVer | MinVer |
| Protocol Name = Protocol X ||||

Location Payload

| Null | Reserved | Payload Size = 512 |
|---|---|---|
| Protocol Location = http://www.xyz.com/dir1 |||

FIG. 8

| User ID | Object ID | Permissions | | | |
|---|---|---|---|---|---|
| | | R | W | E | D |
| Bob | DESEncrypt | 1 | 1 | 1 | 0 |
| Smith | Protocol_X | 0 | 0 | 1 | 0 |
| Alice | Protocol_Spec_Y | 1 | 0 | 1 | 1 |
| * | * | 1 | 0 | 1 | 0 |

FIG. 12

| Object ID | Location | Registered by | Provider | Signature | Expiration |
|---|---|---|---|---|---|
| Protocol_X | C:\PCSObjects | Admin1 | Company A | 0101000101 | 9:00; 10-29-2005 |
| Component | http:\\www.xyz.com\comps | Admin1 | Company B | 0001010010 | Never |

FIG. 14

```
<state> <name>state3</name>
    <arg name="SS"><type>SessionState</type> </arg>
    <arg name="e">
        <type>CompLib.Error_message</type> </arg>
    <action>CompLib.ComposeClientMsg
                (SS.Nb,"ClientConfirm.txt")</action>
    <action>CompLib.Encrypt ("ClientConfirm.txt",
                "ClientConfirm.enc","myPubl") </action>
    <action>CompLib.SendMsg(2)</action>
    <moveto> <expression>e.code</expression>
            <case test="1">Successful_end</case>
            <case test="2">ErrorState(e)</case>
    </moveto>
</state>
```

FIG. 22

```
<object><name>SessionState</name>
    <field type="string">id</field>
    <field type="int">Na</field>
    <field type="int">Nb</field>
    <field type="key">PrivateKey</field>
    <field type="key">PublicKey</field>
</object>
```

FIG. 24

```
<instance><name>error</name>
    <type>CompLib.Error_message</type>
    <initial-values>(0,0,null)</initial-values>
</instance>
```

FIG. 25

```
<action>CompLib.checkRcvSynAck(tcb, p, e)</action>
<action>
            <moveto> <expression> e.code</expression>
                <case test="1">
                    <action> errorState(tcb, e) </action>
                    <action> return </action>
                </case>
            </moveto>
</action>
```

FIG. 26

```
<moveto>  <expression>e.code</expression>
          <case test="1">SuccessfulEnd </case>
          <case test="2">ErrorState(e)</case>
</moveto>
```

FIG. 27

```
<action><instance>
            <name>R</name>
            <type> CompLib.IntObject </type>
            <initial-values> (0) </initial-values>
        </instance></action>
<action>    CompLib.GeneratIntRandomNumber(R)</action>
```

FIG. 28

| Data Type | Java (Bits) | C (Bits) | C++ (Bits) | IDL (Bits) |
|---|---|---|---|---|
| Byte | 8 | 8 | 8 | N/A |
| Short Int | 16 | 16 | 16 | 16 |
| Unsigned Short Int | N/A | 16 | N/A | 16 |
| Unsigned Int | N/A | 32 | N/A | N/A |
| Int | 32 | 32 | 32 | N/A |
| Long Int | 64 | 32 | 64 | 32 |
| Float | 32 | 32 | 32 | 32 |
| Double | 64 | 64 | 64 | 64 |
| Long Double | N/A | 96 | 128 | N/A |
| Char | 16 | 8 | 8 | 8 |
| String | Variable | Variable | Variable | Variable |
| Boolean | 1 | 1 | 1 | Unspecified |

FIG. 31a

| Primitive Data Types | Size (Bits) |
|---|---|
| Byte | 8 |
| Int | 32 |
| Long | 64 |
| Char | 16 |
| String | Variable |
| Boolean | 1 |

FIG. 31b

```xml
<?xml version="1.0"?>
<xsd:schema xmlns:xsd=
    "http://www.w3.org/2001/XMLSchema">
<xsd:element name="protocol"> <xsd:complexType>
    <xsd:sequence>
        <xsd:element name="name" type="xsd:string"/>
        <xsd:element ref="object" minOccurs="0"
            maxOccurs="unbounded"/>
        <xsd:element ref="instance" minOccurs="0"
            maxOccurs="unbounded"/>
        <xsd:element ref="action" minOccurs="0"
            maxOccurs="unbounded"/>
        <xsd:element ref="first-state" minOccurs="1"
            maxOccurs="1" />
        <xsd:element ref="state" minOccurs="1"
            maxOccurs="unbounded"/>
    </xsd:sequence>
</xsd:complexType> </xsd:element>
```

FIG. 35

```
<xsd:element name="object">
    <xsd:complexType> <xsd:sequence>
        <xsd:element name="name" type="xsd:string"/>
        <xsd:element ref="field" maxOccurs="unbounded"/>
    </xsd:sequence> </xsd:complexType>
</xsd:element>
<xsd:element name="field">
    <xsd:complexType><xsd:simpleContent>
    <xsd:extension base="xsd:string">
        <xsd:attribute name="type" use="required"/>
    </xsd:extension>
    </xsd:simpleContent></xsd:complexType>
</xsd:element>
```

FIG. 36

```
<?xml version="1.0" encoding="UTF-8"?>
<?xml-stylesheet type="text/xsl" ?>
<xsl:stylesheet version="1.0"
xmlns:xsl="http://www.w3.org/1999/XSL/Transform">
<xsl:output method="html" indent="yes"/>
<xsl:template match="/protocol">
    <xsl:apply-templates select="/protocol/name"/>
    public static void main(String[] args)
    <xsl:apply-templates select="action" />
    <xsl:apply-templates select="first-state"/> }
    <xsl:apply-templates select="object" />
    <xsl:apply-templates select="state"/>
    private void vpGen() throws Exception {}
</xsl:template>
```

FIG. 38

```
<xsl:template match="first-state">
    <xsl:value-of select="."/> :
</xsl:template>
```

FIG. 39

```
<xsl:template match="object" >
    public static class
    <xsl:value-of select="name"/> {
    <xsl:apply-templates select="field"/>
    public <xsl:value-of select="name"/>
    ( <xsl:apply-templates select="field"
    mode="argdef"/>){
    <xsl:apply-templates select="field"
    mode="construct"> }}
</xsl:template>
```

FIG. 40

```
<xsl:template match="instance" >
    <xsl:value-of select="type"/>
    <xsl:text>   </xsl:text>
    <xsl:apply-templates select="name"/> = new
    <xsl:value-of select="type"/>
    <xsl:apply-templates select="initial-values"/>;
</xsl:template>
```

FIG. 41

```
<xsl:template match="action">
        <xsl:choose><xsl:when test="instance">
            <xsl:apply-templates select="instance" />
        </xsl:when><xsl:when test="moveto">
            <xsl:apply-templates select="moveto"/>
        </xsl:when><xsl:when test="object" >
            <xsl:apply-templates select="object" />
        </xsl:when>      <xsl:otherwise>
            <xsl:value-of select="."/>;
        </xsl:otherwise>
        </xsl:choose>
</xsl:template>
```

FIG. 42

```
<xsl:template match="moveto">
    switch (<xsl:value-of select="expression"/>) {
        <xsl:apply-templates select="case"/>     }
</xsl:template>
```

FIG. 43

```
<xsl:template match="state">
        static void <xsl:value-of select="name"/>
        (<xsl:apply-templates select="arg"/> ) throws Exception {
        <xsl:apply-templates select="instance" />
        <xsl:apply-templates select="action" />
        <xsl:apply-templates select="moveto"/> }
</xsl:template>
```

FIG. 44

```
public static class SessionState {
    public   String id ;
    public   String Na ;
    public   String Nb ;
    public   String ClientPrivKey ;
    public   String ServerPublKey ;
public SessionState
( String id , String Na , String Nb , String ClientPrivKey , String ServerPublKey )
    {  this. id = id ;
       this. Na = Na ;
       this. Nb = Nb ;
       this. ClientPrivKey = ClientPrivKey ;
       this. ServerPublKey = ServerPublKey ; }}
```

FIG. 45

| Client Events | | | Server Events | | |
|---|---|---|---|---|---|
| Branch | From | To | Branch | From | To |
| 1 | CLOSED | SYNSENT | 2 | CLOSED | LISTEN |
| | | | 3 | LISTEN | SYNRCVD |
| 3 | SYNSENT | ESTAB | | | |
| | | | 2 | SYNRCVD | ESTAB |

FIG. 47a

| | Client Syn | Server SynAck | Client Ack |
|---|---|---|---|
| SeqNumber | 3000 | 5000 | 3002 |
| AckNumber | 0 | 3001 | 5001 |
| ACK | 0 | 1 | 1 |
| SYN | 1 | 1 | 0 |
| FIN | 0 | 0 | 0 |
| RST | 0 | 0 | 0 |

FIG. 47b

| Client Events | | | Server Events | | |
|---|---|---|---|---|---|
| Branch | From | To | Branch | From | To |
| 1 | CLOSED | SYNSENT | 2 | CLOSED | LISTEN |
| | | | 3 | LISTEN | SYNRCVD |
| Change is introduced manually as an error in the SynAck message | | | | | |
| 3 | SYNSENT | Error State | | | |

FIG. 47c

| | Client Syn | Server SynAck |
|---|---|---|
| SeqNumber | 3000 | 5000 |
| AckNumber | 0 | 3001 |
| ACK | 0 | 1 |
| SYN | 1 | 1 |
| FIN | 0 | 0 |
| RST | 0 | 0 |

FIG. 47d

```xml
<state>
    <name> closedState </name>
    <arg name="tcb"> <type>CompLib.TCB</type> </arg>
    <arg name="e"> <type>CompLib.Error message</type> </arg>
    <!-- The following Java code has been inserted as a temporary action for manual synchronization ******** -->
    <action>
        System.out.println("State: ClosedState ");
        String s="Enter 1 for active open, 2 for passive open: ";
        CompLib.IntObject y= new CompLib.IntObject(0);
        CompLib.WaitForInput(s, y);
    </action>
    <moveto> <expression> y.N </expression> </moveto>
    <case test="1">
        <instance> <name>p</name>
            <type>CompLib.TCPDatagram </type>
            <initial values>(0,0,0,0,0,0,0, "", "")</initial values>
        </instance>
        <action>p.SourcePort=tcb.SourcePort</action>
        <action>p.DistPort=tcb.DistPort</action>
        <action>p.Window=tcb.Window</action>
        <action>p.SeqNumber=tcb.SeqNumber</action>
        <action>p.AckNumber=0</action>
        <action>p.SYN=1</action>
        <action>p.ACK=0</action>
        <action>CompLib.sendDatagram("SYN.txt", p)</action>
        <action>CompLib.SendMsg(1)</action>
        <action>synsentState(tcb, e)</action>
        <action> break</action>
    </case>
    <case test="2">
        <action> listenState(tcb, e) </action>
        <action> break </action>
    </case></moveto>
</state>
```

FIG. 48

```
static void closedState (CompLib.TCB tcb, CompLib.Error message e ) throws Exception {
System.out.println("State: ClosedState ");
String s="Enter 1 for active open, 2 for passive open: ";
CompLib.IntObject y= new CompLib.IntObject(0);
CompLib.WaitForInput(s, y) ;
switch ( y.N ) {
      case  1 :  {
CompLib.TCPDatagram p = new  CompLib.TCPDatagram (0,0,0,0,0,0,0,0, " ", " ");
   p.SourcePort=tcb.SourcePort;
   p.DistPort=tcb.DistPort;
   p.Window=tcb.Window;
   p.SeqNumber=tcb.SeqNumber;
   p.AckNumber=0;
   p.SYN=1;
   p.ACK=0;
   CompLib.sendDatagram("SYN.txt", p);
   CompLib.SendMsg(1);
synsentState(tcb, e);
   break;   }
         case   2 :   {
listenState(tcb, e) ;
   break ;   }
     }
}
```

FIG. 49

| State | Description | Component Names |
|---|---|---|
| State 1 | The initiator sends a proposal to the responder. The proposal includes three parts: ISAKMP main header, a proposal payload, and a nonce payload. | HashingStringMD5 BXcomposeMainHeader CompLib.BXcomposeProposals GeneratIntRandomNumber BXcomposePayload, ReadFileToBytes, SendUDP |
| State 2 | The initiator receives a message from the responder containing the responder selection. The received message includes three parts: main header, selection payload, and a nonce payload. | ListenForUDP, BXSaveMHeader BXExtractMHeader BXCompareTwoStrings ClearBytesArray, CreateNewFile, BXExtractPayload BXcomposePayload |
| State 3 | The initiator sends a message of four parts: a main header, an id, key information, and an authentication payload. The authentication payload is a hash value of all previously exchanged messages. | BXcomposeMainHeader BXcomposePayload CreateNewFile AppendFileToFile HashingFileMD5 ReadFileToBytes SendUDP |
| State 4 | The initiator receives from the responder the authentication message. The initiator verifies the received hash value against his calculated value. If values do not match, the communication is aborted and the user is notified. | ListenForUDP, CreateNewFile BXExtractMHeader BXSaveMHeader BXExtractPayload AppendFileToFile HashingFileMD5 BXCompareTwoStrings |
| ErrorState | This state prints an error message and aborts the communication. | return |

FIG. 50

```
public static class ISAKMPFSM {
        public int SourcePort, DistPort;
        public String SourceIP, DistIP, Secret;
        public String SourceCookie, DistCookie;
        public String certPublic, certPrivate;
        public int Mjrver, Minver, Flags, MessageID, Totallength;
        public String InitNonce, RespNonce;
      public String ProtName, ProtLocation;
      public int SelectedProtID, ProtMjrver, ProtMinver;
}
```

FIG. 51

```
public static void BXcomposeMainHeader(ISAKMPFSM fsm,
         int NPayloadType, int ExchangeType,
      String fname)  throws Exception {
System.out.println("Composing ISAKMP main header " );
String filler="                         ";
String x= fsm.SourceCookie + filler;byte[] BSourceCookie=new byte[32];
   BSourceCookie=x.getBytes(); x=""+fsm.DistCookie+filler;
   byte[] BDistCookie=new byte[32]; BDistCookie=x.getBytes();
   x=""+ NPayloadType+filler;      byte[] BNPayloadType=new byte[8];
   BNPayloadType=x.getBytes();     x=""+fsm.Mjrver+filler;
   byte[] BMjrver=new byte[4];    BMjrver=x.getBytes();
   x=""+fsm.Minver+filler;         byte[] BMinver=new byte[4];
   BMinver=x.getBytes();           x=""+ ExchangeType+filler;
   byte[] BExchangeType=new byte[8];BExchangeType=x.getBytes();
   x=""+ fsm.Flags +filler;        byte[] BFlags=new byte[8];
   BFlags=x.getBytes();            x=""+ fsm.MessageID +filler;
   byte[] BMessageID=new byte[32]; BMessageID=x.getBytes();
   x=""+ fsm.Totallength +filler;  byte[] BTotallength=new byte[32];
           BTotallength=x.getBytes();
FileOutputStream fos = new FileOutputStream(fname);
for {int count=0; count <32; count++){fos.write(BSourceCookie[count]);}
for (int count=0; count <32; count++){fos.write(BDistCookie[count]);}
for (int count=0; count <8; count++) {fos.write(BNPayloadType[count]);}
for (int count=0; count <4; count++) {fos.write(BMjrver[count]);}
for (int count=0; count <4; count++) {fos.write(BMinver[count]); }
for (int count=0; count <8; count++) {fos.write(BExchangeType[count]);}
for (int count=0; count <8; count++) {fos.write(BFlags[count]); }
for (int count=0; count <32; count++) {fos.write(BMessageID[count]); }
for (int count=0; count <32; count++) {fos.write(BTotallength[count]);}
fos.close(); System.out.println("File: "+fname+ " has been written" ); }
```

FIG. 52

```
public static void SendUDP(BytesObject b, int len, String DistIP,
    int DistPort) throws Exception {
    InetAddress serverAddress = InetAddress.getByName(DistIP);
        byte[] bytesToSend = b.N;
        int servPort = DistPort;
        DatagramSocket socket = new DatagramSocket();
    DatagramPacket       sendPacket       =       new
DatagramPacket(bytesToSend,
        bytesToSend.length, serverAddress, servPort);
        socket.send(sendPacket);
        System.out.println("UDP packet sent.");
        socket.close();     }
```

FIG. 53

C, S: Client and Server, Ks: Server Public key, Sk: Set of shared keys
CS: {ClientHello}
SC: {ServerHello, Certificate, ServerHelloDone}
CS: {ClientKeyExchange}Ks
CS: {ChangeCipherSpec}
CS: {Finish}Sk
SC:{ChangeCipherSpec}
SC:{Finish}Sk

FIG. 54

```xml
<object>
    <name>SessionState</name>
    <field type="byte"> VersionMajor</field>
    <field type="byte"> VersionMinor</field>
    <field type="String"> id</field>
    <field type="int"> CurrentState</field>
    <field type="String"> ClientPrivKeyFname</field>
    <field type="String"> ServerCertFname</field>
    <field type="long"> ClientRandom</field>
    <field type="long"> ServerRandom</field>
    <field type="byte[]"> PreMasterSecret</field>
    <field type="byte[]"> MasterSecret</field>
    <field type="int"> SessionID</field>
    <field type="String"> CipherSuite</field>
    <field type="String"> CompressionMethod</field>
    <field type="byte[]"> client_write_MAC_secret</field>
    <field type="byte[]"> server_write_MAC_secret</field>
    <field type="byte[]"> client_write_key</field>
    <field type="byte[]"> server_write_key</field>
    <field type="byte[]"> client_write_IV</field>
    <field type="byte[]"> server_write_IV</field>
</object>
```

FIG. 56

```
<state>
  <name> State1 </name>
  <arg name="SS"> <type>SessionState</type> </arg>
  <arg name="e"> <type>CompLib.Error message</type> </arg>
  <action>    byte v1=SS.VersionMajor </action>
  <action>    byte v2=SS.VersionMinor</action>
  <action>    String cs= SS.CipherSuite </action>
  <action>
    <instance> <name>chp</name>
      <type> CompLib.SSLClientHello </type>
      <initial values>(v1,v2,0,100, cs, "null")</initial values>
    </instance>
  </action>
  <action>
    <instance> <name>R</name>
      <type> CompLib.IntObject </type>
      <initial values> (0) </initial values>
    </instance>
  </action>
  <action> CompLib.GeneratIntRandomNumber(R)</action>
  <action> SS.ClientRandom=R.N</action>
  <action> chp.Random=R.N</action>
  <action>CompLib.SSLComposeClientHello(chp, "SSLClientHello.txt")</action>
  <action>    CompLib.SendMsg(1)</action>
  <action>    State2(SS, e)</action>
</state>
```

FIG. 57

```
<state>
  <name> State1 </name>
  <arg name="SS"> <type>SessionState</type> </arg>
  <arg name="e"> <type>CompLib.Error message</type> </arg>
  <action>    byte v1=SS.VersionMajor </action>
  <action>    byte v2=SS.VersionMinor</action>
  <action>    String cs= SS.CipherSuite </action>
  <action>
     <instance> <name>chp</name>
        <type> CompLib.SSLClientHello </type>
        <initial values>(v1,v2,0,100, cs, "null")</initial values>
     </instance>
  </action>
  <action>CompLib.SSLReadClientHello(chp,  "SSLClientHello.txt")</action>
  <action>SS.ClientRandom=chp.Random </action>
  <action>SS.CipherSuite=chp.CipherSuites</action>
  <action>    State2(SS, e)</action>
</state>
```

FIG. 58

```
static void State1
(SessionState SS , CompLib.Error message e ) throws Exception {
    byte v1=SS.VersionMajor ;
    byte v2=SS.VersionMinor;
    String cs= SS.CipherSuite ;
    CompLib.SSLClientHello chp = new CompLib.SSLClientHello (v1,v2,0,100, cs, "null");
    CompLib.GeneratIntRandomNumber(R);
    SS.ClientRandom=R.N;
    chp.Random=R.N;
    CompLib.SSLComposeClientHello(chp, "SSLClientHello.txt");
    CompLib.SendMsg(1);
    State2(SS, e);
```

FIG. 59

```
static void State1
(SessionState SS , CompLib.Error message e ) throws Exception {
    byte v1=SS.VersionMajor ;
    byte v2=SS.VersionMinor;
    String cs= SS.CipherSuite ;
    CompLib.SSLClientHello  chp = new  CompLib.SSLClientHello (v1,v2,0,100, cs, "null");
    CompLib.SSLReadClientHello(chp, "SSLClientHello.txt");
    SS.ClientRandom=chp.Random    ;
    SS.CipherSuite=chp.CipherSuites;
    State2(SS, e);
```

FIG. 60

```
public static class SSLSessionState {
        public byte VersionMajor;
        public byte VersionMinor;
        public String id, IP;
        public int PortNo, CurrentState;
        public String PrivKeyFname;
        public String PublicKeyFname;
        public String RespPublicKeyFname;
        public long ClientRandom;
        public long ServerRandom;
        public byte[48] PreMasterSecret;
        public byte[48] MasterSecret;
        public int SessionID;
        public int CipherSuite;
        public String CompressionMethod;
        public byte[8] client_write_MAC_secret;
        public byte[8] server_write_MAC_secret;
        public byte[8] client_write_key;
        public byte[8] server_write_key;
        public byte[8] client_write_IV;
        public byte[8] server_write_IV;     }
```

FIG. 62

```
<action>CompLib.ReadFileToBytes(fname+".txt", data, len)</action>
<action>CompLib.HMAC SHA1(SS.client write MAC secret, data.N,len.N, hashvalue)</action>
<action>CompLib.CreateNewFile("SSLSend.txt")</action>
<action>CompLib.SaveBytesToFile(data.N, len.N, "SSLSend.txt")</action>
<action>CompLib.AppendBytesToFile(hashvalue.N,20, "SSLSend.txt")</action>
<action>CompLib.SSLAddheader(Dh, "SSLSend.txt")</action>
<action>CompLib.EncryptDES("SSLSend.txt", "SSLSend.enc", SS.client write key, SS.client write IV)</action>
<action>CompLib.FileSize("SSLSend.enc", len)</action>
<action>CompLib.BytesObject data2= new CompLib.BytesObject(new byte[len.N])</action>
<action>CompLib.ReadFileToBytes("SSLSend.enc", data2, len)</action>
<action>CompLib.TCPSend(data2.N, len.N, CSO)</action>
```

FIG. 63

```
public static void TCPListen(SocketObject clntSock, String fname) throws Exception
{
    System.out.println("TCP socket is Listening ");
    int recvMsgSize=0;  // Size of received message
    byte[] byteBuffer = new byte[BUFSIZE];  // Receive buffer
    InputStream in = clntSock.S.getInputStream();
    recvMsgSize = in.read(byteBuffer);
    System.out.println("TCP socket received file size= "+recvMsgSize);
    SaveBytesToFile(byteBuffer, recvMsgSize,fname);
}
```

FIG. 65

```
<action>String fnameEnc="SSLReceivedData.enc"</action>
<action>String fnameDec="SSLReceivedData.dec"</action>
<action>CompLib.IntObject len= new CompLib.IntObject(20)</action>
<action>CompLib.DecryptDES(fnameEnc, fnameDec, SS.client write key,     SS.client write IV)</action>
<action>System.out.println("File Decrypted to: "+fnameDec)</action>
<action>CompLib.SSLStripheader(Dh, fnameDec)</action>
<action>System.out.println("SSL Data header striped ")</action>
<action>CompLib.FileSize(fnameDec, len)</action>
<action>CompLib.BytesObject data= new CompLib.BytesObject(new byte[len.N])</action>
<action>CompLib.ReadFileToBytes(fnameDec, data, len)</action>
<action> <moveto>
    <expression> len.N</expression>
    <case test="0">
<action>System.out.println("Empty file received" )    </action>
    <action> return </action>
    </case>
  </moveto></action>
</moveto></action>
<action>CompLib.HMAC_SHA1(SS.client write MAC secret, data.N,len.N 20, hashvalue)</action>
<action>System.out.println("Server: calculated hash value: "+new String(hashvalue.N))</action>
<action>CompLib.GetSubArray(data.N, len.N 20, len.N, hashvalue) </action>
<action>System.out.println("Server: received hash value: "+new String(hashvalue.N))</action>
```

FIG. 66

```
public static void Encrypt(String fileInput,String fileOutput,
        String publicKeyFilename ) throws Exception {
    PublicKey publicKey=LoadPublicKey(publicKeyFilename);
    // Open up an output file for the output of the encryption
    DataOutputStream output = new DataOutputStream
    (new FileOutputStream(fileOutput));
    // Create a cipher using that key to initialize it
    Cipher rsaCipher = Cipher.getInstance("RSA/ECB/PKCS1Padding");
    rsaCipher.init(Cipher.ENCRYPT_MODE, publicKey);
    // Now create a new 128 bit Tripple-DES key to encrypt the file itself.
    // This will be the session key.
     KeyGenerator myKeyGenerator = KeyGenerator.getInstance("DESede");
    System.out.println("Generating session key...");
    Key DESedeKey = myKeyGenerator.generateKey();
    // Encrypt the DESese key with the RSA cipher
    // and write it to the beginning of the file.
    byte[] encodedKeyBytes= rsaCipher.doFinal(DESedeKey.getEncoded());
    output.writeInt(encodedKeyBytes.length);
    output.write(encodedKeyBytes);
    // Now I need an Initialization Vector for the symmetric cipher in CBC mode
    SecureRandom random = new SecureRandom();
    byte[] iv = new byte[8];
    random.nextBytes(iv);
    // Write the IV out to the file.
    output.write(iv);
    IvParameterSpec spec = new IvParameterSpec(iv);
    // Create the cipher for encrypting the file itself.
    Cipher symmetricCipher = Cipher.getInstance("DESede/CBC/PKCS5Padding");
    symmetricCipher.init(Cipher.ENCRYPT_MODE, DESedeKey, spec);
    CipherOutputStream cos = new CipherOutputStream(output, symmetricCipher);
    System.out.println("Encrypting the file...");
    FileInputStream input = new FileInputStream(fileInput);
    int theByte = 0;
    while ((theByte = input.read()) != -1)
    { cos.write(theByte); }
    input.close();
    cos.close();
    System.out.println("File encrypted.");
    return; }
```

FIG. 67 ated on Aug. 1, 2005, of approximately 614.4 kilobytes.

META-PROTOCOL

CROSS-REFERENCE TO RELATED APPLICATIONS

The present application is a continuation of application Ser. No. 11/122,099, filed on May 5, 2005, now abandoned, entitled "Meta-Protocol," which claims the benefit of provisional patent application No. 60/568,664 to Abdullah et al., filed on May 7, 2004, entitled "Meta-Protocol," each of which are hereby incorporated by reference in their entireties.

REFERENCE TO COMPUTER PROGRAM LISTING APPENDIX ON A COMPACT DISC

A portion of the present disclosure is contained in a computer program listing appendix filed on two Compact Discs in ASCII text format, which are hereby incorporated by reference in their entireties. The Compact Discs are entitled COPY 1 REPLACEMENT created on Aug. 1, 2005, of approximately 614.4 kilobytes, and COPY 2 REPLACEMENT created on Aug. 1, 2005, of approximately 614.4 kilobytes.

BACKGROUND OF THE INVENTION

Communication protocols play a central role in today's information systems. The wide spread use of the Transmission Control Protocol/Internet Protocol (TCP/IP) protocol and the rapid development of communication technologies laid the ground for an explosion in the use of information technologies at homes, businesses and government agencies. Several protocols, including TCP/IP, HTTP, SMTP, S/MIME, SSL and IPsec, have contributed to this growth. Moreover, new technologies are emerging frequently to support the growing need for efficient, easy and secure communication.

Developed in the mid-1970's by the Defense Advanced Research Project Agency (DARPA) of the U.S. Department of Defense, the TCP/IP protocol has several features that led to its widespread adoption: open standard, freely available for developers and independent of any specific physical network hardware. The first two features led to TCP/IP's wide acceptance, and the latter feature made it easy for different kinds of networks to interoperate. With the adoption of TCP/IP, the Internet has seen an exponential growth.

The TCP/IP stack consists of four layers: the network access layer, the Internet Protocol layer (IP), the transport layer and the application layer. The network access layer is located at the bottom of the architecture. It consists of many protocols that provide access to physical networks. Compared to the Open System Interconnection (OSI) seven-layer reference model, the network access layer comprises just two layers: a data link layer and a physical layer.

The IP layer is responsible for defining the Internet addressing scheme, composing datagrams and routing them to their destination. IP is a connectionless protocol. Yet, it does not provide handshake or reliability mechanisms. Thus, IP depends on other layers to provide such services.

The transport layer consists of two protocols: Transmission Control Protocol (TCP) and User Datagram Protocol (UDP). TCP provides connection management reliability, flow control and sequencing, whereas UDP serves as a simple interface between applications and IP. One other distinction is that UDP does not provide reliability, flow-control or error-recovery.

The application layer is at the top of the stack. It includes protocols that use the transport layer to deliver data to the network. Many protocols run at the application layer to provide services such as TELNET, HTTP, SMT and FTP.

Problematically, TCP/IP does not have security measures to support the kind of applications that have appeared over time. Therefore, several security solutions have been proposed to address the different kinds of vulnerabilities of TCP/IP, as well as the additional security needs of applications. Such security solutions are typically associated with a single layer of the TCP/IP stack or with specific applications.

Security protocols also play a central role in today's information systems. Most tend to have more commonalities than differences. For example, security protocols share significant functionality and utilize a common set of encryption, hash and compression algorithms. They usually differ in the handshaking mechanism (which includes authentication), target data, header processing, key sizes, replay mechanisms and the order in which the various algorithms are applied.

One common security protocol is the secure socket layer (SSL). The motivation for the SSL protocol development was to provide protection to electronic commerce and Web transactions. In 1994, Netscape communications introduced SSL version 1.0 in its Mosaic Web browser. Netscape made SSL an open standard and encouraged the Web community to participate in its development. Later, in May 1996, the development of SSL became the responsibility of the Internet Engineering Task Force (IETF), which was later renamed as Transport Layer Security (TLS).

SSL has two important features. First, it provides strong protection based on public key cryptography. That is, SSL uses public key cryptography to encrypt the pre-master key that is used to generate the set of shared keys. Second, SSL is efficient because it uses symmetric key cryptography to protect the traffic between the communicating parties. Therefore, SSL consumes relatively little CPU time to protect the exchange of data between parties. These two features made SSL suitable for most e-commerce applications on the Internet.

Today, SSL is the most widely used Web security protocol. Almost every browser and Web server supports SSL. SSL adds security by inserting itself between the Hypertext Transfer Protocol (HTTP) application and the TCP layer. Therefore, SSL requires minor changes in the applications. In addition, SSL is not limited to HTTP traffic (through its original specification) but it can support other Internet applications, such as Net News, FTP and Telnet.

However, a disadvantage of SSL is that it only supports TCP. In the typical handshake process, an SSL initiator sends to the second party a list of the security capabilities that it can support. For instance, TLS v.1 currently supports 32 different capabilities. In this format, the responder selects his preferred capability and sends it back to the initiator along with a certificate that contains a public key. The certificate is then used by the initiator to authenticate the responder. Next, the initiator creates a pre-master secret key, encrypts it with the responder's public key and sends the encrypted message to the responder. Afterwards, both parties use the pre-master secret key to create six shared keys for the protection of the subsequent communication. Each party indicates its readiness to switch to protected mode by sending a single byte message called ChangeCipherSpec. The first protected message sent by each party is the Finish message. This message contains a hash value of all the previously exchanged messages between the parties to protect the session against replay attacks.

Another security protocol is IP Security Protocol (IPsec). IPsec is a security standard developed by the Internet Engineering Task Force (IETF). This protocol is designed to establish a solid security ground for the Internet. IPsec is part of the Next Generation Internet or Internet II (IPv6). Most of the VPN products nowadays adopt the IPsec protocol (e.g., Cisco VPN, eTrust, VPN-1 and Symantec). A complex technology, IPsec's main goal is to secure the flow of information between two endpoints. Its security services are designed for the IP layer. Furthermore, it provides several types of protections such as source IP authentication, integrity and confidentiality. The protection scope varies. For example, it may include the IP header, or it may be limited to the payload only. These choices are determined by a set of security policies that are managed by a system administrator. However, an IPsec-secured connection is very cumbersome to setup and configure because it comes in many varieties. Therefore, an IPsec user has to have a clear set of requirements and security policies before implementation. Otherwise, it would be hard to validate whether there is a secure connection or not.

IPsec consists of two major protocols: Authentication Header (AH) and Encapsulating Security Payload (ESP). Each protocol can be configured to run in Transport Mode or in Tunnel Mode. The Transport Mode provides security for transport layer (TCP, UDP or ICMP). Typically, this mode is used for end-to-end communication. Therefore, ESP in transport mode encrypts, and optionally authenticates, the IP payload but not the IP header. Similarly, AH in transport mode authenticates the IP payload and selected portions of the IP header without encryption.

Tunnel mode provides security for the entire packet. A new header with the gateway destination address is added to the packet. ESP in tunnel mode adds a new header to the packet, encrypts it and optionally authenticates the new packet including the new header. In contrast, AH in tunnel mode authenticates the entire packet and parts of the new header without encryption.

IPsec manages keys and establishes sessions through a protocol called the Internet Key Exchange (IKE). IKE is a collection of protocols: Internet Security Association and Key Management Protocol (ISAKMP), Oakley Key Determination Protocol (Oakley) and Secure Key Exchange Mechanism (SKEME). Therefore, IPsec supports a wide variety of key types and sizes.

IPsec provides general IP security services regardless of the specific needs of the applications. However, IPsec is transparent to applications. Therefore, similar to SSL, IPsec cannot address specific needs of an application, such as authenticating a user or protecting parts of a document (e.g., part of a contract or a payment document).

The current approach to implementing security protocols is centered on designing a protocol as a single package comprised of two layers: control and a library of algorithms. This approach is based on the assumption that every protocol is complete and does not need to be integrated with other security protocols. Yet, this assumption may not be valid in situations where several security protocols need to coexist. In such cases, redundancy and conflicts may occur. For example, running Secure/Multipurpose Internet Mail Extensions (S/MIME) over IPsec introduces redundancy. Both provide similar encryption: S/MIME does it at the document level and IPsec at the packet level. This situation is common in business-to-business (B2B) applications when an application uses S/MIME as a document-level protection while using IPsec to protect the communication with a remote branch office.

Moreover, the current approach of designing autonomous and complete protocols has several disadvantages. First, it may result in conflicts when various protocols need to coexist. For example, if compression is done at an upper layer (e.g., S/MIME), repeating it at a lower layer may increase the size of the message. Second, there is not enough flexibility in most security protocols (e.g., S/MIME, SSL, IPsec) and, consequently, their users have to adopt them without being able to make changes. For instance, a user may want to change the header by adding or removing some fields for quality of service (QoS) purposes. Third, these protocols offer coarse grained security services and the developer of an application does not have the ability to fine tune operations within the use of these protocols. For example, S/MIME services are applied to an entire document, preventing a user from applying it on selective parts of the document. Fourth, the use of coarse grain services may lead to unnecessary performance degradation. For instance, SSL has to calculate a block of four shared keys and a couple of IVs even if the user does not want to use some of the modes such as the read mode, the write mode, the encryption service or the integrity service.

Furthermore, the traditional approach to implementing protocols is monolithic. Adhering to monolithic protocols limits users to situations for which the protocols were implemented. Internet applications and their security requirements are evolving very rapidly. Video, audio, wireless applications, collaborative applications and many other emerging technologies raise new challenges and require flexible approaches to deal with them. This monolithic implementation approach is not well-suited to cope with rapid changes in communication and security requirements.

Overall, the current process of implementing a protocol is tedious and error-prone. Protocol specifications in natural language are often ambiguous and may lead to defective implementations. Moreover, implementations have to be thoroughly tested. This testing is a time-consuming effort due to the timing dependencies of events processed by protocols.

Consequently, it would be desirable to have a model for sharing protocol specifications to produce protocol implementations automatically. It would also be desirable to free protocols from being dependent on the monolithic implementation of a limited number of capabilities. Additionally, it would be desirable to have a flexible infrastructure for businesses to exchange protocol specifications and automatically generate code that supports the evolving B2B environment. Furthermore, it would be desirable to have a framework that could be applied to overlay networks and Web Services.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

FIG. 6 shows an ISAKMP packet format.

FIG. 8 shows an example of an ISAKMP header carrying a proposal payload.

FIG. 12 shows an example of an access list.

FIG. 14 shows an example of records in a registry database.

FIG. 22 shows a XPSL syntax for NSAP's client state 3.

FIG. 24 shows an example of an <object> element.

FIG. 25 shows an example of an <instance> element.

FIG. 26 shows an example of a <moveto> element nested inside an <action> element.

FIG. 27 shows an example of a <moveto> element.

FIG. 28 shows an example of an <instance> element nested inside an <action> element.

FIG. 31a shows a data type comparison between programming languages.

FIG. 31b shows a list of XPSL protocol primitive data types.

FIG. 35 shows a main segment of the XML schema for XPSL specifications.

FIG. 36 shows an XML schema definition of an <object> element.

FIG. 38 shows an XSLT main template.

FIG. 39 shows an example of a <first-state> template.

FIG. 40 shows an example of an <object> template.

FIG. 41 shows an example of an <instance> template.

FIG. 42 shows an example of an <action> template.

FIG. 43 shows an example of a <moveto> template.

FIG. 44 shows an example of a <state> template.

FIG. 45 shows partial Java code of the NSAP.

FIG. 47a shows a TCP sequence of states transition.

FIG. 47b shows a TCP sequence of message exchange.

FIG. 47c shows a TCP sequence of states transition.

FIG. 47d shows another TCP sequence of message exchange.

FIG. 48 shows an XPSL specification of the first state.

FIG. 49 shows a list of the Java code corresponds to the specification presented in FIG. 48.

FIG. 50 shows components and objects used in the ISAKMP initiator.

FIG. 51 shows data structure of the ISAKMPFSM object.

FIG. 52 shows BXcomposeMainHeader Java class.

FIG. 53 shows a Java class for sending a UDP packet.

FIG. 54 shows an SSL Handshake sequence of message exchange.

FIG. 56 shows an SSL Handshake Client SessionState object XPSL specification.

FIG. 57 shows an SSL Handshake Client first state XPSL specification.

FIG. 58 shows an SSL Handshake Server first state XPSL specification.

FIG. 59 shows a generated Java code corresponding to the specification in FIG. 56.

FIG. 60 shows a generated Java code corresponding to the specification in FIG. 57.

FIG. 62 shows an SSLSessionState data structure.

FIG. 63 shows actions inside state 7 of the client XPSL specification.

FIG. 65 shows java implementation of the TCPListen Component.

FIG. 66 shows XPSL actions inside state 6 of the server process.

FIG. 67 shows an example of an encryption component.

DETAILED DESCRIPTION OF THE INVENTION

Figure 1:
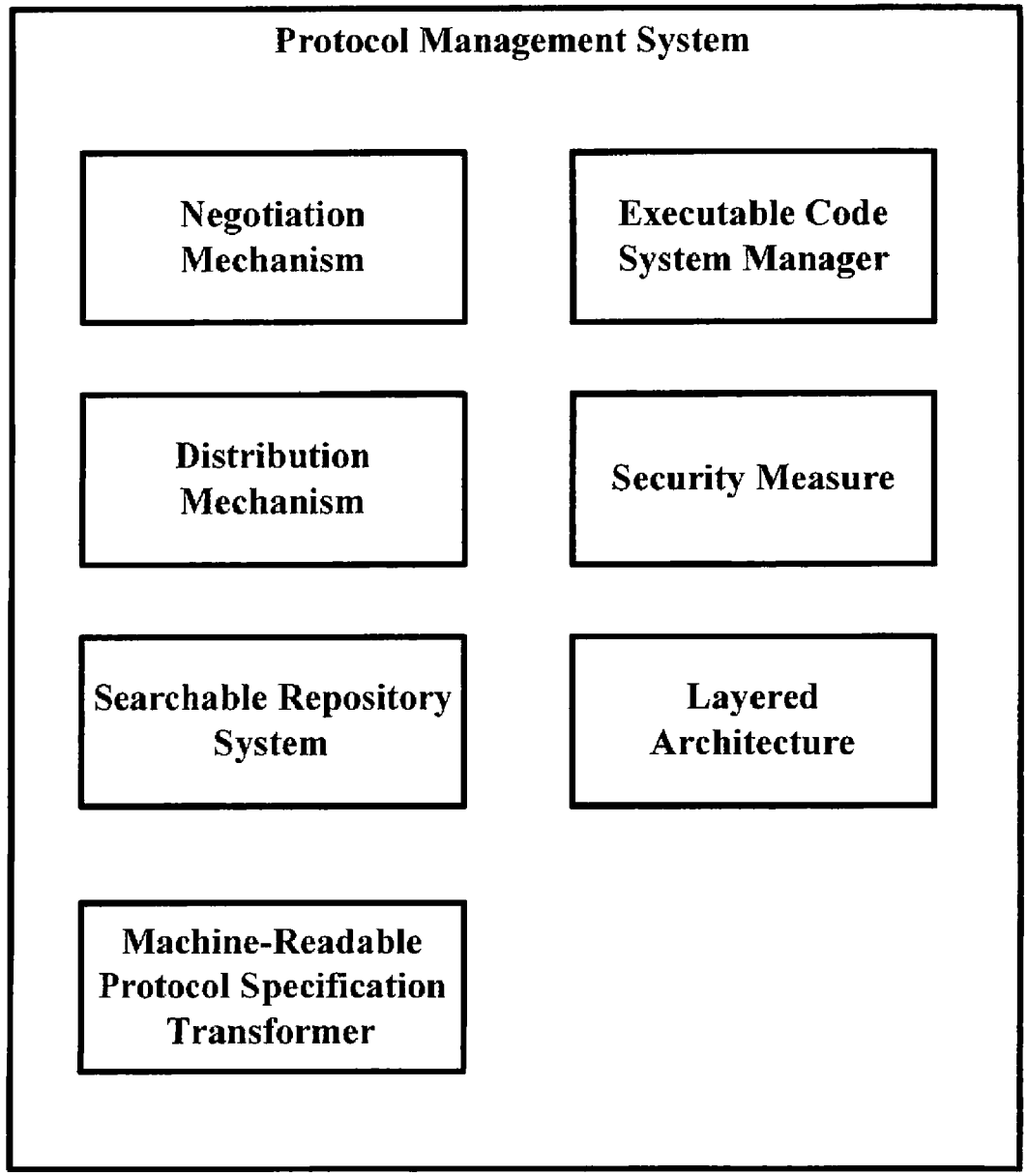
FIG. 1 shows a protocol management system.

The present invention is a multi-layer protocol management system and method, embeddable in a tangible computer-readable medium, that allow for on-the-fly machine-readable protocol discovery and negotiation, distribution of protocol specifications and components, automatic machine-readable protocol implementation and execution of machine-readable protocol specifications. Automatic protocol implementation may be accomplished using eXtensible Markup Language (XML)-related technologies and Component-based Software Engineering (CBSE).

The present invention is also a tangible computer-readable medium encoded with instructions capable of generating, as well as capable of being designed to generate, protocol specifications. A program of instructions, called XML-based protocol specification language (XPSL), may be used for generating a specification of a communication protocol (such as high-level specifications of a protocol) in a machine readable form. A language that protocol designers can use to describe the design of a protocol, XPSL may be expressible in Finite State Machines (FSM) by using CBSE principles. Taking an XPSL document as input, an eXtensible Stylesheet Language for Transformations (XSLT) may be used as a code generator to transform specification description into actual code (e.g., an implementation for the communication protocol). XSLT stylesheets can be designed to produce code in different programming languages (e.g., C++ or Java). CBSE may be used to build a set of operations needed by a protocol.

XML is a set of rules for creating new markup languages. Originally, XML may be construed as a subset of the Standard Generalized Markup Language (SGML), which specifies syntactic and semantic rules for creating new markup languages, such as the Hypertext Markup Language (HTML). SGML may also be deemed as an International Standards Organization (ISO) standard.

XML 1.0 was announced as a World Wide Web Consortium (W3C) recommendation on Feb. 10, 1998. A goal of XML is to provide a language for expressing metadata. Metadata refers to information about data. Metadata is often important in searches, filtering, and document management. XML is intended to be human-readable as well as machine-readable. A document that conforms to the XML specification can be called "well-formed." XML editors and parsers typically provide the capability to check if an XML document is well-formed or not.

An XML specification may include two parts. One may specify rules for constructing XML documents, while the other may specify rules for Document Type Definitions (DTD). A DTD may specify how tags are used in a class of XML documents; the order they should appear; the nesting structure of a document; and the attributes of XML elements for that class of documents. A DTD may also describe constraints on XML elements that are used to validate the correctness of an XML document. But, a DTD may also have disadvantages. First, it is not written in XML; it has a special syntax. Second, a DTD has a limited expressive syntax to address needs such as different kinds of data types and cardinality constraints. To overcome the limitations of DTDs, XML schemas may be introduced.

The W3C released the Schema standard in May 2001. An XML schema may specify valid elements and attributes in an XML document. It may also specify XML elements order, attributes constraints, accepted data types and accepted value ranges. Schema can help applications determine whether an XML document complies with a system's requirements.

XPSL may be based on XML, which is an open standard used to express Metadata in machine readable form. Because XML is known to be widely used for easy sharing and exchanging of information about transmitted data, XPSL can benefit from the wide spread tools and technologies of XML. In essence, the development of XPSL addresses the need of sharing and exchanging protocol specifications among users in a machine readable form.

The eXtensible Stylesheet Language (XSL) is a language that allows XML document users to specify how an XML document may be transformed into a resulting output document (e.g., HTML, SVG, PS, PDF, plain text, or any other format). The XSLT 1.0 recommendation was released on Nov. 16, 1999. XSLT tends to be attractive to developers because it is not a programming language. An XSLT stylesheet may be written down as a set of rules, which may be applied to the XML document during the transformation to produce the required output.

I. The Meta-Protocol Framework

A protocol may be defined as a set of rules shared by two or more communicating parties to facilitate data communication. These rules can have two parts: syntax and semantic. Syntax refers to the format of the messages that are to be exchanged; semantic refers to the sequence of operations to be performed by each party when events (e.g., timeouts and reception of messages) occur.

Referring to FIG. 1, as one embodiment, a protocol management system, sometimes referred to as a Meta-Protocol framework, can demand a plurality of requirements. First, it may require a negotiation mechanism for allowing communicating parties to agree upon a machine-readable protocol specification (also sometimes referred to as protocol specification or specification). The specification may be an XPSL specification. Second, it may require a delivery mechanism for retrieving and/or distributing the machine-readable protocol specification and any missing component. Third, it may require a searchable repository system to store specifications and any missing component. Fourth, it may require a machine-readable protocol specification converter to convert the protocol specification and any missing component into executable code. Fifth, it may require an executable code system manager for managing the executable code by loading it and running it as needed. Sixth, it may require a security measure against attacks, such as identify theft, Denial of Service (DoS), anti-replay and connection hijacking. Seventh, it may require a layered architecture.

The layered architecture is often necessary to maintain flexibility. Natural boundaries between layers may be found according to technologies chosen at each layer. Indeed, each layer may encompass multiple technologies that fit the requirements of that layer. For example, off-line or online approaches may be used at the negotiation layer, which is usually the first layer of the Meta-Protocol framework. Moreover, any security measures needed may vary per layer.

To implement the Meta-Protocol framework, a development environment and/or an execution environment may be needed. The development environment is generally responsible for writing down protocol specifications from protocol designs, developing components, and verifying specifications and components. Once a specification is complete along with all the required components, the protocol may be deployed into the execution environment. The development environment architecture and tools can be widely open and can vary from a simple standalone editor and compiler to complex visual (e.g., GUI) systems that integrate editing, coding, and verification.

The distinction between the two environments is important from an operational and performance point of view. An objective of the development environment is to prepare a system and produce necessary code. This objective may be achieved in the background (e.g., under no time constraints). On one hand, operations in the development environment may involve human interaction and may take several cycles to produce the correct specification and, if any, components code. On the other hand, operations in the execution environment may take place at run time. Therefore, by separating these two environments, protocol code may be executed with minimum possible overhead.

Figure 2:
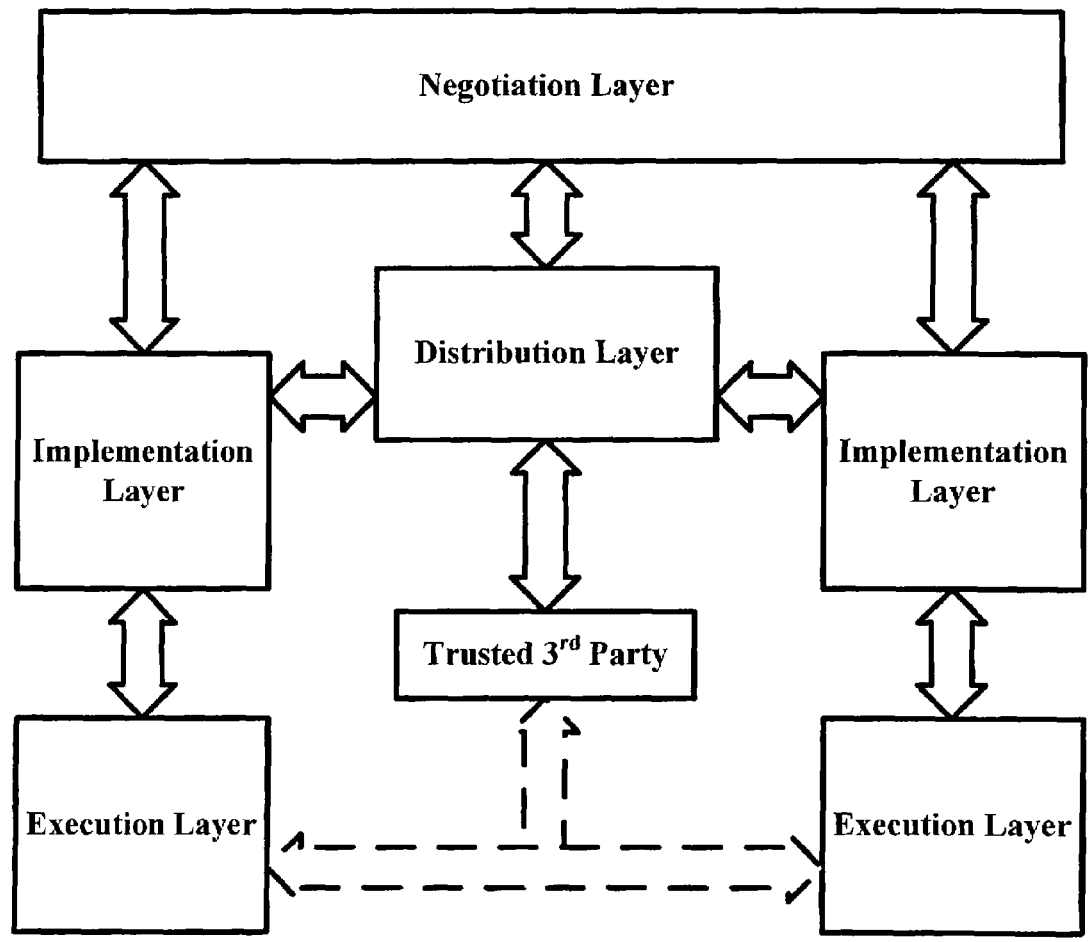
FIG. 2 shows one embodiment as per an aspect of a layered structure of the Meta Protocol framework.

Referring to FIG. 2, the Meta-Protocol framework may have four different layers: a negotiation layer, a distribution layer, an implementation layer and an execution layer. In the negotiation layer, communicating parties may agree upon protocol specification. It is preferable, albeit not necessary, that the protocol specification be written using XPSL. For example, the protocol specification can also be written using XML. In the distribution layer, the responding party may retrieve and/or distribute the agreed upon protocol specification, as well as any components needed for the protocol implementation. The protocol specification may exist locally or at a remote site. The responder may retrieve the protocol specification and verify its authenticity, or alternatively, allow a trusted third party to do so. In the implementation layer, the protocol specification may automatically be converted into code (e.g., executable code) through a transformation process that uses XSLT. In the execution layer, the code may be loaded and executed as needed.

Various mechanisms may be employed to assist in performing these functions. These include a negotiation mechanism, delivery mechanism, machine-readable protocol specification converter and executable code system manager. Each may be embedded within its respective layer as exemplified in FIG. 3. Additionally, the framework may also be supplemented by incorporating a searchable repository system and a security measure. The searchable repository system may assist in storing a protocol specification and/or any missing component. A security measure can help protect the system and method from attacks, such as viruses and access without permission.

Figure 4A:
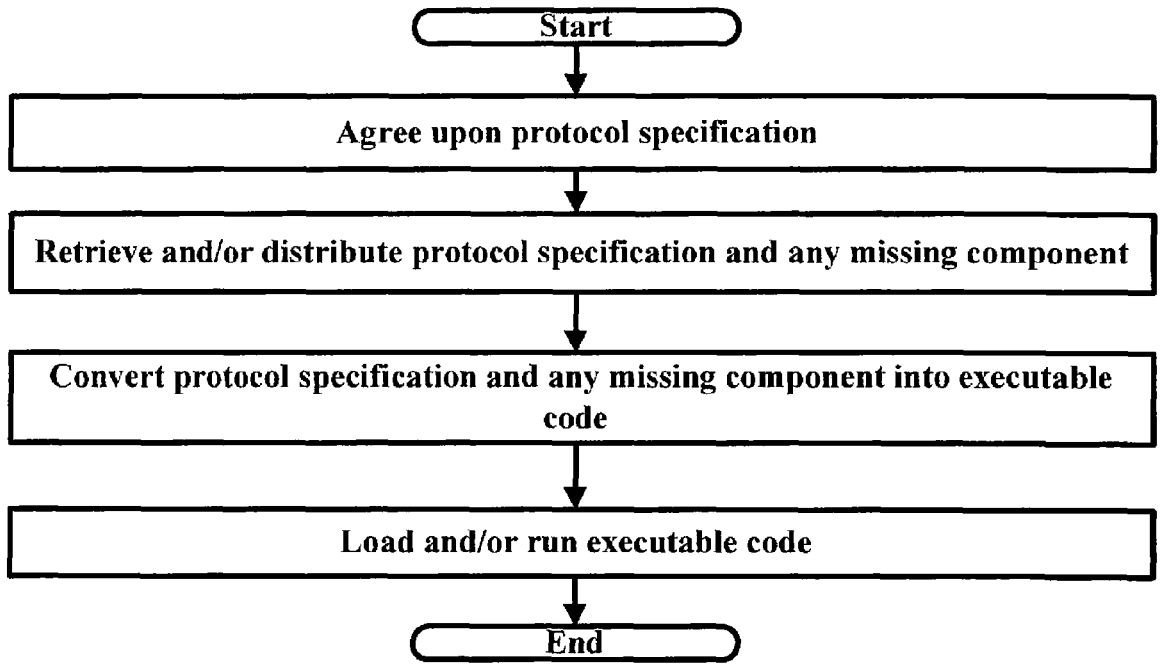
FIG. 4*a* shows one embodiment as per an aspect of a flow process for interacting among the layered structure of a protocol management system.
Figure 4B:
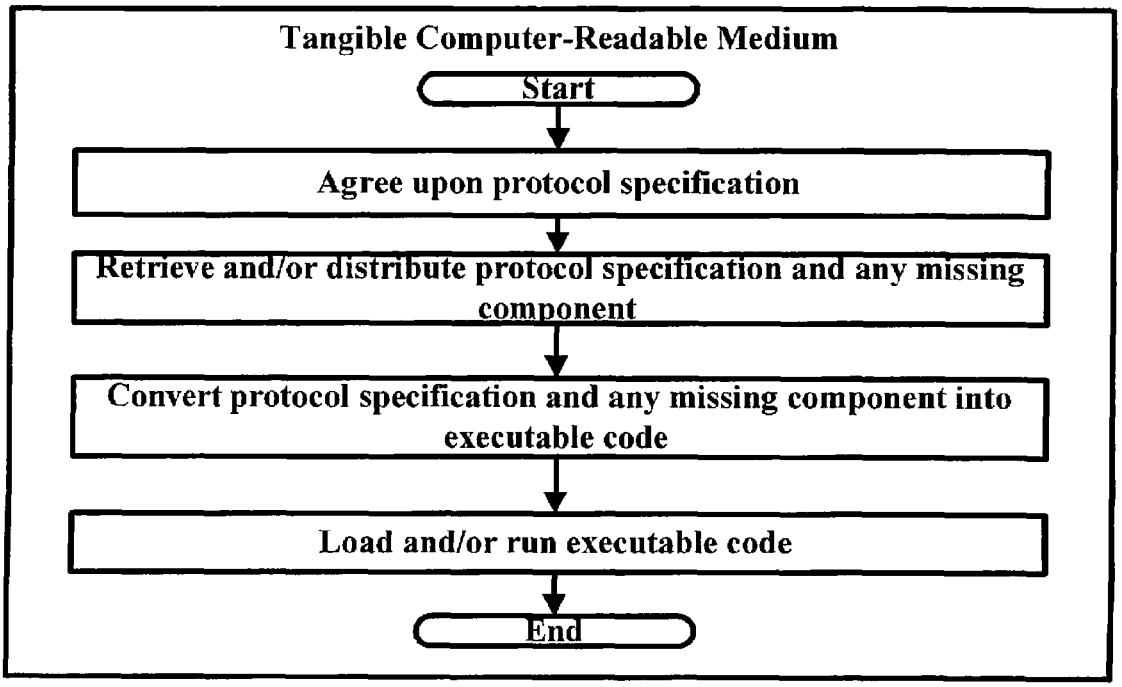
FIG. 4*b* shows a tangible computer-readable medium encoded with the embodiment of FIG. 4*a*.
Figure 5B:
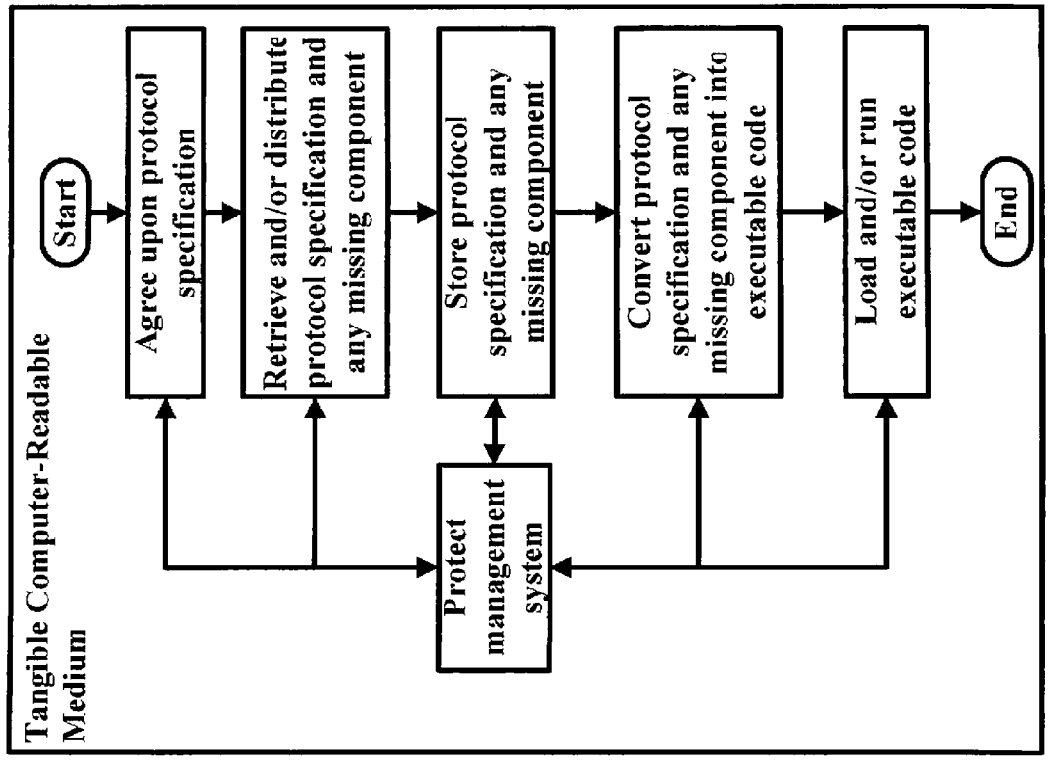
FIG. 5*b* shows a tangible computer-readable medium encoded with the embodiment of FIG. 5*a*.
Figure 5A:
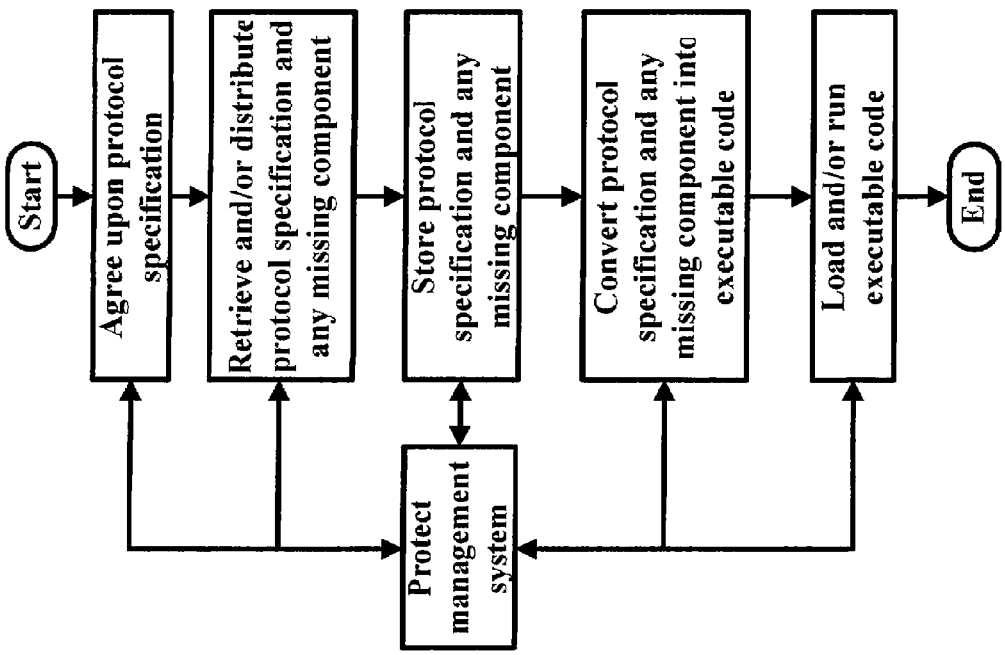
FIG. 5*a* shows another embodiment as per an aspect of a flow process for interacting among the layered structure of a protocol management system.

The system may be able to interact among the layers using a method as exemplified in FIG. 4a. Additionally, the method may further include a storing step and a securing (i.e., protection) step as exemplified in FIG. 5a. Both FIGS. 4b and 5b show that its respective method may be embedded in a tangible computer-readable medium.

A. Negotiation Layer

A goal of the negotiation layer is to establish an agreement between two communicating parties on the name and location of a protocol specification and its components. The protocol specification may be written in XML and/or include a description of a protocol specification language (such as, but not limited to XPSL) specified in an XML schema. In essence, for example, the protocol specification may be a machine-readable XPSL specification. A component may be any software component, such as the ones listed in the Computer Program Listing Appendix. A negotiation mechanism can be used to help accomplish this goal. The initiator of the communication can provide a set of proposed protocol specifications. The responder can then select a protocol specification according to its preferences and notify the initiator.

This goal may be achieved either manually or automatically. The manual approach may be feasible for local areas but may not be appropriate for long distances. Under the automatic approach, the goal may be achieved either via a secure channel (e.g., SSL or IPsec) or through the use of a customized version of the Internet Security Association and Key Management Protocol (ISAKMP). Customization can be performed according to a user's requirements or needs. If secure channels are used, negotiation mechanisms may need to be added. Yet, it is preferable to choose a customized version of ISAKMP because it may already provide a negotiation mechanism in addition to several important security features.

ISAKMP tends to provide packet formats and negotiation procedures for establishing security associations (SA) and key management. For the purpose of maintaining interoperability between systems, it is preferable to separate security association management from key exchange. In addition, the ISAKMP standard may be independent of any specific security protocol or key exchange algorithm. Moreover, this standard may be highly flexible and interoperable with other protocols and algorithms.

Every ISAKMP packet may include one or more payloads organized as a linked list. Each payload can vary in length as specified in a payload header. The first payload may be defined in the main ISAKMP header, and every payload may carry a field that defines the next payload type, which may define the structure of such payload and its content.

It is preferable to customize a Domain of Interpretation (DOI) to define new payload formats, exchange types and name conventions, as well as to save time and effort. To achieve this feature, the IPsec format may be used with various types of information tailored to the needs of the Meta-Protocol framework. For example, IPsec may use ISAKMP proposals to deliver information related to the IPsec type of operation and transforms (e.g., AH or ESP). In the Meta-Protocol framework, ISAKMP may be used to deliver information related to protocol name, location and versions.

The operation of ISAKMP may include two phases. The first phase preferable negotiates security proposals. An agreement upon a specific proposal can establish phase-1-SA. In the second phase, a protocol specific SA may be created under the protection of phase-1-SA. The first phase may offer five types of exchanges: Base, Identity Protection, Authentication Only, Aggressive and Informational. Each type of exchange tends to describe a sequence of messages, and each may differ in the level of authentication and number of messages exchanged. An initiator can select one of these exchanges to deliver proposals according to its needs. The Base Exchange may provide session integrity protection. One embodied implementation of the present invention uses this exchange to deliver the file name and file location of an XPSL protocol specification instead of delivering IPsec related information. If confidentiality is required, then the Identity Protection exchange can be used.

As an embodiment, FIG. 6 exemplifies the format of ISAKMP's main header and payload header. ISAKMP may mandate the use of UDP as the transport protocol for ISAKMP messages. According to one ISAKMP recommendation, a set of cookies in the header is generated by hashing the IP source and destination addresses, the UDP source and destination ports, and any locally generated secret number. The Next Payload Type field in the main header defines 13 types and leaves a range of values from 128 to 255 for private use. The Exchange Type field defines the five types of exchanges as mentioned previously. This field also leaves a range of values from 240 to 255 for private use. The private use code ranges provide the flexibility to define additional sequences of messages for different types of exchange as needed.

Figures 7A, 7B:
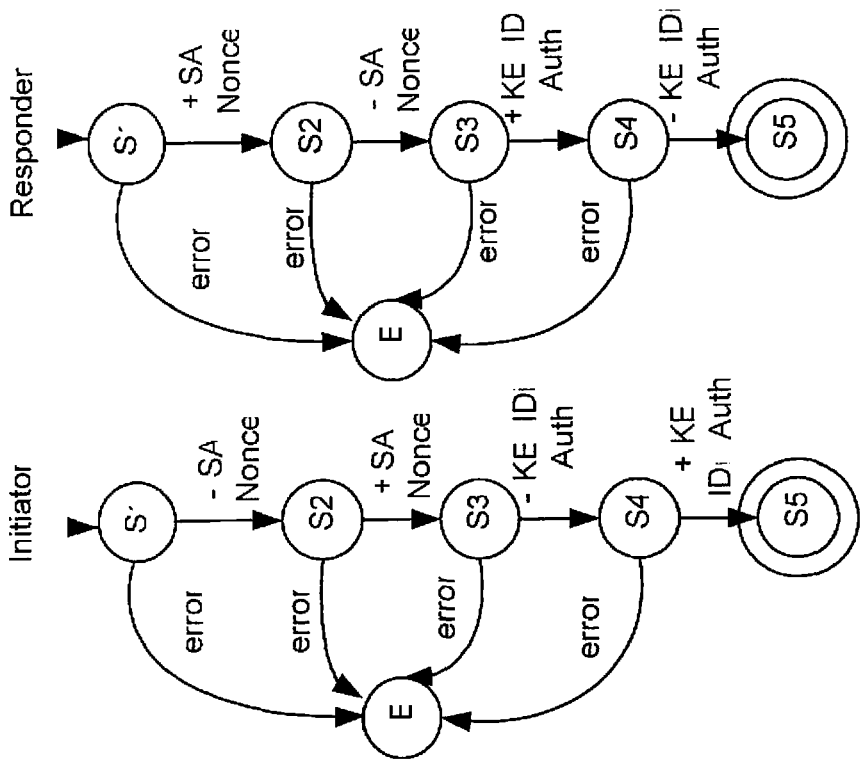
FIG. 7a shows a list of messages for Base Exchange.
FIG. 7b shows FSM diagrams for ISAKMP Base Exchange.

FIG. 7a shows a list of messages that may be used by Base Exchange to deliver protocol proposals. FIG. 7b shows an example of FSM diagrams for this Base Exchange. As part of the customization of IPSec's DOI, the semantic of the messages of the Base Exchange may be changed.

According to these exemplified illustrations, in ISAKMP's Base Exchange, an initiator starts by sending a set of protocol proposals, similarly to an exchange of security associations, and a nonce. The nonce may be used to protect against anti-replay. The responder chooses one of the proposals and notifies the initiator. This notification message also includes another nonce. In the next two messages, the parties exchange key information and authentication information. The authentication payload contains a hash value over the previous messages to protect against session highjacking.

The ISAKMP protocol may contain all the security measures needed to protect the negotiation process against DoS, anti-replay and connection highjacking. The five exchange types in ISAKMP usually have different levels of authentication. The most protected exchange may be the Identity Protection exchange with six messages, and the least protected may be the Aggressive exchange with only three messages.

In an instance, as shown in FIG. 8, an initiator may send an ISAKMP packet to deliver a protocol proposal composed of a protocol specification name, its location and its version. The name and location of the protocol specification are preferably mandatory; the protocol version is optional. The protocol specification name (Protocol_X) and versions (MjVer and MinVer) are placed in the first payload while the location goes in the next payload. An initiator may send multiple proposals linked to a main ISAKMP header using the Next Payload field. The list is terminated by a null value in the Next Payload field.

The initiator may also have the option to append to the packet a key exchange payload carrying information about the proposed key exchange technique (e.g., Oakley or Diffie-Hellman). The key exchange may also carry the required data to generate session keys.

Preferably, a protocol specification of the customized version of ISAKMP may serve as the bootstrap of the Meta-Protocol framework. Simply, this embodiment is typically required from any network node to use the Meta-Protocol framework since the code for ISAKMP may be generated from its specification.

B. Distribution Layer

Generally, specifications and components referenced therein do not need to be stored locally. Communicating parties may exchange them directly (e.g., via a communicating party distribution) or retrieve them from a trusted third party. Such exchange may be facilitated using a delivery mechanism. Specifications and components that are only needed for a short period of time may be deleted after their use to save space. Alternatively, specifications may be retrieved and/or distributed from a local cache. To protect specifications and components referenced therein from unsolicited or malicious alteration, each ought to be digitally signed by their authors and verified by the receiving party. Trusted providers may place their specifications and components at public repositories on the Internet so users may retrieve them when needed. Newer versions may also be pushed from these providers to subscribed users to keep theirs up-to-date.

As a preferred embodiment, the distribution layer uses a directory service, such as the Universal Description, Discovery, and Integration (UDDI) directory, which is a known comprehensive industry initiative that helps businesses define themselves, discover other businesses and share information about their interactions globally. UDDI is also an architecture for web services integration that contains standards-based specifications for advertising, description and discovery services. Each service advertised in a UDDI directory has the freedom to specify a transport mechanism to access that service (e.g., SMTP, FTP, HTTP, and SOAP). Every UDDI user may have the option to check the transport mechanism of the service he or she is seeking before connecting to that service. Communicating parties in the present invention may use UDDI to advertise protocol names, the location of their specifications, the location of the components needed by the specification and the preferred transport mechanism to download the specification and components.

In addition, using UDDI at the distribution layer may also serve users who are planning to start a negotiation but do not have specifications to propose to another party. Such users may consult UDDI directories to discover protocol specifications, their providers, the location of the specifications and their components for download.

UDDI is an open standard specification for directory services. The standard was released on Sep. 6, 2000 as a project aimed to provide service-centric business-to-business (B2B) integration. A goal of UDDI is to enable businesses to establish many business relationships. UDDIs are repositories of information that facilitate discovery and interaction between customers and vendors. Vendors may present their offerings through UDDI as regular text descriptions or as electronic representations (e.g., Web services).

Another goal of UDDI is to provide two main services: publishing and discovery. Typically, publishing is done by the service providers, and discovery is done by the customers. Today, there are several public UDDI sites that are running the most current specifications and are usually available free-of-charge to UDDI developers (e.g., uddi.ibm.com, uddi.rte.microsoft.com and udditest.sap.com). These UDDI sites help enable anyone to search existing data or register new services.

The data available within UDDI may be divided into three categories: white pages, yellow pages and green pages. White pages may include general information about the provider of the service (e.g., contact information). Yellow pages may provide classification information about the service providers (e.g., industry, products and codes). Green pages may contain technical information about the service. This technical information may contain a pointer to an external specification, address of the service provider and a specification of the method for accessing the service. UDDI may not be limited to advertising Web services. Rather, UDDI can be used to advertise any service including web pages, e-mail addresses and Common Object Request Broker Architecture (CORBA) services.

C. Implementation Layer

Figure 9:
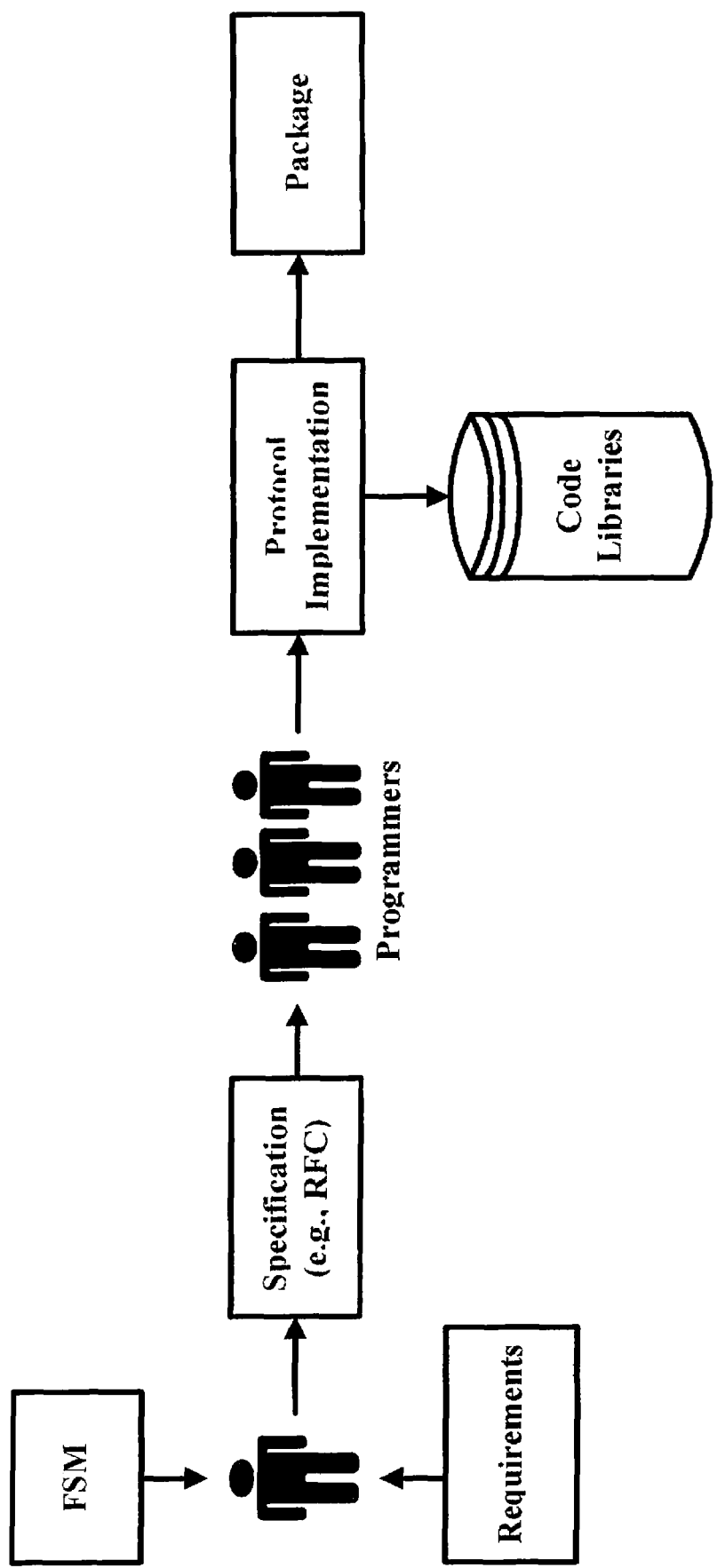
FIG. 9 shows a manual protocol production process.

The traditional manual process, as shown in FIG. 9, for producing protocols may have three stages: design, verification and implementation. The first two stages may produce a specification document. The specification of standard protocols (e.g., TCP/IP, FTP, SSL and IPsec) may be written in natural English (e.g., RFC) and may be translated into code by programmers.

The manual design and verification process may be similar to the traditional approach. However, the design process in the present invention may use FSMs to produce protocol specifications in XML. These specification documents generally have to be well-formed XML documents and ought to comply with the rules specified in the protocol XML schema. If these conditions are satisfied, an XSLT stylesheet may automatically implement the protocol without human intervention.

The implementation layer of the present invention may include an approach to produce code (e.g., executable code) that implements a protocol automatically. The proposed approach is preferably based on XML-related technologies and a multitude of components referenced in at least one of the protocol specifications. XML-related technologies may include, but are not limited to, XML schema, XSLT transformations, XSLT processors, XML parsers, and XML editors. Where XPSL protocol specifications are involved, it is suggested that an XML-based language, such as XPSL as later discussed herein, be used to produce code. In general, XPSL may specify protocols described through FSMs. XSLT may be used to transform or convert the specification and any missing component into actual code, such as an executable code. To aid this conversion process, a machine-readable protocol specification converter may be used. XSLT stylesheets may be designed to produce code in different programming languages (e.g., C++, Java or Cobol). It is possible that a single XSLT stylesheet may be associated with a single programming language. Such stylesheet may be used to generate an executable code, which may either be an implementation of or a code used for implementing at least one protocol specification, for a multitude of protocol specifications. The executable code itself may be retrieved from a local cache.

Figure 10:
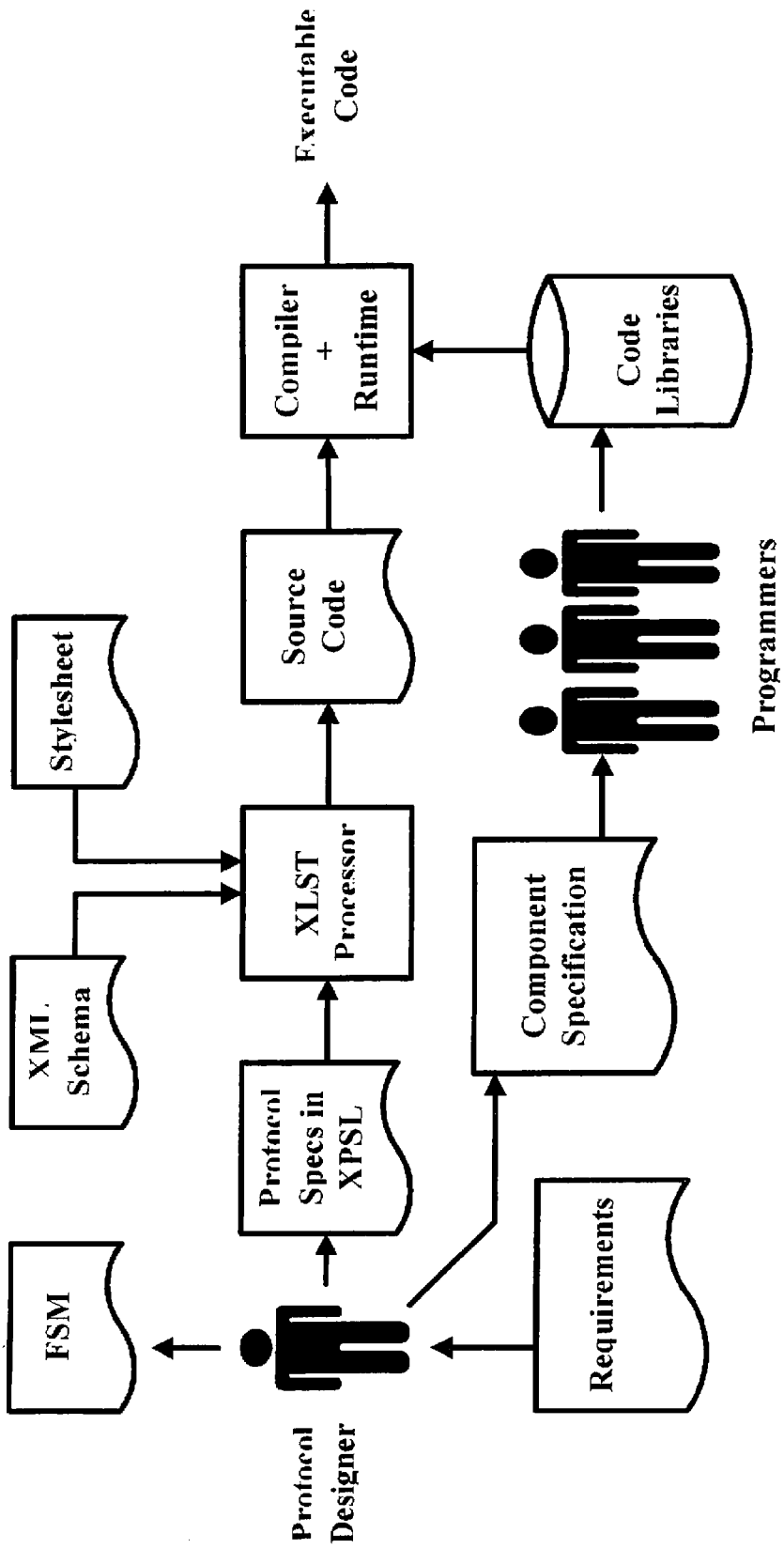
FIG. 10 shows an automated protocol production process.

CBSE, a software component, may be used to build a set of operations (e.g., encryption) needed by the protocol. Such set may be a multitude of components referenced in at least one of the protocol specifications. FIG. 10 highlights a proposed automated protocol production process.

Every component used in an XPSL specification may be an executable program designed based on CBSE principles. Furthermore, a component may be a software component. Moreover, a component may be shared by more than one XPSL specification. For example, an RSA encryption algorithm may be used in a single protocol several times and may be shared by many protocols. However, a component may also comprise several subcomponents. For instance, a security envelope component consists of a header processing subcomponent, a MAC subcomponent and an encryption algorithm subcomponent.

The idea of modular or component-based design approach is common in many engineering fields and industries. For instance, most electronic devices, such as computers, are assembled from parts that can interoperate within a single system. These parts comprise many different kinds and are supported by many "industry standards" such as motherboards, chips, memory, keyboard and cables. This process also requires that standards for interfaces be defined to allow disparate sets of parts to be assembled into one system. Some of these standards may be dictated by major vendors, while others may be de facto industry standards.

In software engineering, CBSE may help improve the efficiency of the software development process, reduce maintenance costs and enhance the quality of the resulting product. Recently, CBSE has been adopted by many vendors in technologies such as CORBA, COM+, JavaBeans and Software Agents.

A software component may be defined as "a software element that conforms to a component model and can be independently deployed and composed without modification according to a composition standard." The component model mentioned in this definition refers to the interaction and composition standard. The interaction aspect of the model defines the interface of the component. The composition aspect defines the deployment of the component in terms of installation, configuration and instantiating. While other definitions exist for software component, the recurring characteristics identified by these definitions are independency, interface, context, relationships and the architecture of the component.

CBSE is an approach that helps simplifying complex systems by dividing them into smaller subsystems. Each subsystem may be regarded as a component that can be designed, implemented and tested independently. This approach may exhibit several advantages: the ease of designing and developing large systems, language-independent, reusable, scalable, facilitation of testing and validation, and flexibility.

D. Execution Layer

Generally, the execution layer deals with an executable code of a protocol and depends on services provided by an underlying operating system and a network. All kinds of message exchanges between parties may be performed by a code running at this layer. Protocol code should be loaded as a privileged process by the operating system. This process and its address space may need to be protected against any malicious alteration or termination. To manage the loading and/or running of an executable code, an executable code system manager may be used.

Playing a central and integrative role in the present invention, this layer may include a set of interfaces and control operations. The interfaces are usually responsible for delivering requests and feedback between the external world and the execution layer to, for example, deliver user requests to start or terminate a protocol. The external world may be defined as anything outside of the execution layer, such as a tangible or intangible object, system, action, method, process, etc. Control operations, which may take place at run time, may manage the internal affairs of the execution layer. Internal affairs may be defined as the internal matters, activities, thought processes, operations, etc. within a particular environment, such as the execution layer. Examples include authenticating a user to access a protocol, checking the availability of a protocol, loading or terminating a protocol.

Figure 11:
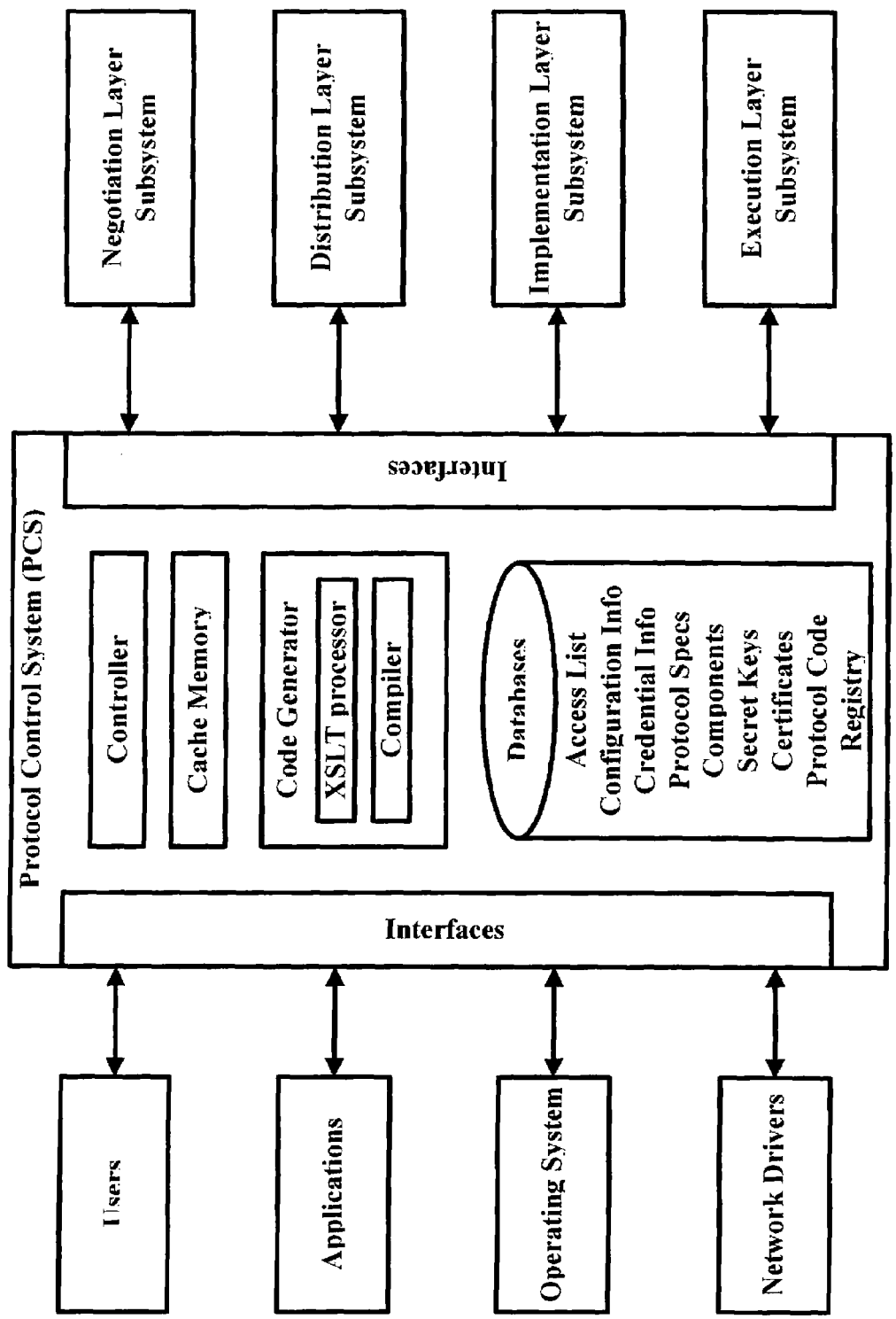
FIG. 11 shows a system architecture.

In this environment, the Protocol Control System (PCS) may control the internal activities and provide several interfaces to connect the layers of the present invention to the external world. FIG. 11 shows one aspect of a proposed system architecture for the implementation of the Meta-Protocol framework. The PCS may include a controller, cache memory, code generator, a set of interfaces, a set of databases (including protocol specifications and components), and a collection of components. These components may be protected by an operating system. There are usually two types of allowable access to the PCS: administrative access and user access. Users may access the PCS to request operations, such as the execution of a protocol or addition of a protocol specification or component. Administrative access may be granted to a few legitimate users for administrative and maintenance tasks, such as registering users, registering a trusted site and changing the configuration of the system (e.g., audit policies). In highly secure environments, administrators may also be classified into several levels according to the environment requirements, such as supervisor, backup only and users' management administrator.

The controller often serves as the core of the PCS. It is generally responsible for the coordination of the internal activities of the system. To maintain the integrity of the system, all types of accesses to the internal subsystems should be limited to the controller. The controller is typically responsible for receiving protocol invocation requests, verification of user's access privileges, configuration management, storage of specification and components, protocol code creation or removal, loading or terminating the execution of a protocol, and auditing operations. Requests for system services may come to the PCS from, for example, a user, the operating system, an application or a network.

The controller may also be responsible for authenticating users to access protocols or modify databases (e.g., for registering, adding or deleting a specification or component). To achieve this task, the controller may need to consult internal or external user directory services and access lists determined by the PCS configuration.

Management of the configuration information may also be part of the responsibility of the controller. Only a supervisor administrator is generally allowed to change the configuration information. Configuration information may include time synchronization source, host identity and address, administrator contacts, maximum disk quota allowed for various system databases, audit policies, and access information to external databases (e.g., locations, user accounts, and access methods).

Important roles of the controller include audit and I/O management. Audit logs may be important for problem analysis and security investigations. I/O services may include handling and protecting inter-process communication, as well as communicating with network interfaces. The interfaces with the execution layer may also maintain their own logs of activities.

The cache memory is basically a temporary memory that may used by the PCS to improve the efficiency of the system. Copies of frequently used protocols, components or security related information (e.g. keys and passwords) may be temporarily stored in this cache to reduce preparation time and to speed up execution of protocols.

The code generator may include two processors: an XSLT processor and a compiler. The code generator may act on behalf of the implementation layer. The XSLT processor may take as input an XSLT stylesheet for a specific programming language and an XPSL protocol specification. The XSLT processor may output source code in the language specified in the XSLT stylesheet. The compiler may convert the source code from the XSLT processor into executable code for the protocol.

The interfaces subsystem may be responsible for facilitating the communication between the external world and the PCS. Multiple types of interfaces (e.g., a user, application, operating system, network, etc.) are often needed. Breaking down the communication of the PCS with the external world into specific interfaces may improve evolution and the scalability of the system. Evolution may be improved by replacing an old version of an interface with a newer one. Scalability may be improved by adding new interfaces as needed (e.g., when a new network driver appears).

A difference between the user interface and the application interface is that the former may be used for the manual access to the system. The latter may be used for automated access. For example, a system administrator who wants to make changes in the system needs a user interface. However, an application that needs to query the system or invoke the execution of a protocol requires an application interface. The operating system interface is typically responsible for coordinating the execution of protocols with the operating system. The network interface is often responsible for remote management of the PCS and for retrieving specifications and components from remote sites.

The database subsystem may manage information needed for the operation of the PCS, such as, though not limited to, users' accounts, access list, secret keys, certificates, XPSL protocol specifications, components, administrative accounts, trusted providers, and a registry. To save system resources, some of these databases may be maintained externally (e.g., LDAP, UDDI, iPlant, and Active Directories). Thus, the PCS may consult these directories and retrieve information as needed. The choice of an external or internal database is part of the configuration process of the PCS; such information may be saved as part of the configuration information.

Figure 13:
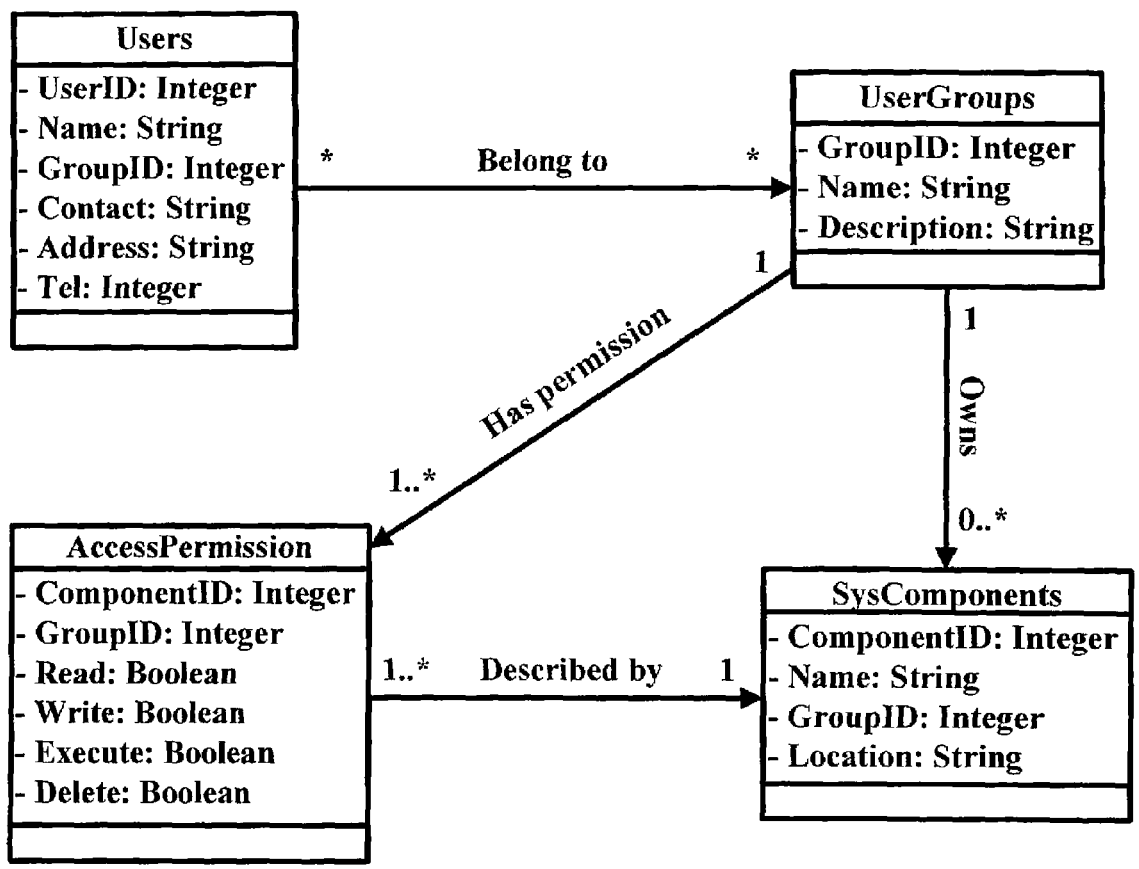
FIG. 13 shows an example of a UML entity class diagram for the access list.

Preferably, the present invention uses an access list and a registry. These two databases tend to be specific to the PCS operation. The access list defines the access permission that each user has to each object (XPSL specification or component) in the system. Each user may have four types of permissions: read (R), write (W), execute (E), and delete (D). A user may also be assigned to a combination of these permissions. FIG. 12 shows an example of an access list. The "*" in the last row of the table stands for "others." A value of "1" in the table indicates permission and value of "0" indicates denial. FIG. 13 shows an example of a Unified Modeling Language (UML) entity class diagram for the access list.

The second database can be the registry. This database may be used to register available objects (specifications or components), their location, provider information, authentication information, and expiration date. This registry can be updated in two ways: automatically or manually. The automatic update may be limited to adding new specifications or components through the on-the-fly process of exchanging protocol specifications. Deleting an object from the registry may be limited to legitimate users (e.g., Administrator). Legitimate users may be allowed to access this registry manually and update it. FIG. 14 shows an example of records in the registry database.

Figure 15:
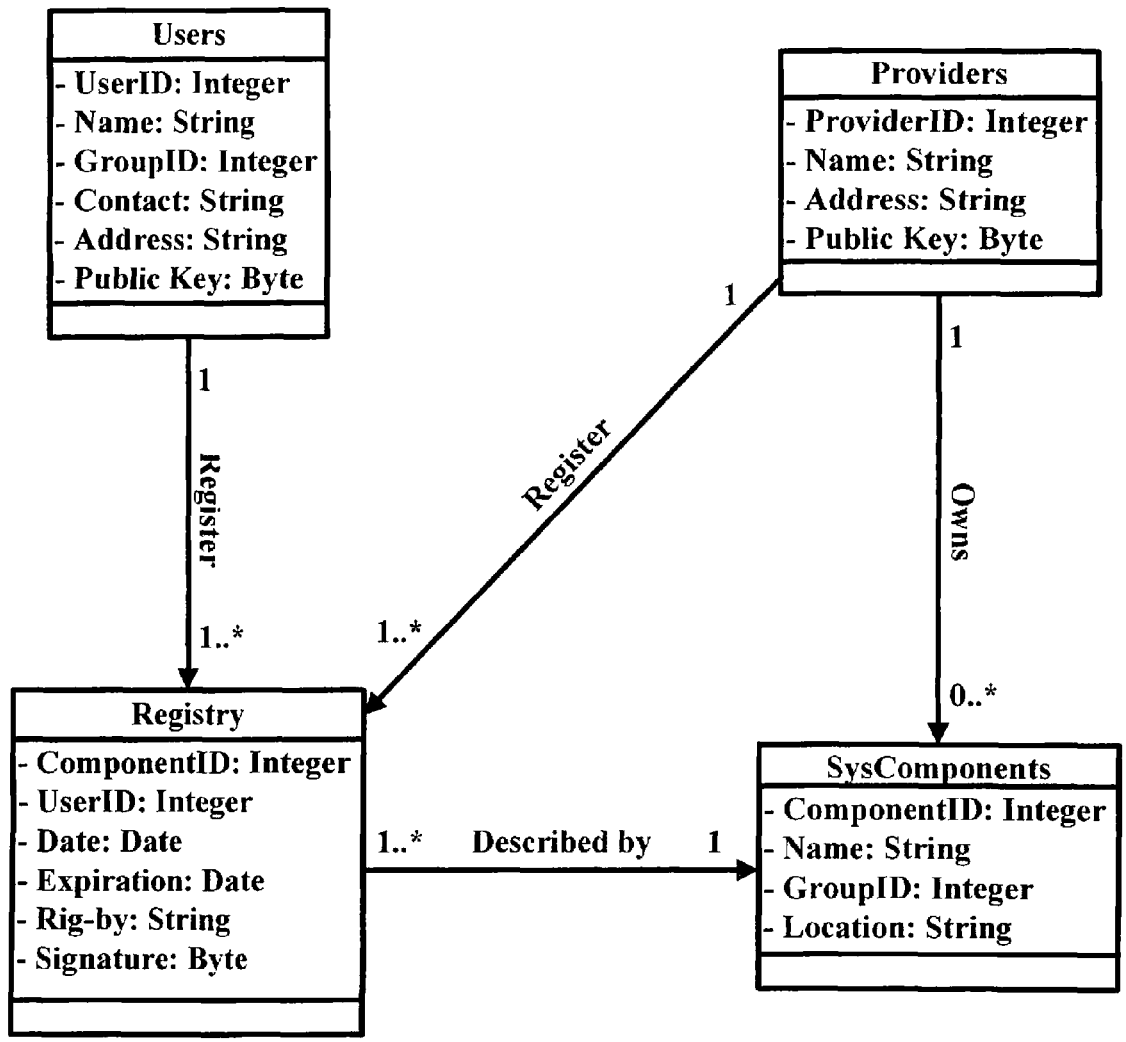
FIG. 15 shows a UML entity class diagram for the registry database.

A registry record may include, inter alia, an object id, object location, identity of a user who registered the object, identity of a provider who created the object, a signature value (e.g., in binary format), and an expiration date and time for the use of the object. FIG. 15 shows a UML entity class diagram for the registry database.

Every component may be an executable program having a design based on CBSE principles. A component can be designed out of a simple operation (e.g., encryption), or it could comprise several components as a compound component (e.g., security envelope). A component may be shared by more than one XPSL protocol specification. On one hand, for example, an RSA encryption algorithm can be a single component. Such a component may be used in a single protocol several times, as well as being shared by many protocols. On the other hand, a component may also comprise several subcomponents. For instance, a security envelope component may include a header processing subcomponent, a MAC subcomponent and an encryption algorithm subcomponent.

The set of all needed components may not need to be stored in every PCS system. Communicating parties can download a code of a component from one system to another if a code is needed but missing from one of the systems. Moreover, components that are needed for a short time period or by a certain process can be deleted from the system after their use. Furthermore, upgrading a component may be easier than upgrading a version of a protocol in the traditional sense. This same concept may also apply to the XPSL specification of protocols, which can be downloaded from one user to another or from a trusted center to the user for temporary usage or for an upgrade.

To protect these components from malicious alteration, they may need to be signed by their authors and checked by the PCS system before being added to the system. As portrayed in FIG. 3, trusted third parties, such as trusted component providers, may place the components in public repositories on the Internet so that users may pull them when needed. Newer versions may also be pushed from trusted providers to subscribed users to keep their systems up-to-date.

Every component may have an interface that specifies its parameters and types. This interface should be published with a description of the component operations so that protocol designers can understand it and use it. Developing interfaces and defining conventions for components, names and functions may be, however, essential for compatibility and interoperability among components in the framework. This development can be achieved in two ways—either by standards development committees or by the fact that a component becomes widely available because a major vendor with global reach supports it. A component should not have several names on different machines because this aspect may create confusion and may prevent PCS systems from locating the correct component. Moreover, duplicates can occur because the PCS may contain several instances of the same components but with different names.

Data objects may also be considered components in the system. Such data objects may be used during the process of writing of protocol specifications. Additionally, such data objects tend to be used to hold values that are common among several components, such as time, security keys, sequence and random numbers, and header information.

One objective of the operation of the PCS is to integrate the layers of the Meta-Protocol framework. Each layer of the framework may be implemented through at least one call for an operation as follows:
1. At least one call for negotiating an operation;
2. At least one call for retrieving a specification or a component;

3. At least one call for generating protocol code (XSLT processing and compilation); and
4. At least one call for execution.

Figure 3:
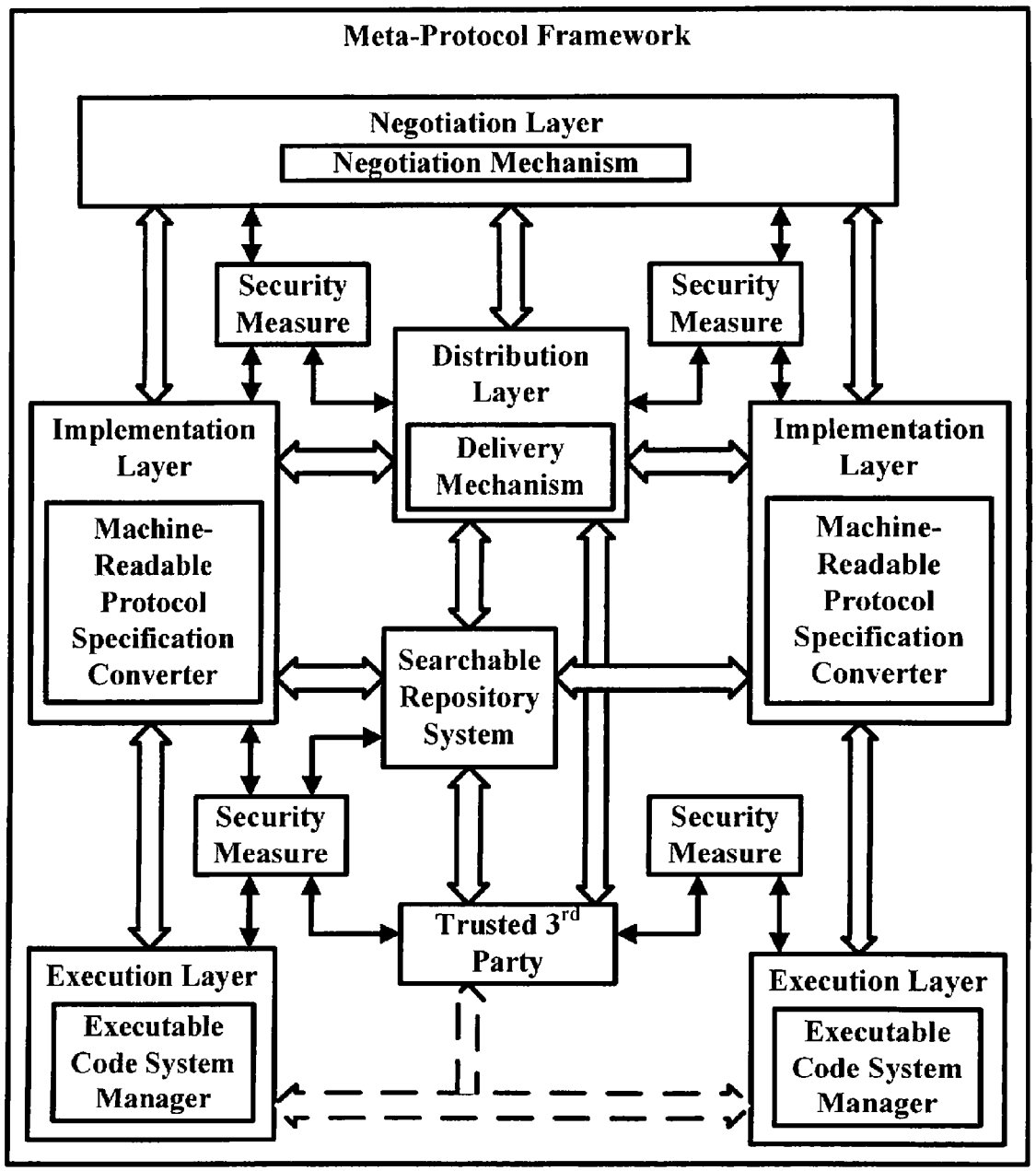
FIG. 3 shows another embodiment as per an aspect of a layered structure of the Meta Protocol framework.

One way that a call may be performed is via a mechanism within a layer as shown in FIG. 3. For example, a negotiation mechanism may negotiate a protocol specification. A delivery mechanism may retrieve a specification or a component. A machine-readable protocol specification converter may generate protocol code. An executable system code manager may conduct execution.

Figure 16:
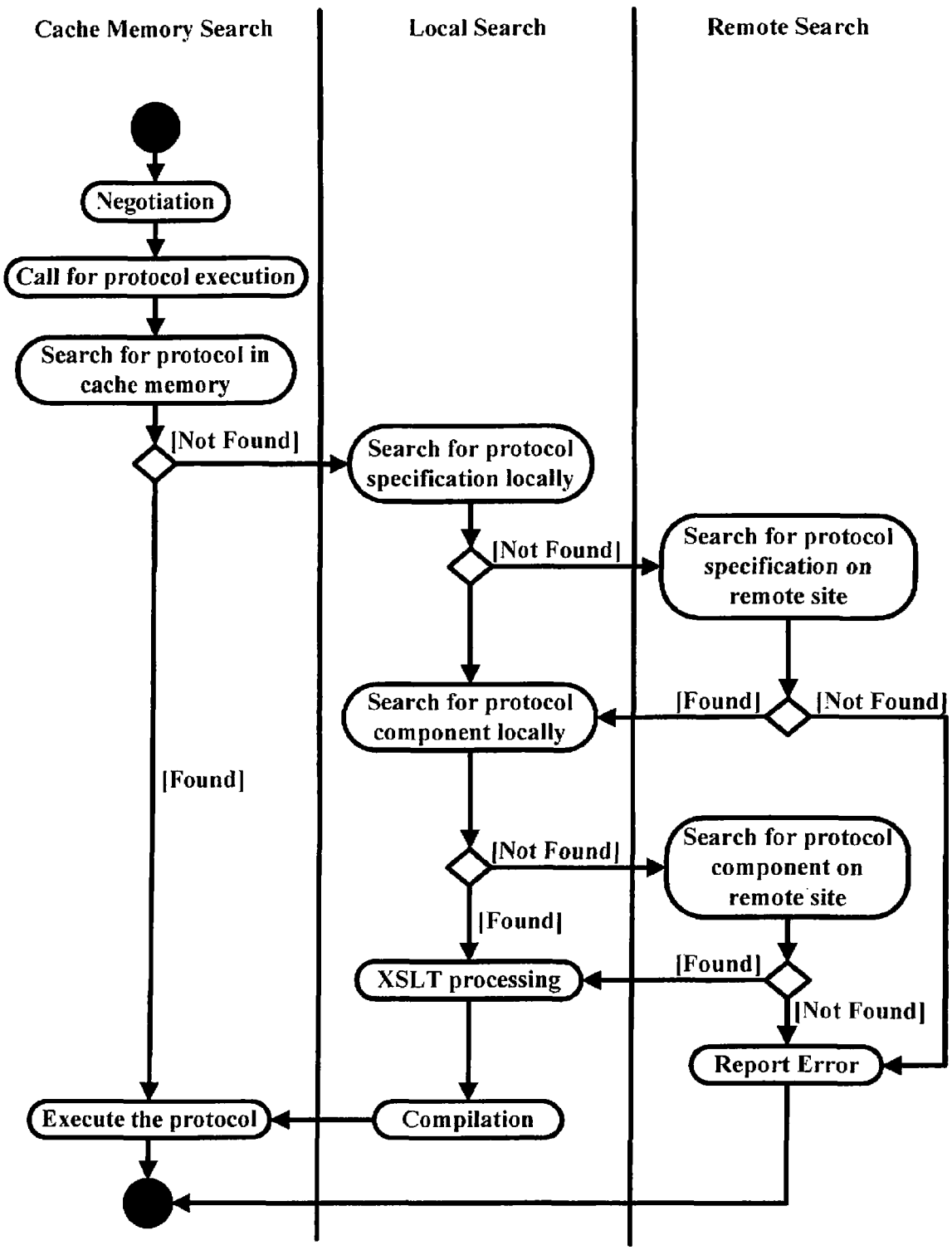
FIG. 16 shows a UML activity diagram for a PCS operation.

FIG. 16 illustrates a UML activity diagram for a PCS operation. This diagram describes how the four layers of the framework can be integrated via implementation of the four calls mentioned above. For simplification purposes, FIG. 16 does not show all the error controls and security checks. Examples of security checks not shown in the diagram include (1) checking user authority to use a protocol, (2) checking authority to access a component and (3) verifying the integrity of the protocol specification and its components.

To exemplify how a PCS may operate, one may consider a typical scenario that starts with a request to run a protocol. The PCS checks locally for the protocol code. If that code is found, the PCS sends that code for execution. If that code is not found, the PCS looks for a specification, transforms the specification into code, and sends it for execution. Otherwise, the PCS uses the location information provided in the request to retrieve the specification. Once the specification is downloaded, the PCS transforms the specification into code and sends the code for execution. The transformation of protocol specifications to code requires the availability of the code of the components mentioned in the specification. If there are missing components, the PCS has to retrieve them from remote locations according to its internal operational policies.

The minimum requirements for any user of the present invention are usually the ISAKMP specification, its components and an XML transformation stylesheet. Again, ISAKMP may be considered the bootstrap of the present invention. Communicating parties may be required to generate code for ISAKMP to be able to agree upon the subsequent protocol they plan to use. Once that agreement is established, the parties may proceed to download the specification of the agreed-upon protocol, generate a code and start communication by running the generated code.

Performance can also be a concern. While actual performance may depend on the implementation of the present invention, some architectural issues may be relevant to performance. In general, the development process of components and protocols should generate optimized code that has reasonable performance compared to traditional protocols. For example, if a specification specifies the services of an SSL protocol, the present invention should be able to generate an implementation of SSL with similar performance characteristics as an implementation generated by traditional means. The code generated by the PCS can be cached in memory for reuse by similar calls to avoid the overhead of regenerating it.

II. XPSL

A. Use of FSMs in Protocol Design

Figure 17:
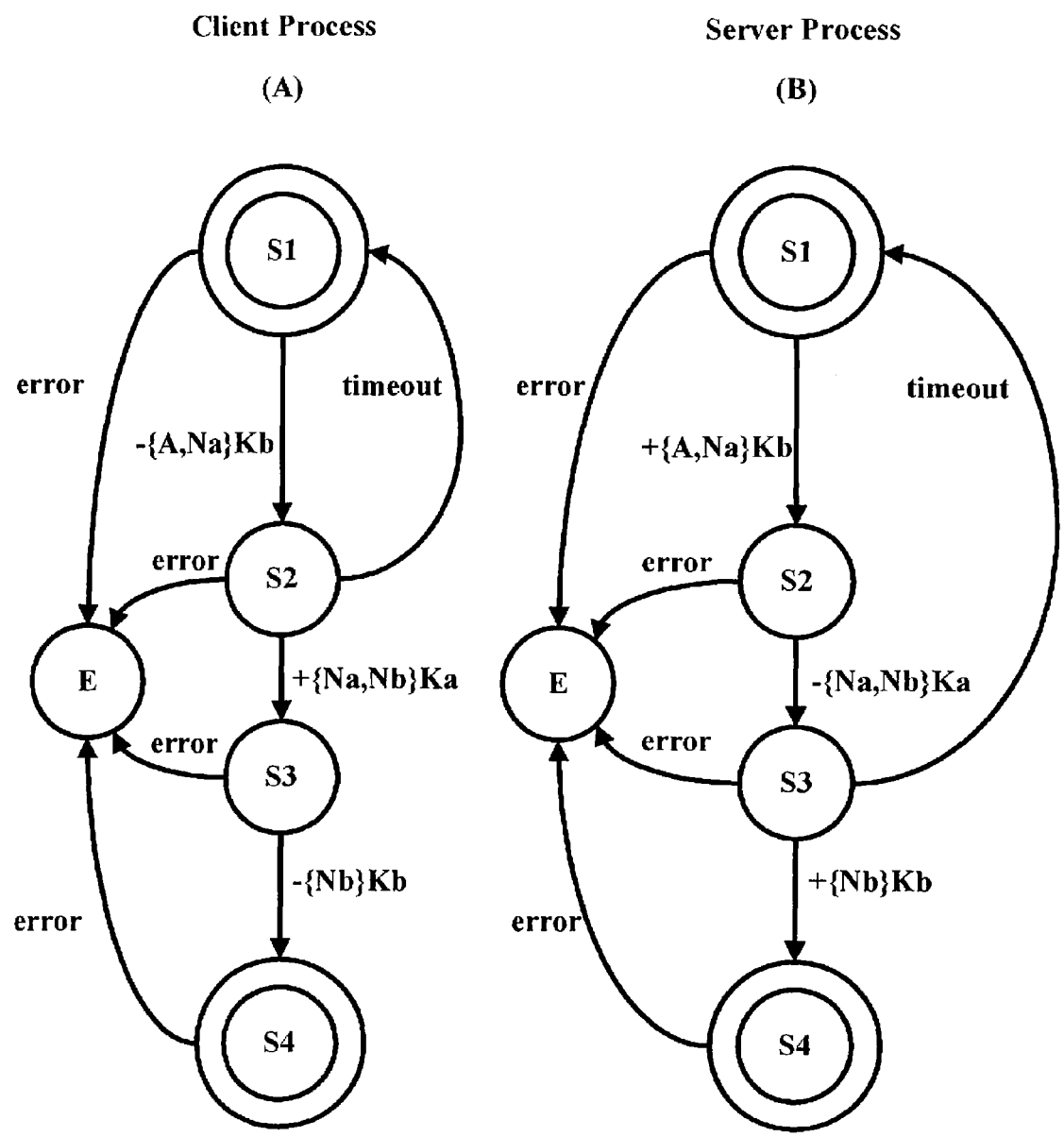
FIG. 17 shows FSM diagrams for the Needham-Schroeder authentication protocol.

FSMs are commonly used for describing protocols. The graphical representation of an FSM may serve as a visual aid to a designer of a protocol. This representation can help in testing and verifying the correctness of the design. An FSM may have a set of states (represented by circles) and a set of transitions between these states (represented by directed arrows connecting the states). At each state, a set of events may occur. Each event may trigger a transition out of a state. Before a transition occurs, a (possibly empty) set of actions may be executed. One of the states in an FSM is often designated the initial state. To portray an FSM, as shown in FIG. 17, one may consider a Needham-Schroeder authentication protocol (NSAP), which is a two-way authentication protocol based on public key cryptography. A client may start the process by using the public key of a server to encrypt his identity and a random number, Na. The server may receive the message, generate a random number, Nb, encrypt the concatenation of Na and Nb using the client's public key, and send the message back to the client. The server's authenticity may be verified if the client successfully retrieves his Na. The client may return Nb encrypted with the server's public key to prove his identity.

A pair of FSMs, one for each communicating party, may specify a protocol. State activities and state transitions may be coordinated between these two FSMs based on message exchanges. Each state machine may keep track of its internal shared state. The machine shared state may hold common information needed by individual states, such as public or shared keys, user identities and access permissions. The termination of the FSM or the final state may be implicitly defined according to the execution sequence.

B. XPSL XML Elements

Figure 18:
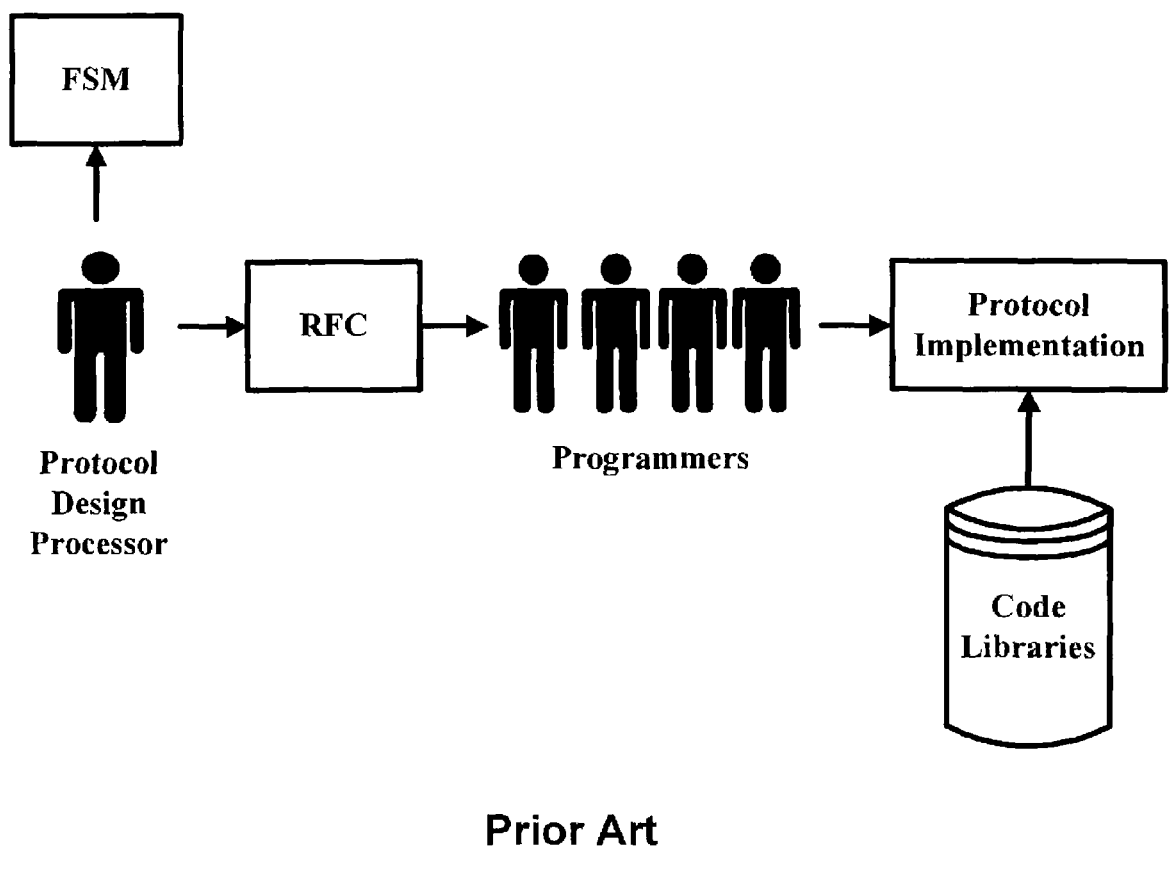
FIG. 18 shows a traditional manual protocol production process.

An essential concept of the present invention is the use of a domain-specific specification language in lieu of technical natural language for the specification of protocols, as in IETF RFCs. This approach may facilitate automatic protocol implementation from specification. FIG. 18 shows the traditional manual production process for protocols. The process can pass through three stages: design, verification, and implementation. The first two stages may produce a specification document. Standard protocols (e.g., TCP/IP, FTP, SSL and IPsec) specifications may be written in natural English (e.g., RFC). Programmers may have to translate these documents into code.

Figure 19:
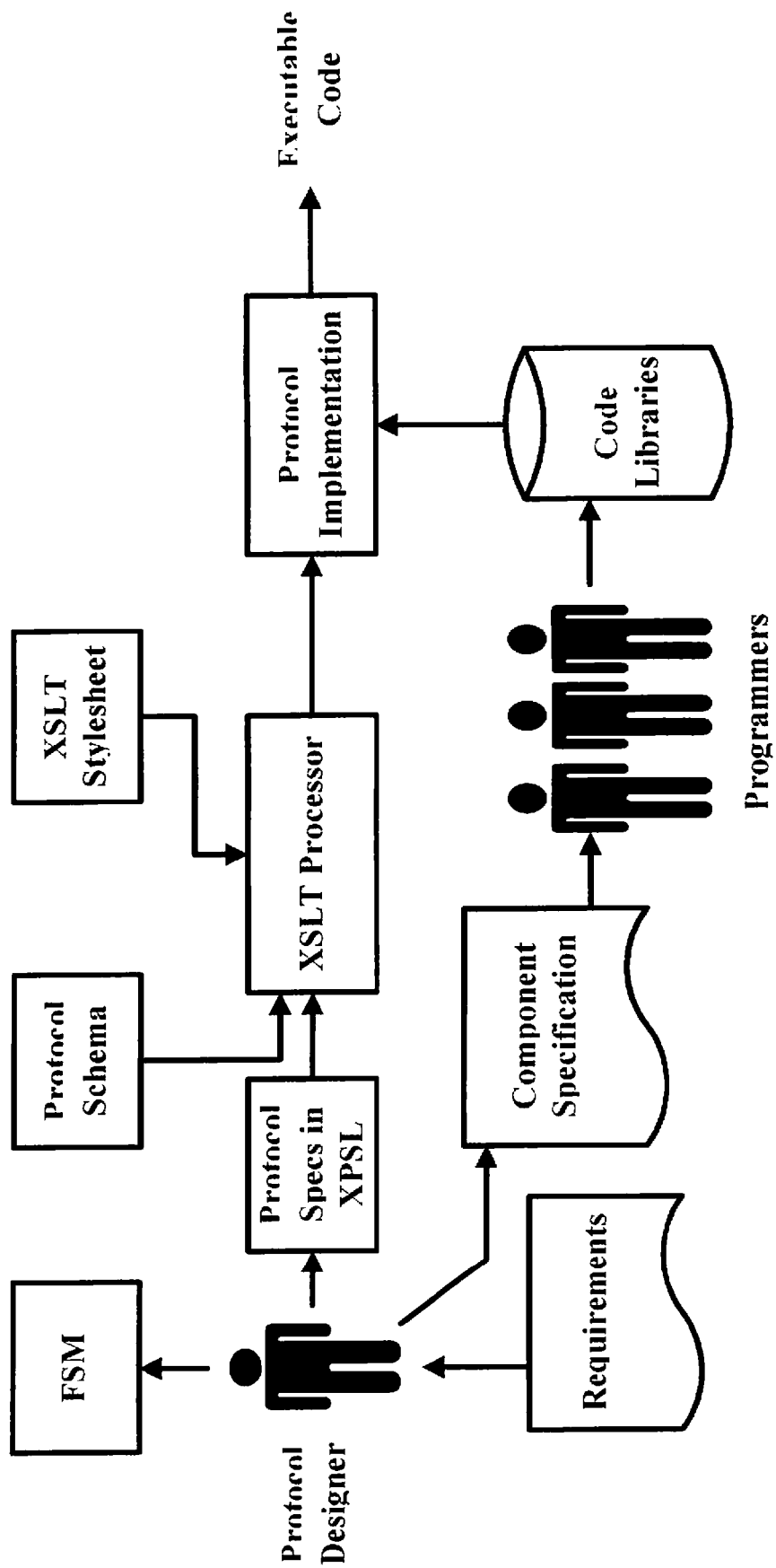
FIG. 19 shows an automated protocol production process.

As illustrated in FIG. 19, the manual design and verification process of the present invention appear similar to the traditional approach. However, the design process may use FSMs to produce protocol specifications in XPSL. These specification documents may have to be well-formed XML documents and may have to comply with the rules specified in the protocol XPSL schema. If both conditions are satisfied, the XSLT stylesheet may automatically produce implementation for the protocol without human intervention. Many different implementations in several programming languages can be developed for the same protocol specification.

For a number of reasons, XML may be used as the basis for a language, which may be called XPSL, to express the specification of protocols. First, XML tends to be an open standard. Second, the tools for handling and processing XML documents and its related technologies are typically mature and widely available. Third, XML is often programming language neutral. Fourth, the XSLT technology usually makes it easy to transform an XML document into any user-preferred programming language.

Figure 20:
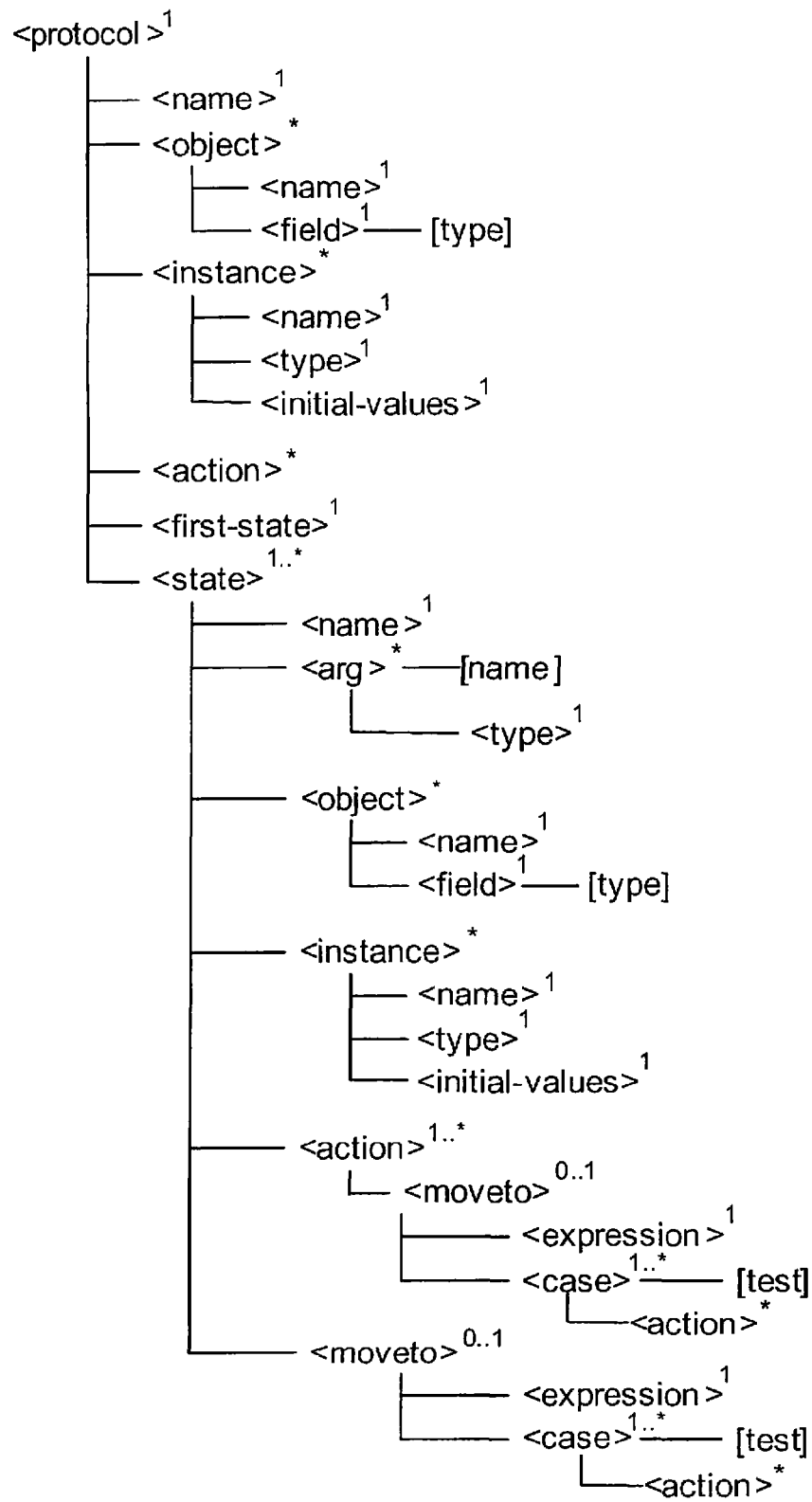
FIG. 20 shows an example of XPSL XML elements.

To specify a protocol executable by a machine under the control of a program of instructions, preferably XPSL, several types of XML elements may be utilized or added. For example, these types include, but are not limited to and are without any particular order, <protocol>, <first-state>, <object>, <instance>, <state>, <action> and <moveto>. FIG. 20 illustrates a tree structure of these XML elements and their relationships with each other. The XML elements are depicted in triangular brackets; the attributes of these elements are shown in square brackets. It is important to note that elements not designated as optional are preferably mandatory.

Figure 21:
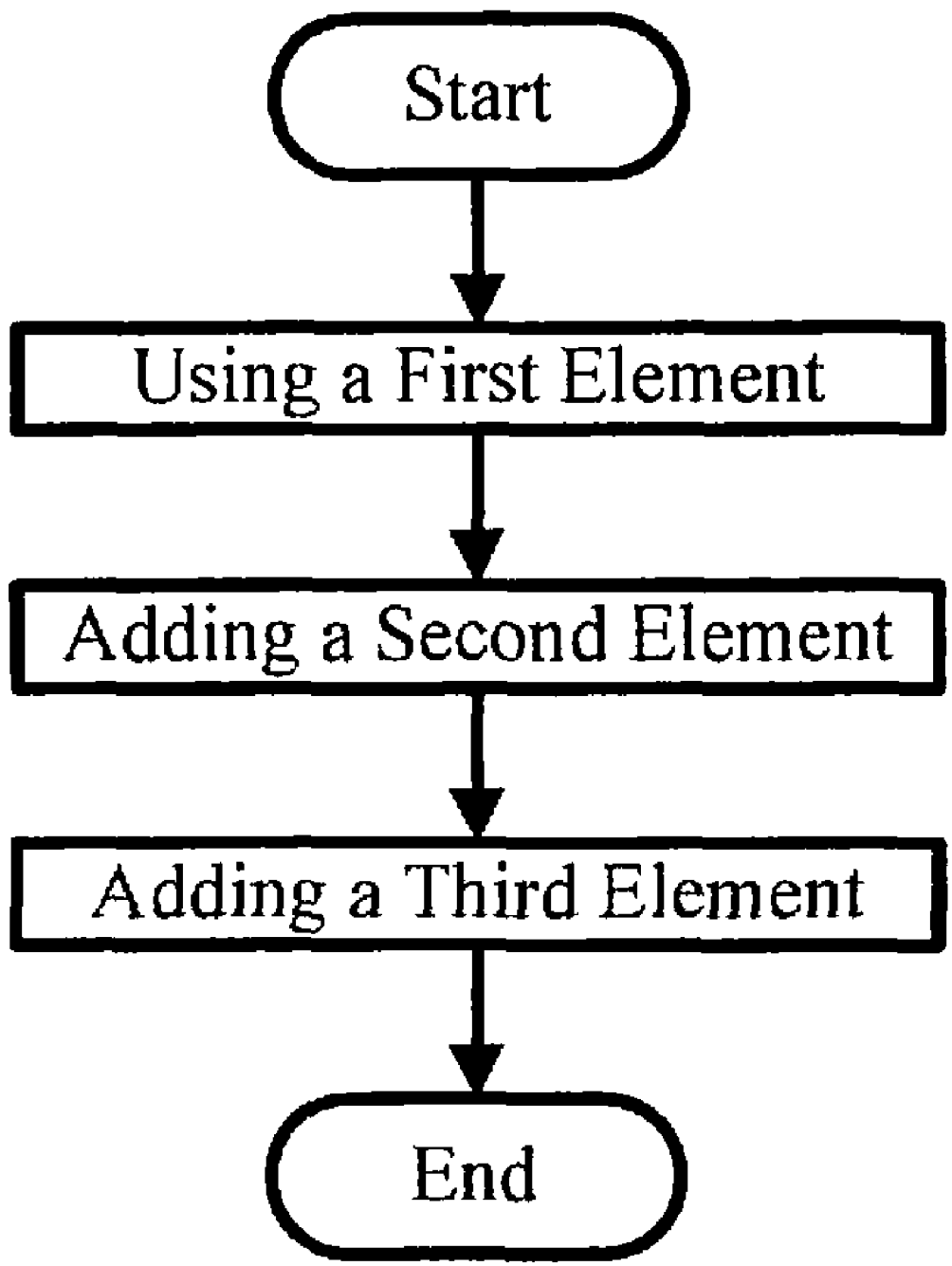
FIG. 21 shows one embodiment as per an aspect of a method for using XPSL.

Referring to FIG. 21, as one embodiment, the basic foundation of the present invention begins with three elements, capable of being encoded in a tangible computer-readable medium readable by a machine. Preferably, a first element used may be a <protocol> element. The <protocol> element may serve as a root element of an XML protocol specification document and is a mandatory element according to the XPSL definition. It may also serve as the parent element of the following elements: <first-state>, <state>, <object>, <instance> and <action>. It should be noted that both <object> and <instance> tend to have a global scope and may be used to prepare objects shared by the states of the protocol.

A second element that may be added is a <first-state> element. Typically a mandatory element, the <first-state> element may be used to identify the starting state of an FSM. The starting state generally serves as the state that produces the "Hello" message to start a communication. This element should occur only once in an XPSL specification given that an FSM can only have one initial state. However, all other elements may have multiple occurrences.

A third element that may be added is a <state> element. The <state> element may describe different states of a protocol. FIG. 22 illustrates an XPSL syntax for NSAP's client state 3. A <state> element may not be able to be nested inside another <state> element. Every state in an FSM ought to be described by exactly one <state> element XPSL.

Staying with this embodiment, a protocol may include at least one protocol specification written in XML. Moreover, a protocol may include a description of a protocol specification language (such as XPSL) specified in an XML schema.

Figure 23:
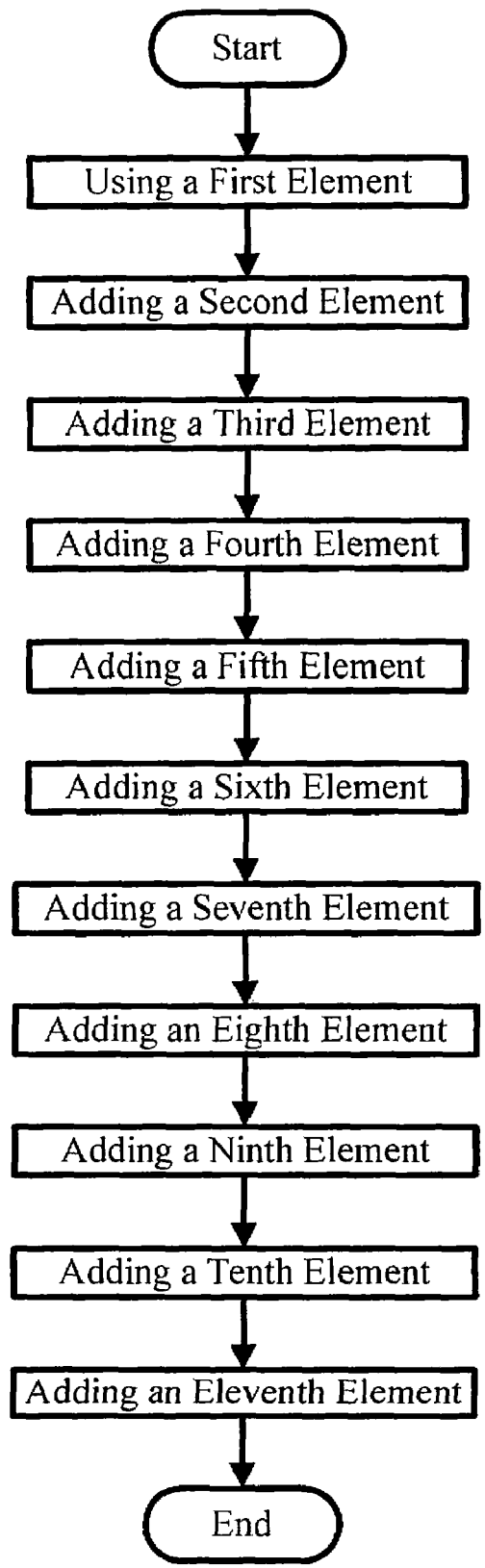
FIG. 23 shows another embodiment as per an aspect of a method for using XPSL.

Additionally, several elements may be added, and used, to extend a machine-readable XPSL for specifying protocols and a method of its integration, into a machine-readable tangible computer-readable medium. A purpose of extension is to address possible requirements of a general XML specification and the process of generating executable code. Such extension may be exemplified in FIG. 23.

Hence, a fourth element that may be added is an <object> element. The <object> element may be used to define data, such as messages, keys, constants and random numbers, needed during protocol operations. Every object may have a name and a set of fields. Every field may have a type attribute associated with a <name> element as later described herein. Data types may include, but are not limited to, predefined types, such as Keys, Strings, Integers and Booleans. Objects may be passed as parameters from one action to another. Exemplified in FIG. 24, an object called SessionState is used to hold shared information between states. Simply, there may not be any public information unless it is defined as an object and passed as a parameter to the actions of a state.

A fifth element that may be added is an <instance> element. The <instance> element is similar to the concept of instance in object-oriented programming; objects may represent definitions of classes and instances may either be the actual realization of the definition or hold actual data. An object may have several instances, as needed. However, every instance may represent one object and there may not be any shared information among instances. For example, an object, called error-message, may be used to create several instances of error messages as needed in the protocol states. Every error message instance may hold different error codes and an identification of the component that generated the message.

FIG. 25 depicts an example of an error message <instance> element. This element includes a name, a type and at least one initial value. This example shows an instance named error with a type CompLib.Error_message, and initial values (0,0, null). The data type definition of this instance may come from a component library called CompLib. This library may also provide interface descriptions for each component to help developers determine the initial values.

A sixth element that may be added is an <action> element. The <action> element may define actions (e.g., calls to components in a library) that take place inside a state. In some cases, elements may be nested inside an <action> element. These situations may occur when a component needs an instantiation of a data object that was not passed to the state for temporary local usage. For example, a seventh element, such as a <moveto> element, may be added and nested inside an action in various situations (e.g., branching out of a state before completing all the actions in a state due to errors). FIG. 26 shows a <moveto> element nested inside an <action> element. This example shows that if the component CompLib.checkRcvSynAck raised an error, the control flow will branch to an error state instead of moving to the next action.

The <moveto> element may act as a switch-case statement in a procedural programming language. This element may provide the mechanism that controls the transitions from one state to another. The <moveto> element may add an eighth element, namely an <expression> element, serving as a logical expression, and a ninth element, namely a <case> element, serving as a list of cases. This logical expression may be evaluated to produce a set of predefined values. A <case> element may point to the next state for each possible value of the expression. FIG. 27 illustrates the XML syntax for a <moveto> element.

A <moveto> element may either be a child of the <state> element or, again, a child of an <action> element. Being a child of an <action> element can provide flexibility for early branching out of the state before finishing all the actions listed in the state. This feature can be useful if an error or timeout is raised by some actions. However, when a <moveto> is used as a child of a state, it may have to be the last element in the state after all the actions.

As another example of an element nested in an <action> element, FIG. 28 shows a case where a nested <instance> element instantiates a random integer object that may be needed locally by a component but was not passed to the state. State local objects should be created locally. But, they should not be passed as parameters to other states.

Referring again to the third element, as depicted in FIG. 20, a <state> element can have one of the following child elements: <object>, <instance>, <action> and <moveto>. A purpose of these elements is to express the operations that may be performed inside every state of the FSM. Typically, the branching out of a state is performed as the last action in a state. However, in a case where an error exists, branching may take place in the middle of the state. Developers should anticipate such cases and place <moveto> elements after the actions that raised such errors.

Furthermore, each <state> element may add an optional tenth element called <arg>, as illustrated in FIG. 22. This child element may describe external objects that are passed to the state. The <arg> element may have a name attribute, the name of the object to be passed to the state and may be followed by a <type> element that describes the type of the object.

Moreover, XPSL and its method of integration may add an optional, eleventh element that is used for identification purposes for any of the above elements. This additional element may be called a <name> element and may be designated as a single or child element. For example, as shown in FIG. 20, the <name> element may be used as a child element of the <protocol> element to help identify the <protocol> element. The XSLT processor may either ignore or replace the <name> element with any other user-supplied identifier.

Figure 29:
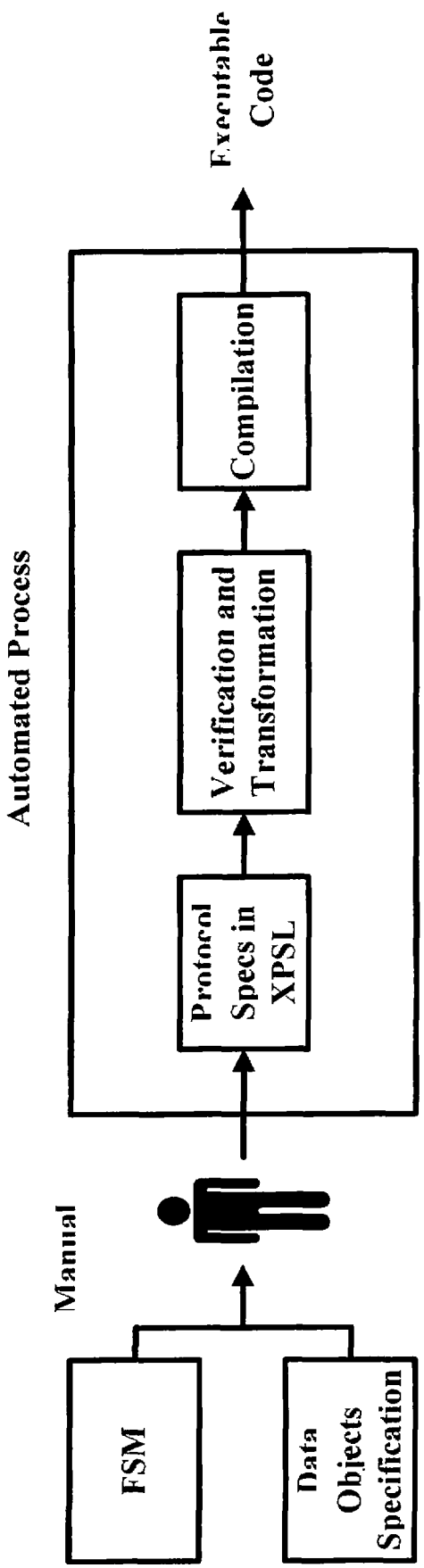
FIG. 29 shows an example of protocol specification and implementation using XPSL.

Writing down XPSL specifications may be generally perceived as a manual process, as illustrated in FIG. 29. In this process, an FSM may be mapped to a set of XML elements. As one embodiment of the present invention, one process of writing down XPSL specifications may follow this sequence:

1. Place the <protocol> element as the root of the XPSL specification document.
2. Add a <name> element as a child of the <protocol> element to specify the name of the protocol.
3. If needed, add a group of elements that prepare the environment (e.g., define public objects as <objects> or <instances>).
4. Add the <first-state> element to specify the starting state of the FSM.
5. For each state in the FSM, insert a <state> element.
    a. Inside each <state> element, add a group of <action> elements to perform the actions required by the state.
    b. At the end of each state, add a <moveto> element to indicate the next state.

Figure 30A:
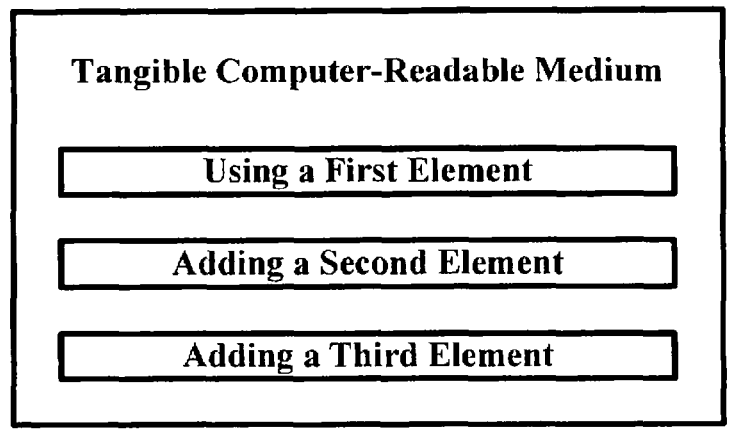
FIG. 30a shows one embodiment as per an aspect of XPSL stored in a tangible computer-readable medium.
Figure 30B:
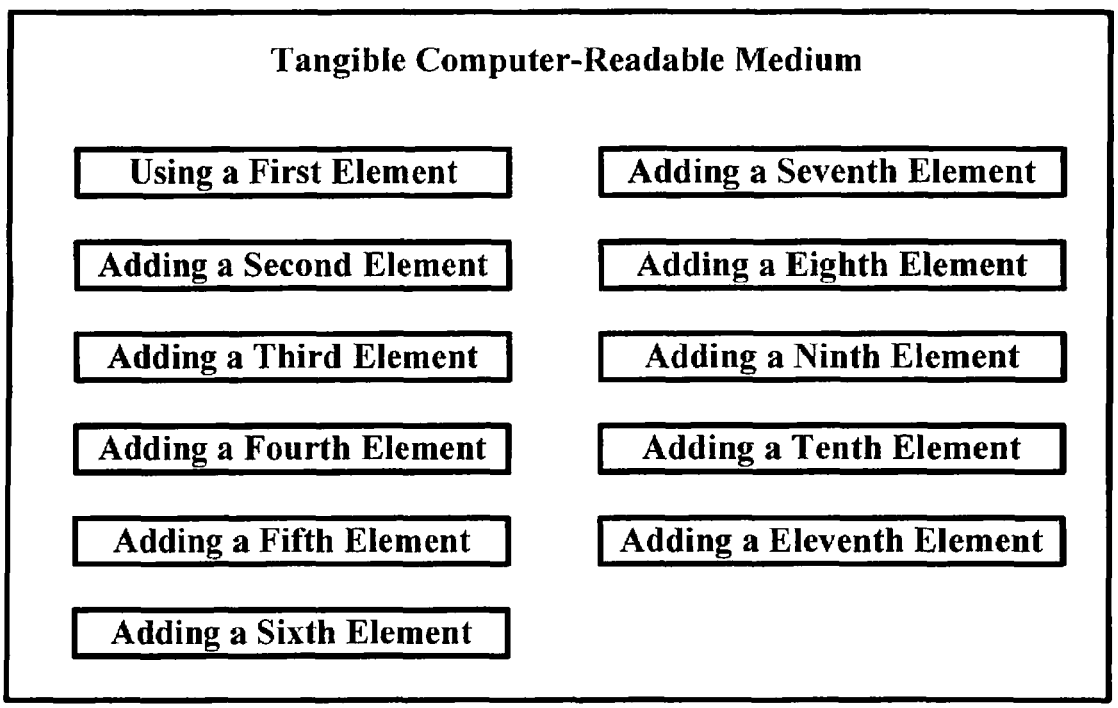
FIG. 30b shows another embodiment as per an aspect of XPSL stored in a tangible computer-readable medium.

XPSL may be stored in a tangible computer-readable medium readable by a machine, as exemplified in FIGS. 30a and 30b. A tangible computer-readable medium includes, but is not limited to, CDs, DVDs, hard drives, floppy disks, random access memory (RAM), read only memory (ROM), flash cards, memory cards, computer chips, cache files, etc. A machine includes, but is not limited to, computers, personal digital assistants (PDAs), phones, CD players, DVD players, cameras, camcorders, etc.

C. Protocol Data Types

Every programming language often follows a specific approach for defining syntax and semantics for data types. XPSL may adopt a minimum common denominator to provide a unified approach to serve the most popular programming languages. This aspect may be addressed by two formats. First, XPSL may support six primitive data types that are common in most programming languages: byte, int, long, char, string and Boolean. FIG. 31a shows a comparison of data types among several programming languages. FIG. 31b shows a set of primitive data types chosen for developing XPSL protocol specifications. Second, using an objected-oriented approach, new data types may be defined in a component library when needed for an XPSL specification.

D. Sufficiency of the Specification Language

The set of XML elements used in XPSL may be sufficient to describe any FSM. For illustrative purposes, all elements of an FSM are mapped into the XPSL specification, and the XPSL specification captures the behavior of an FSM in terms of state transitions. For instance, an FSM F is a tuple $(S, s_0, T)$, where S is a set of states, $s_0$ is the initial state and T is a set of state transitions defined as $T=\{(s, v, c, A) | s, v \in S, c \subset \Omega, A \subseteq \Theta\}$. In addition, a transition $(s, v, c, A)$ is a tuple with two states (the "from" state s and the "to" state v), a condition c from a set of conditions $\Omega$, and a set of actions A from the set of possible actions $\Theta$. The condition c is a Boolean expression whose terms may include occurrence of events (e.g., arrival of a message and timeout) and comparisons including variables (e.g., window size) and constants. Examples of actions include composing and sending messages.

The behavior of an FSM may be defined by the set of rules that determine how the FSM moves from state to state starting from the initial state $s_0$. This behavior may be described by the following algorithm:

```
s ← s_0
repeat
    if ∃ (s, v, c, A) ∈ T | (v ≠ null) ∧ (c = true)
    then s ← v;
            execute actions in A
        else stop
forever
```

This algorithm may start execution from the initial state $s_0$, the current state s at the beginning. Then, all transitions (s, v, c, A) out of the current state may be examined. The one for which the condition c is true may trigger a state transition to state v. Before moving to the next state, all actions in the set A ought to be executed. The next state should then become the current state s. The process may repeat itself until a terminal state (i.e., a state with no outgoing transitions) is reached.

Figure 32B:
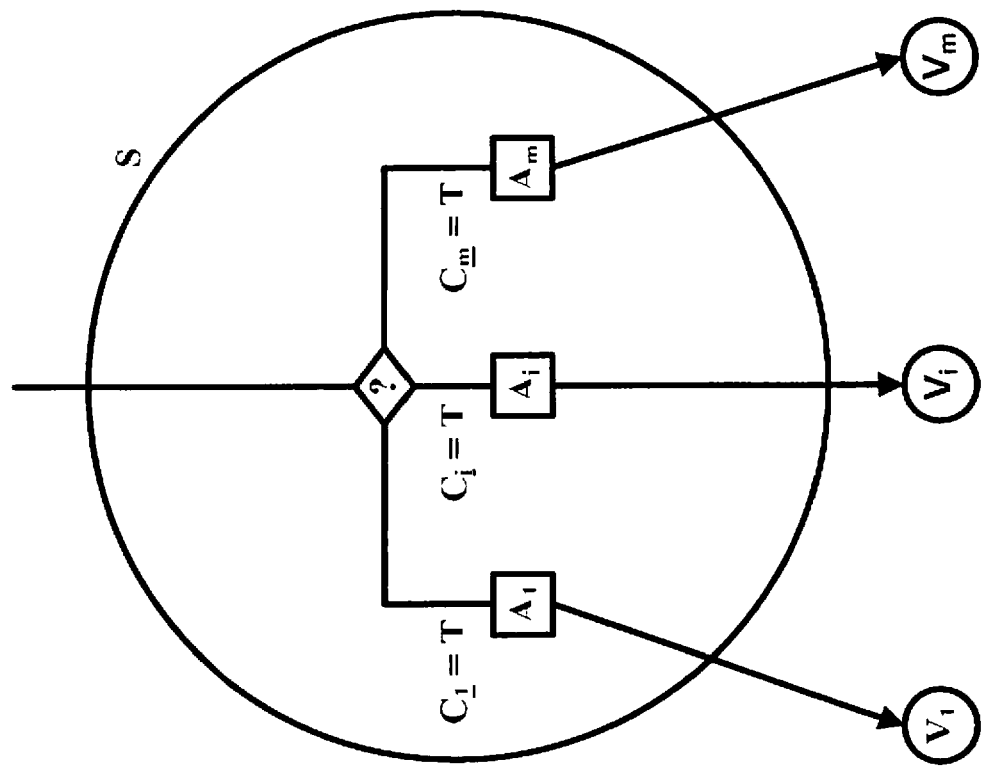
FIG. 32b shows a behaviorally equivalent pictorial representation.
Figure 32A:
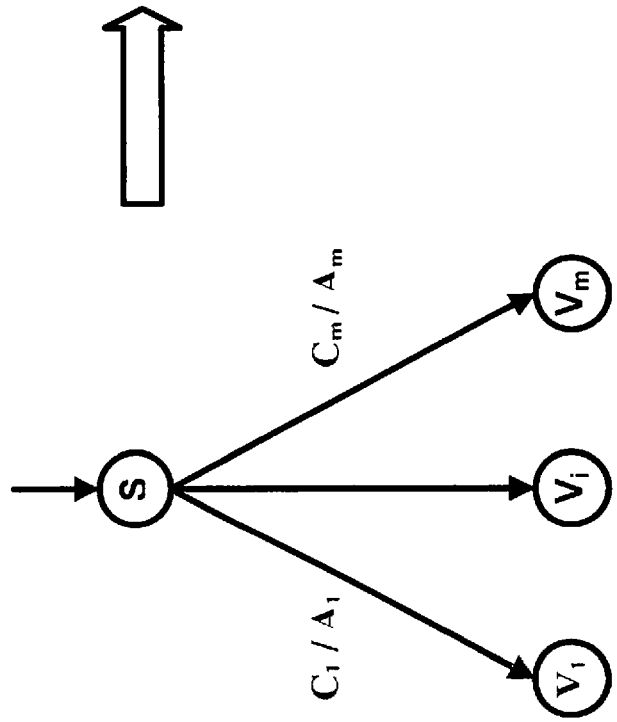
FIG. 32a shows a common pictorial view of an FSM indicating the possible transitions between states.

FIG. 32a exemplifies a common pictorial view of an FSM indicating the possible transitions between state s and states $V_1, \ldots, V_m$. The labels alongside each transition show the condition $c_i$ that may trigger the transition and the set of actions $A_i$ carried out when the transition takes place.

FIG. 32b illustrates a behaviorally equivalent pictorial representation. The decision on what state to move to and the corresponding actions to execute may be shown "inside" the state circle and not along the transition arc. Yet, the behavior should still remain the same. The design of XPSL may be based on the pictorial representation of FIG. 32(b), which is generally equivalent to the FSM representation of FIG. 32(a).

Figure 33:
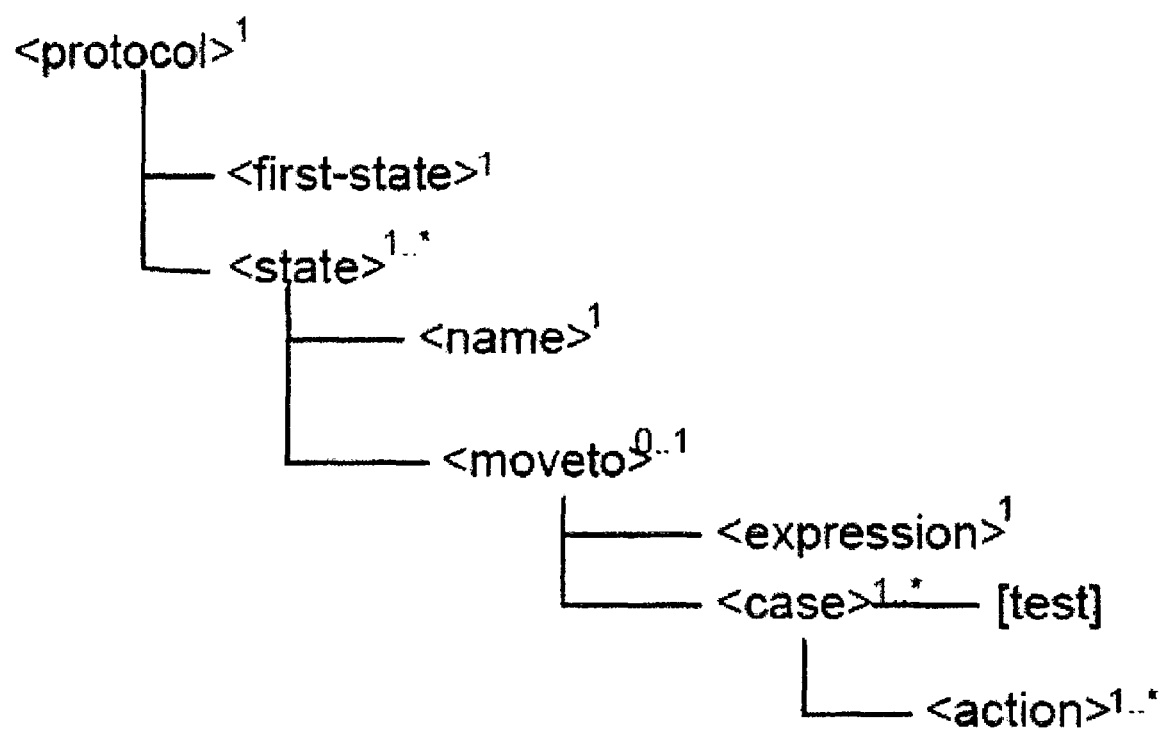
FIG. 33 shows a tree of XML elements corresponding to an FSM.

An FSM may be described with a tree of XML elements as in FIG. 33. The initial state $s_0$ of an FSM is preferably mapped to a <first-state> element and every state in the FSM may be mapped to a <state> element. Every <state> element may have two child elements: a <name> element to identify the state and a <moveto> element that specifies the process of evaluating the conditions and executing the actions associated with each state. The <moveto> element may have two acceptable types of child elements: a single <expression> element and as set of <case> elements. Each <case> element preferably corresponds to a transition in the set T in the FSM in which the "from" state is the state identified by the <name> element and the "to" state is specified by the <case> element.

Because an FSM may have limitations for describing the behavior of programs, the XML tree referenced in FIG. 33 should be extended to address the requirements imposed by the general XML specification and the process of generating executable code. To address these requirements, four XML elements may be added to XPSL: a <name> element to identify the implementation of the protocol, <object> and <instance> elements to define data objects, and an <arg> element to define data objects to be passed to states. Basically, an executable code needs a name to identify the resulted code. Therefore, a <name> element may be added to the specification to identify the generated executable code. This <name> element may be placed as a child of the <protocol> element. Now, since an FSM does not explicitly express data objects, the <object> element may be added to express the types and structure of the data involved in the FSM. In addition, according to the object oriented programming approach, instances tend to be created out of data objects during the execution to hold the actual data. Therefore, an <instance> element may be added to address this requirement. Furthermore, to control the scope of access of objects in the different states, an <arg> element may be added as a child of the <state> element. One purpose of the <arg> element is to facilitate passing data objects to states. FIG. 20 shows a full XPSL as per an aspect of the present invention. FIG. 20 also shows that <action> elements may be allowed under the root element before the <first-state> and under the <state> element before <moveto>. The reason for such design choice is to allow for code optimization. The actions that are placed in these positions are usually common actions required by the protocol or by a state, which result in reducing the repetition of the shared code.

E. The XML Schema for XPSL

Figure 34:
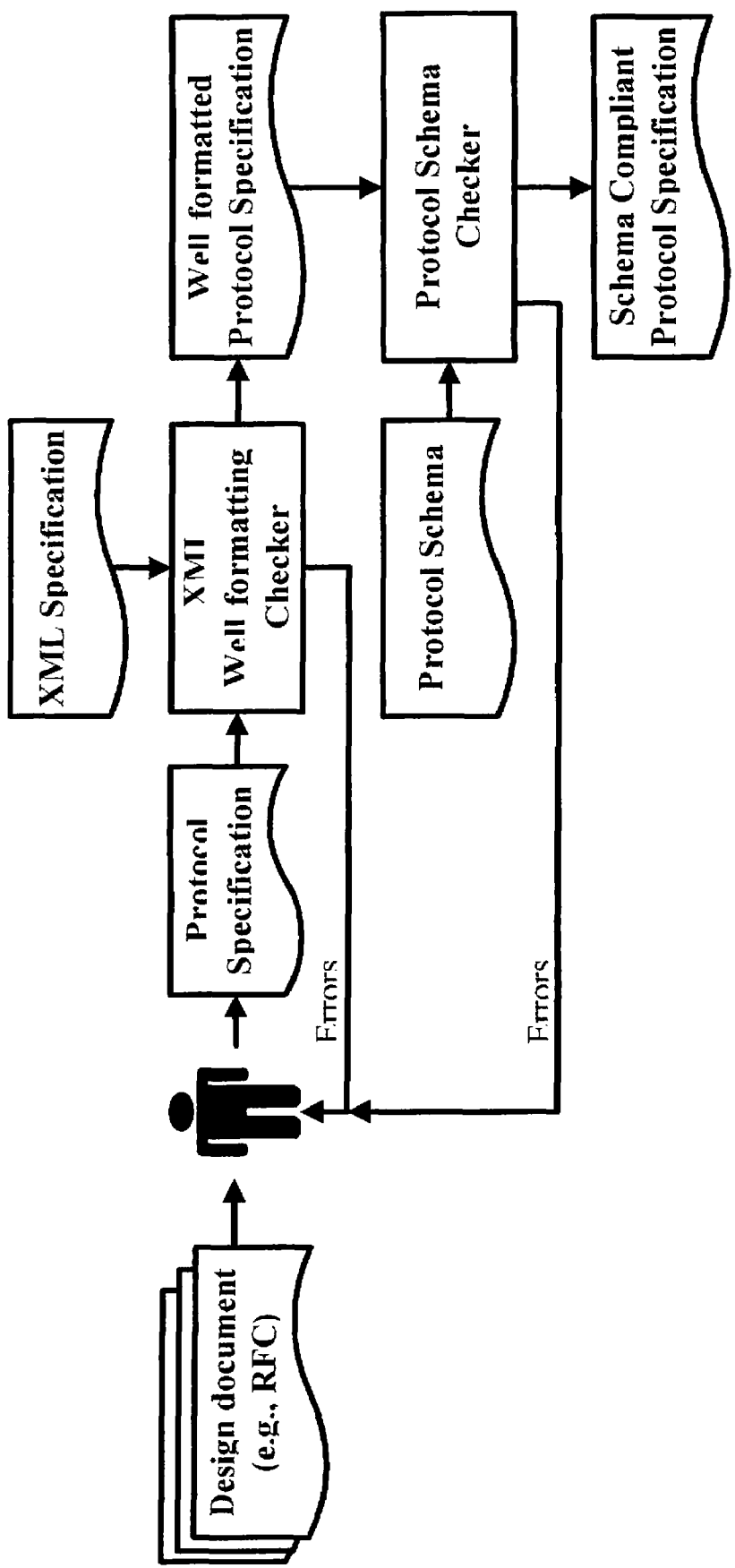
FIG. 34 shows one embodiment as per an aspect of steps required to check a protocol specification.

It is favorable to have an XML schema to enforce XML protocol rules. This schema may be used to validate the syntax of protocol specifications. Generally, the schema prevents developers of XPSL specifications from introducing illegal elements. The schema may also help developers find any missing mandatory elements, such as the <first-state> element, before they run a transformation. The XPSL schema for protocols described using FSMs can be found in the Computer Program Listing Appendix. FIG. 34 shows the steps required to check a protocol specification.

For each element or an attribute in an XPSL protocol specification, there tends to be a corresponding definition or constraint that controls the content of the specification. FIG. 35 highlights the main segment of XPSL's XML schema. Referring to this drawing, the first two lines declare the XML and schema versions followed by the definition of the protocol root element. The root element may contain a <name> element and five references. Each reference may define the allowed content and its cardinality. The minOccurs and maxOccurs constraints may define how many times an element could appear in a protocol specification.

The definitions in FIG. 35 show that a protocol specification may have zero or more objects. Similarly, instances and actions may occur zero or more times. However, as a preferred embodiment, the <first-state> element needs to appear exactly once. Moreover, as another preferred embodiment, the <state> element must appear at least once. Otherwise an error may be signaled.

FIG. 36 exemplifies a definition of an <object> element. This definition indicates that if an <object> element exists, then it should have a <name> element and at least one <field> element. The value in the field element may indicate the name of the field. The field may also have a required attribute that indicates its type. If the value or attributes is missing from the XPSL specification, the XML Schema checker may raise an error. Typically, the XML Schema checkers enforce the permitted data types (e.g., string, int, byte) for a field.

III. Automatic Code Generation

To transform XPSL protocol specifications into code, XSLT may be used. In some cases, only one XSLT is needed to transform the protocol specifications in a given programming language. Every element in an XPSL specification may cause the XSLT processor to produce the required code. An XSLT spreadsheet may be developed to produce Java code from any XPSL protocol specification. This spreadsheet may also be used on several XPSL protocol specifications. For example, Sun Microsystems' XML Pack, which includes an XSLT transformer and an XML Schema checker, may be used. XSLT rules and filters may be used to identify different XML elements, convert them to their corresponding program code and lace them in the proper XSLT output tree. Every programming language tends to require its own XSLT transformation sheet. Once that sheet is available, any protocol specification written in XPSL may be transformed to that language and compiled in an appropriate system. Code for an XSLT spreadsheet may be found in the Computer Program Listing Appendix.

Figure 37:
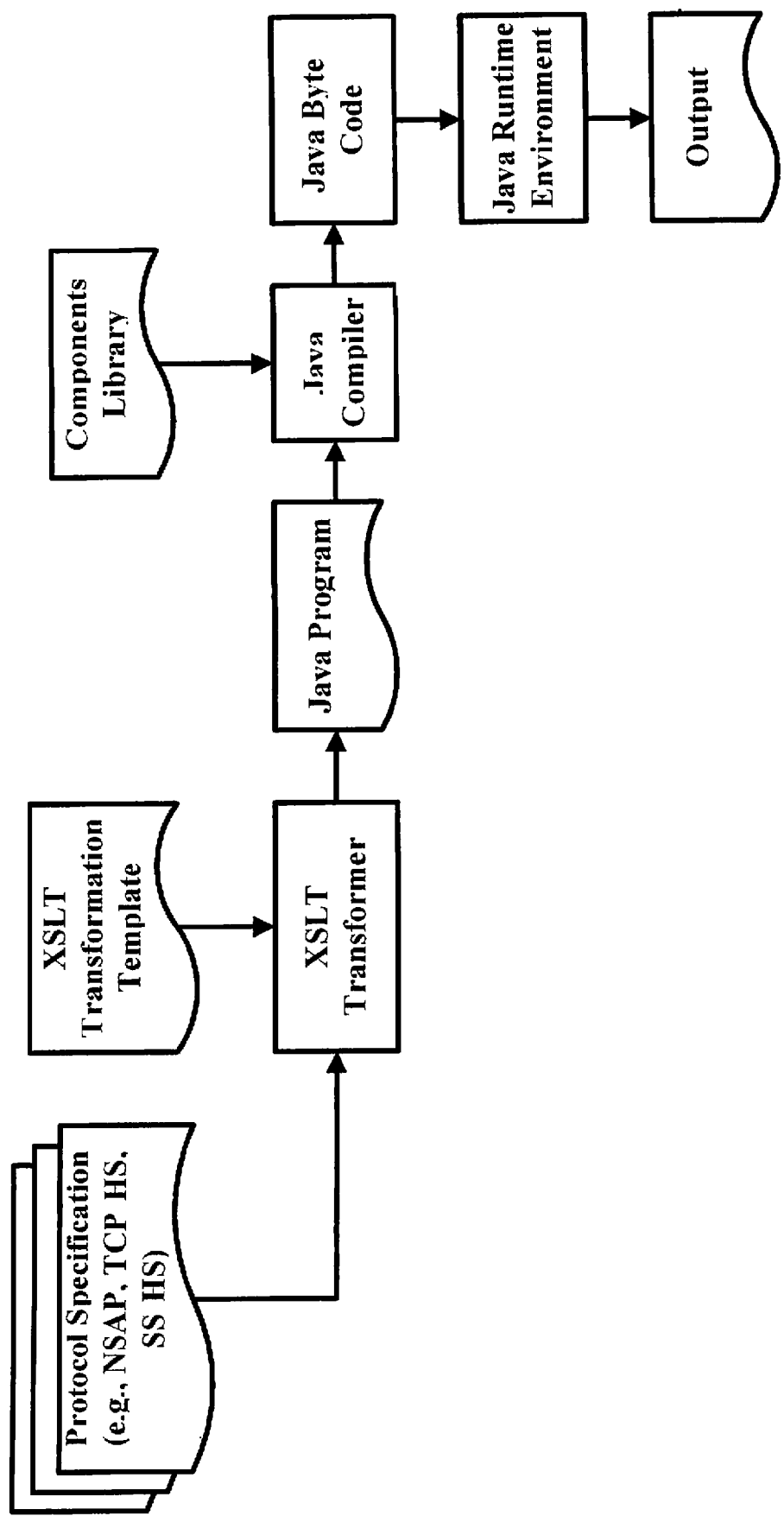
FIG. 37 shows steps required to generate a protocol implementation from an XPSL specification.

As a demonstration, FIG. 37 shows the steps required to generate a protocol implementation from an XPSL specification. Using this approach, any system on the Internet with the proper XSLT stylesheet may be able to download an XPSL specification and use the stylesheet to produce code in the preferred programming language, compile it and run it. For instance, sixteen templates may be used in the Java XSLT stylesheet to transform XPSL specifications to Java code. The XML specifications, the Java XSLT stylesheet and the XML schema that were developed for validation of the XML specifications may be found in the Computer Program Listing Appendix.

A. The Stylesheet Structure

Producing Java code may require writing a main program and a set of classes. The main program is typically responsible for starting the execution. Classes may correspond to either objects or states. Thus, the first few lines in the stylesheet tend to describe the XML version, the stylesheet version, the XPSL name space, and the type of output. FIG. 38 displays such description. The main template can be used to determine the stylesheet's structure. This main template may push to the output a header for the main Java program and may call five other templates: (1) /protocol/name, (2) action, (3) first-state, (4) object and (5) state template. In addition, FIG. 38 also shows declarative instructions and the main template of the stylesheet. From among all templates, which may be found in the Computer Program Listing Appendix, favorable examples include <first-state>, <object> and <instance>.

The <first-state> template often serves as a trivial template that produces the name of an entry point of the state machine. This template may be called once from the main template of the stylesheet. Therefore, as portrayed in FIG. 39, the main Java program may only have one class to call.

The <object> template typically produces code for data objects. As shown in FIG. 40, this template may produce a Java class that defines an object interface and a construct for the instantiation of the data members. This template may be called from the main template or from any state. If it is called from the main template, the object may become a public object. However, if it is called from within a state, it may become local to that state.

The <instance> template, referring to FIG. 41, may cause the transformer to push Java code that corresponds to instantiating an object. The data object, name, type and initial values may be picked up from the XPSL specification and arranged into the appropriate Java code.

FIG. 42 shows the template of an action. A goal of the <action> template is to push out the interface statement of a component as listed in the protocol specification. However, since this element may be nested with other elements, the template may have to test for three cases: instance, moveto or object. If none of these cases exist, the default action may be listing the interface of the component.

The <moveto> template may be responsible for producing a Java switch statement for branching. This template generally calls two other templates: (1) the test part of the Java switch statement, and (2) the expected cases as presented in the protocol specification. The first may be referred to as "expression," whereas the second may be referred to as "case." FIG. 43 identifies an example of a <moveto> template.

The <state> template is similar to the main template. Every <state> template may represent a state of an FSM. Every state may consist of a set of objects, instances, actions, and should end up with a <moveto> statement. The <state> template may produce a Java class that corresponds to an FSM state. Typically, the <moveto> statement comes toward the end of the state to determine the next state. However, in some cases (e.g., errors) control flow may branch earlier. Such cases should be expected by the developer of the protocol specification.

Therefore, the <moveto> statement should be embedded inside an <action> statement. Otherwise, the sequence of operations may be faulty. FIG. 44 shows an example of a <state> template.

B. Protocol Components

Generally, every component has an interface that specifies its parameters and their types. This interface should be published with a description of a component's operations so that protocol designers can understand and use it. Developing interfaces and defining conventions for component names and functions may, however, be essential for compatibility and interoperability among components in a framework. These actions may be achieved either by standard development committees or by the fact that a component becomes widely available because of a major vendor with global reach it supports. A component should not have different names on the same or different machines because doing so may prevent the execution layer of the present invention from locating the correct component.

Data objects may also be considered components. Such data objects may be used during the process of writing protocol specifications. Furthermore, data objects are often used to hold values that are common among several components, such as time, security keys, sequence and random numbers and header information.

C. Performance

An automatically generated implementation may perform similarly to that of a manually generated one. Some performance degradation should be tolerated given that the present invention often provides an extra level of flexibility (e.g., on-the-fly code generation for new protocols) not available in manually generated implementations. It is likely that most performance concerns may be handled if the components used in the implementation generated by the present invention are optimized for performance. Further performance optimizations may be obtained by caching already generated code for reuse.

IV. Validation Experiments

Several experiments may be conducted to demonstrate the feasibility of the present invention. For instance, XPSL may be used to specify NSAP, TCP's three-way handshake, ISAKMP and SSL cipher suite number 16 (SSL#16). Choosing protocols may provide diversity in terms of protocol purpose (e.g., authentication, transport, negotiation, location in the network stack, and complexity). Except for NSAP, which is usually a simple theoretical security protocol that has no practical use unless combined with other security mechanisms (e.g., anti-replay), all other protocols are often used widely in the Internet. Documentation of these experiments may be found in the Computer Program Listing Appendix.

Each experiment preferably has two parts: 1) specification and automatic code generation and 2) execution and verification of the resulting code. These experiments may be designed to test four qualities of the framework: completeness, consistency, correctness, and flexibility. A complete sequence of operations typically includes negotiation, delivery, automatic code generation, and execution. To demonstrate the consistency of the framework, four experiments may be developed according to the Meta-Protocol framework, where an XPSL specification is preferably written for these protocols. This specification may be shared between two remote parties for generating code. ISAKMP's Base Exchange may be used for the negotiation to determine the required subsequent protocol (e.g., the SSL#16).

The correctness of the framework may be validated by testing the correctness of the XPSL specification, the XSLT stylesheet, and the generated code. The correctness of the generated code may be verified by compiling and running the code and checking its output (e.g., values, formats and sequence of messages). Several test cases may be designed to provide adequate coverage of the main paths of the protocol operation. The results of these tests showed that the four protocol implementations compiled correctly and performed according to their specifications.

The flexibility aspect of the framework may be demonstrated by introducing changes into the XPSL specification, such as replacing some components with others that perform different functionality, changing the order of operations, or inserting additional operations into the sequence. In the ISAKMP Base Exchange (BX) experiment, the MD5 secure may be replaced with a Secure Hash Algorithm (SHA). In the SSL experiment, a Data Encryption Standard (DES) encryption may be replaced with Triple-DES (3DES). These changes may require modification of a single line in the XPSL specification. The code generated through the Java XSLT stylesheet may be tested and found to run correctly.

A. The NSAP Experiment

Two processes are generally needed: one for the client and one for the server. The network support may be simulated in the form of files. A process writing to a file may be considered as sending out data to a communication channel. Message receiving events is typically manual. The process may be designed to pause for input when entering every state to give the user the control to coordinate between a client process and a server process. FIG. 45 shows partial Java code of the NSAP, where the code shows Java output of the transformation of the object SessionState.

The generation of the NSAP code typically requires four components developed specifically for NSAP, as well as several other generic components, which are not limited to NSAP and could be shared by many protocols. These specific components include: ComposeNSAClientMsg, ComposeNSAServerRes, DecomposeNSAClienMsg, and DecomposeNSAServerRes. Examples of generic components include Encrypt, Decrypt and Generate_Int_rand.

B. The TCP Handshake Experiment

As one embodiment, this experiment requires a single process because the FSM for TCP given in RFC 793 recommends the use of a single FSM that combines the client and server operations. Therefore, the XPSL protocol specification and the XSLT transformation may produce code that works on behalf of either a client or a server. However, two error states may be added to demonstrate their flexibility.

Figure 46:
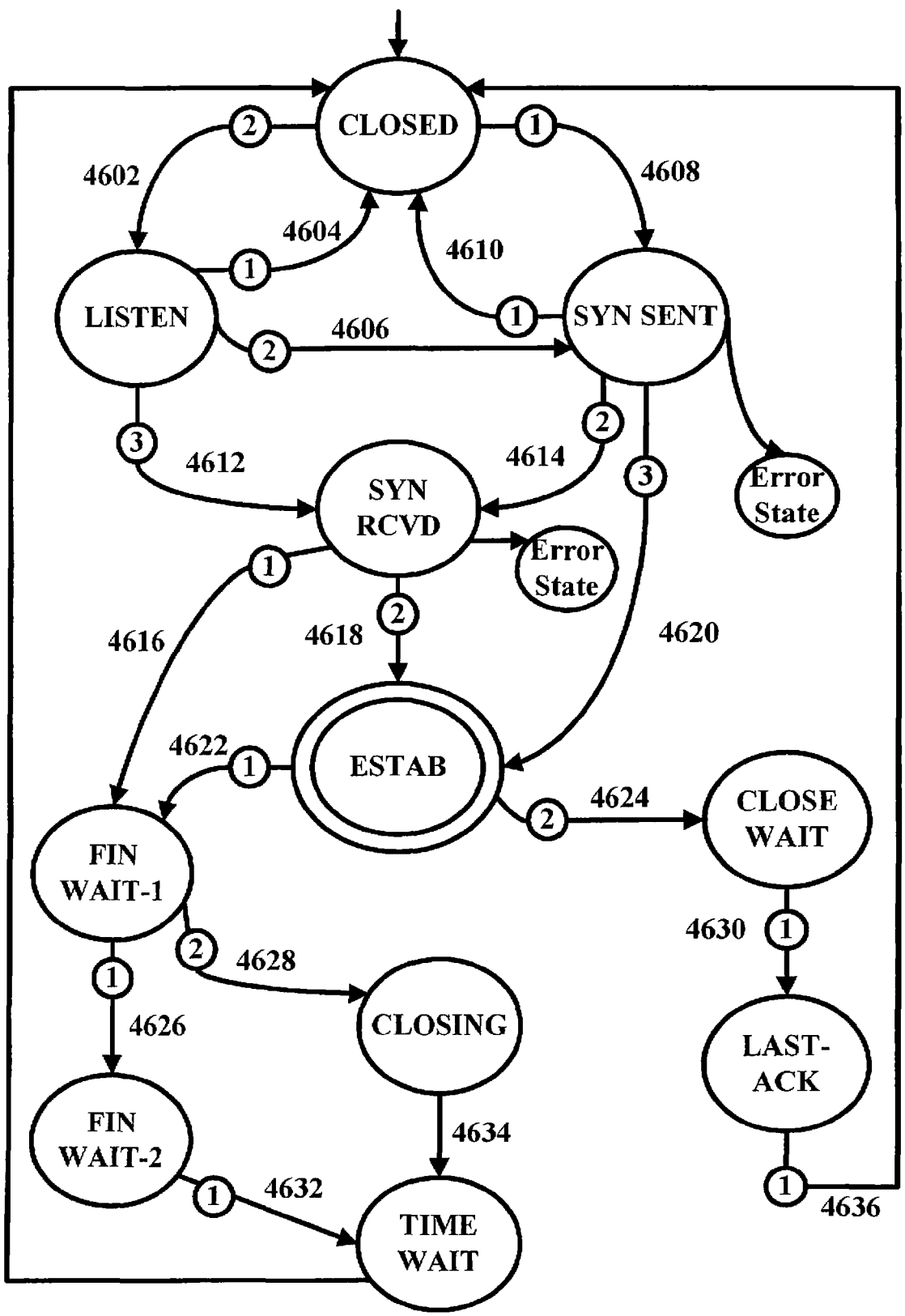
FIG. 46 shows an FSM diagram for TCP handshake.

An example of a TCP Handshake FSM diagram is illustrated in FIG. 46. It includes 13 states. The final state is the ESTAB, where actual data transfer starts between two parties. The first party (a sender) starts a handshake by sending a message containing a SYN bit on and a sequence number. The sequence number is a random number. In this experiment a fixed number is used to simplify readability and verification of the changes. Therefore, the sender's sequence number starts at 3000, and the server's sequence number starts at 5000.

As seen in FIG. 46, the second party (a receiver) receives the SYN message, sends back an ACK message, and moves to a SYN-RCVD state. The ACK message consists of an ACK bit set and two sequence numbers: a new sequence number and the received sequence number after increasing its value by one. When the first party receives the ACK message, it compares the values of its previous sequence number with the received number to verify that both are in sync. If this verification process succeeds, the first party sends another ACK message. In this message, both sequence numbers are advanced by one. If the second party succeeds in receiving and verifying the sequence numbers, the handshake is complete and the data transfer starts. This process may be called "3-way handshake" because it requires three messages to complete the handshake.

The following Table 1 outlines the commands for the FSM diagram for the TCP handshake, as illustrated in FIG. 46.

TABLE 1

Identifier Commands for FSM diagram for TCP Handshake

| Identifier | Command |
|---|---|
| 4602 | Passive open; create TCP Control Block (TCB) |
| 4604 | CLOSE; Delete TCB |
| 4606 | SEND; Send SYN |
| 4608 | Active open; create TCB; Send SYN |
| 4610 | CLOSE; Delete TCB |
| 4612 | Receive SYN; Send SYN, ACK |
| 4614 | Receive SYN; Send ACK |
| 4616 | CLOSE; Send FIN |
| 4618 | Receive ACK of SYN; x |
| 4620 | Receive SYN, ACK; Send ACK |
| 4622 | CLOSE; Send FIN |
| 4624 | Receive RIN; Send ACK |
| 4626 | Receive ACK of FIN; x |
| 4628 | Receive FIN; Send ACK |
| 4630 | CLOSE; Send FIN |
| 4632 | Receive FIN; Send ACK of FIN2 |
| 4634 | Receive ACK of FIN; x |
| 4636 | Receive ACK of FIN2; x |

Two data objects and five components have been designed specifically for this experiment. The first data object may be used to maintain the state of the process. One of its functions is to hold public information: sequence numbers and port numbers. The second data object may be used to construct a TCP datagram. The components may be designed for composing and sending TCP datagrams (sendDatagram), checking the received sequence number (checkAckofSYN and checkRcvSynAck), receiving TCP datagrams and decomposing its information, and printing out datagram information (for testing purposes). TCP datagram fields that have no role in the handshake tend not to be implemented (e.g., URG, data offset, and options).

One example of state transition and exchange of messages to set up a handshake is shown in FIGS. 47a and 47b, respectively. In this exchange, the client starts by sending a SYN message with a SYN bit on and a sequence number of 3000. The server responds with both SYN and ACK bits on, a new sequence number of 5000, and a received sequence number after incrementing it with one. To complete the handshake, the client verifies the numbers and sends back an ACK message and incremented sequence numbers. FIG. 47a shows the branch numbers that the sequence of operations follows, along with the state names. FIG. 47b shows the message contents at each transition. Another scenario is shown in FIGS. 47c and 47d to demonstrate the transition in case an error is introduced in the SynAck message.

The user may be required to run the code twice to develop client-server interaction scenarios on a single machine. This experiment may be more difficult to run and synchronize manually. Therefore, to lessen the difficulty, a testing result sheet showing the expected results for each sequence to be compared with the results obtained in the experiment may be used. For instance, the branches may be labeled with numbers. The user may be prompted during the experiment to choose a branch. FIG. 48 shows an XPSL specification of the first state, the closed state. This state may receive two objects as input parameters. The first object may be called tcb and may maintain the state information of the process. The second object may be an error message requesting the code to be returned. The description of the error message may occur inside the state. The first action in this state may be inserting Java code. This code may be inserted temporarily for the purpose of manual synchronization. Based on this action, the user may choose one of the two branches that the state can move to. This move may be expressed using a <moveto> element. In the first choice, a set of actions may initialize a TCP datagram with proper information and may move to synsent state. However, in the second choice, the control may flow to the listen state without changing the state of the machine. The XPSL specification of the TCP Handshake may be found in the Computer Program Listing Appendix.

The same XSLT stylesheet used in the previous two experiments may be used again to generate Java code. Being able to generate correct code for the three experiments using the same XSLT stylesheet may help demonstrate the power of the XSLT transformation. FIG. 49 lists Java code that may correspond to the specification presented in FIG. 48.

C. ISAKMP Experiment

ISAKMP may be used to implement the negotiation layer of the Meta-Protocol. Once again, FIG. 7b shows an example of an FSM diagram of ISAKMP Base Exchange. Based on this diagram, two XPSL specifications may be developed: one for an initiator and the other for a responder. In addition, components and objects needed for the actions taking place in each of the FSM states were developed. Fourteen new components and five new objects may be added to a component library to implement ISAKMP.

Referring to FIGS. 7a and 7b, the initiator may start by sending a set of proposals. The responder may select one of the proposed protocols and notify the initiator. In the remaining states, both could exchange identification and security-based information to close the agreement.

A comparison between a list of components and objects used in the initiator (i.e., ISAKMP initiator), as exemplified in FIG. 50, and the list mentioned in the XPSL specification for ISAKMP, as depicted in the Computer Program Listing Appendix, shows a high rate of reuse of components. It also may show that a component can be used several times within a protocol, as well as being shared by other protocols. For example, the ErrorState component is used in every state, the SendUDP component is used in states 1 and 3, and CreateNewFile is used in the states 2, 3, and 4. In addition, other components, such as GeneratIntRandomNumber and HashingStringMD5, may also be used.

In the first state of an ISAKMP session, the initiator receives some input parameters from an application: destination IP and port, a secret value to be used in generating cookies, and initiator private, and public RSA keys. These values may then be passed inside an object called ISAKMPFSM. This object may hold all the variables that are publicly required by all the states during a session. FIG. 51 illustrates a data structure of the ISAKMPFSM object.

A goal of the initiator, in the first state, is to prepare a proposal and send it to the responder. This proposal may consist of three parts: payload header, proposed protocol name and location. Again, an example of an ISAKMP initial message may be viewed in FIG. 8. Five components are used to build the client message in the first state: HashingStringMD5, BXcomposeMainHeader, CompLib.BXcomposeProposals, GeneratIntRandomNumber, and BXcomposePayload. The names used for these components indicate their functionality. FIG. 52 shows a Java class that may perform the operation of composing an ISAKMP main header. In this operation, the nine fields of the header may be concatenated into a string of bytes. These fields may have a fixed length. Therefore padding may be needed to adjust the length of each field to a proper size. The resulting string of bytes may then be stored into a file. The proposal payload and the nonce payload may be prepared similarly. When this process is complete, the initiator may send the main header and the payloads to the responder. The UDP protocol may be used for the exchange of these messages in ISAKMP.

A Java class for the send operation, SendUDP, may be represented in FIG. 53. This operation may take as input an array of bytes, the length of the array, destination IP address, and destination port number.

The responder XPSL specification may work similarly compared to that of the initiator but in reverse order. For example, when the initiator sends a message, the responder should receive that message. Most action components are shared by both parties. However, there tends to be two main differences, namely the values they process and some context-specific operations. For instance, cookies and nonces are prepared by the same components (e.g., MD5 and random number), but their values vary because they are generated by two different processes with different input values (e.g., IP address and port numbers for cookies). Examples of context-specific operations include, but are not limited to, preparing proposal payloads and preparing selection payloads. The proposal payload operation may be performed by the initiator; the selection operation may be performed by the responder.

D. The SSL Experiment

1. SSL Handshake Experiment

In this experiment, two processes may be used to represent a client and a server. The user may also be required to synchronize between the two processes manually. The experiment can be limited only to the Handshake protocol. The Record layer protocol and the Alert protocol are generally not part of the experiment. Therefore, the process should stop after generating the shared keys, composing the Finish message and delivering it to the record layer protocol. The record layer protocol may have to use the negotiated set of keys to apply crypto operations and add an SSL header. Also, limited error checking may be implemented. Moreover, the client and the server may read the RSA keys from local files.

Generally, SSL handshake has three objectives: a client and server need to agree on a set of crypto algorithms to be used to protect traffic, agree on a set of shared keys and authenticate each other. The last objective is optional and may be used to authenticate a server to a client. The SSL specification may provide about 32 options for the first objective. Each option may represent a set of algorithms. An example of an option is: TLS_RSA_with_DES_CBC_SHA.

As per one aspect of the present invention, the SSL handshake process follows the following sequence:

1. A client sends a Hello message to a server. This Hello message contains the client's supported ciphers suite and a random number.
2. A server responds with a Hello message, a digital certificate and a ServerHelloDone message. The server Hello message contains the chosen set of ciphers and a random number. The ServerHelloDone is a single byte message indicating that the server has sent all the messages to be sent at this phase.
3. The client sends a KeyExchange message, a ChangeCipherSpec message and a Finish message. The KeyExchange message contains a pre-master_secret (48 bytes consisting of two bytes of the client's version number followed by 46 random bytes). The client uses the server's public key to protect the pre_master_secret. The ChangeCipherSpec is a single byte message to indicate the switch to protected mode. The client also calculates the set of shared keys, which are also used to protect the Finish message. The Finish message is produced by hashing all previous messages exchanged by the client and server.
4. The Server uses the pre-master_secret and random numbers to generate the shared keys. The server sends a ChangeCipherSpec message and a Finish message.

Figure 55:
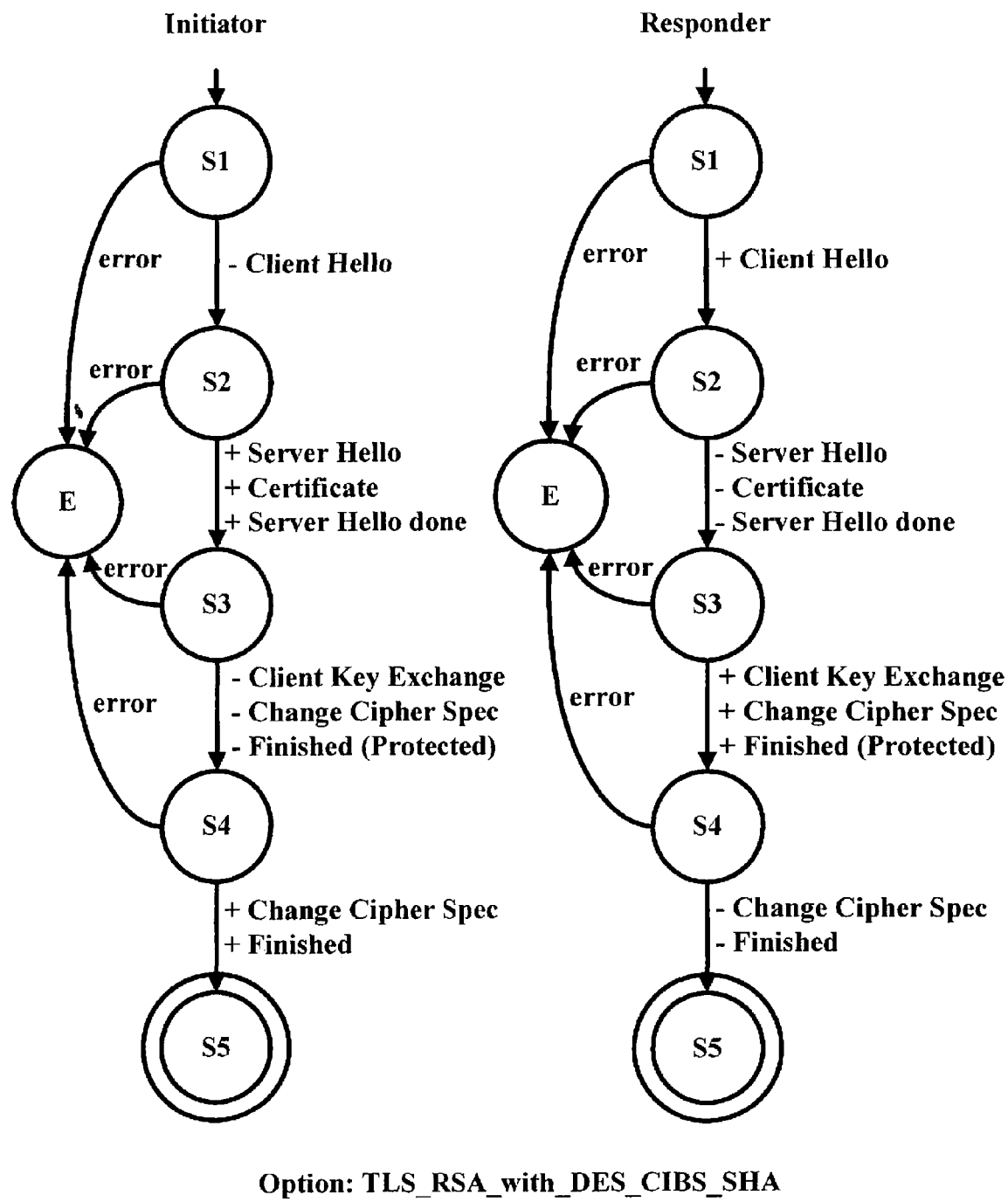
FIG. 55 shows an FSM diagram for SSL Handshake.

FIG. 54 shows a SSL Handshake sequence of messages in notation form, and FIG. 55 shows embodied sequences of states in FSM form. One way of performing this experiment is to develop 19 components to carry out operations. The calculation of the keys may be done according to the specification given in RFC2246, TLS protocol version 1.0.

The XPSL protocol specification may follow the sequence shown in the FSM. The state of the machine is maintained in an object called SessionState. FIG. 56 shows an XPSL specification of the SessionState object of a client process. This object may include version numbers, session id, the RSA keys file names, and a set of shared keys to be used to protect the traffic of a session.

FIG. 57 shows an XPSL specification of the first state of a client process. Two parameters may be passed to this state: a SessionState object and an Error_message object. The Error_message object may be used to return an error code in case of error inside the state. This state may start with the creation of an instance of ClientHello object and initialization with proper values from the SessionState object. A random number may be generated using the component IntObject, which may return an integer random number. The ClientHello message, which may be composed by the content of the ClientHello object, may be sent to the server.

FIG. 58 shows the first state of an SSL server process. In this state, another ClientHello object may be instantiated. A component, CompLib.SSLReadClientHello, may be used to read a received ClientHello message and load its content to the ClientHello object. The SessionState object may be updated accordingly. For simplification, the code shown in FIGS. 57 and 58 may not include some actions used for synchronization and user help. As one aspect, the XPSL specification for SSL is presented in the Computer Program Listing Appendix.

The Java code corresponding to the specification shown in FIGS. 57 and 58 is shown in FIGS. 59 and 60, respectively. This code may be generated using the same XSLT Stylesheet used in the three previously presented experiments.

The component library may provide a component, called createKey, that generates a pair of RSA keys. Generally, this component has to be executed before running the client and server processes. It may take as input a) two file names, one for the public key and the other for the private key, and b) a password to protect the private key. These file names may have to be included in the specification of the protocol before generating the code of the experiment.

2. SSL #16 Experiment

Here, again, two processes may be used to represent a client and a server. As one embodiment, the SSL record layer protocol has to use the negotiated set of keys in the handshake phase to apply the crypto operations and add the SSL header. The SSL may have 32 options, where each option may represent a set of cryptographic algorithms. The operation may be limited to a single option: TSA_RSA_with_DES_CBC_SHA. Moreover, 44 components including 9 data objects may be developed to carry out the operations of SSL#16.

Figure 61:
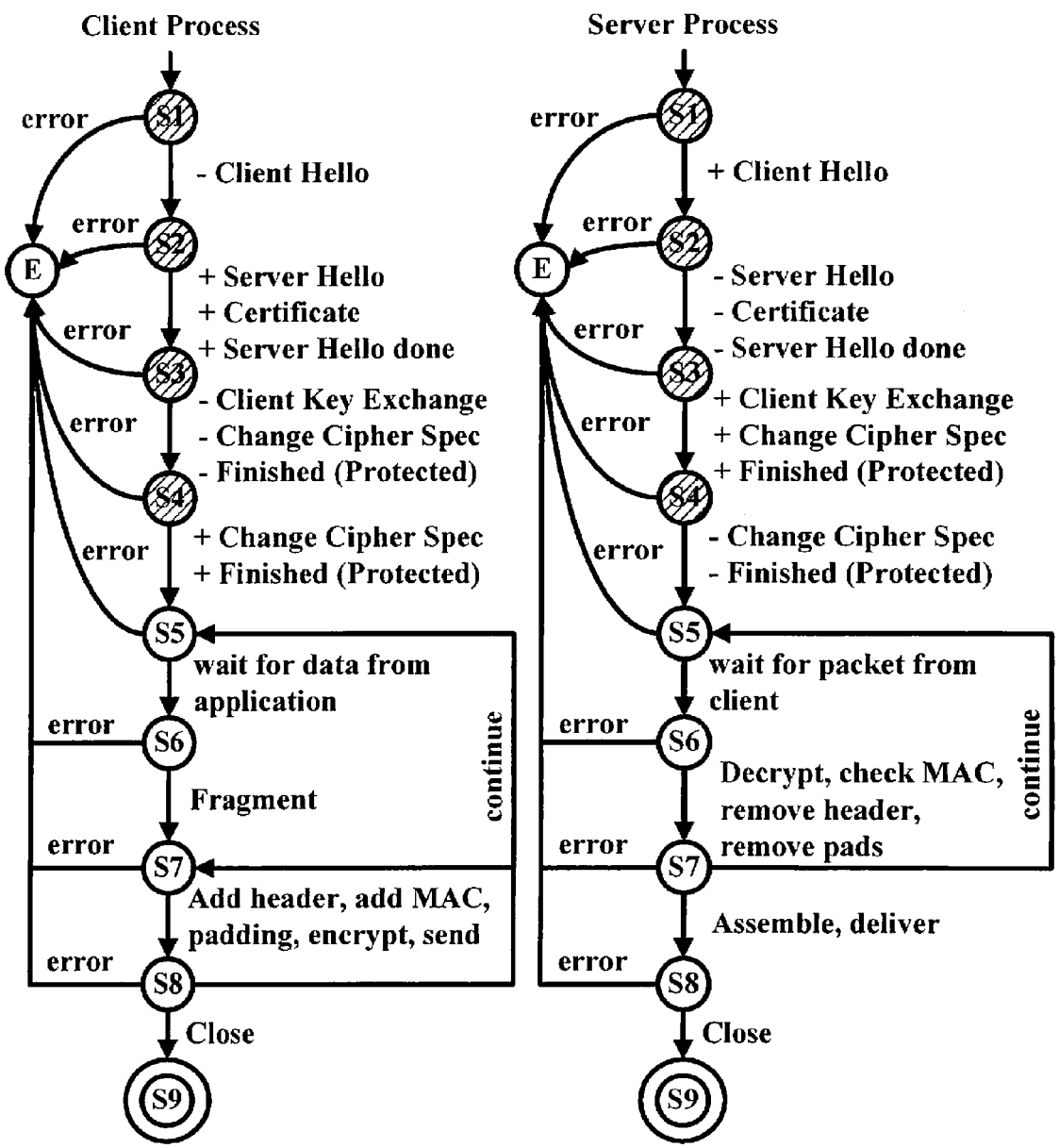
FIG. 61 shows FSM diagrams for an XSPL SSL protocol.

The experiment here is an extension to the SSL Handshake experiment. Five new states may be added to the XPSL specification used in the SSL handshake. FIG. 61 shows an expanded SSL FSM. The states used in the handshake are shaded with diagonal lines and the other states are clear. This part of the experiment also tends to show how easy it may be to extend or shrink some protocol specifications by simply adding more states or components or removing them from the specification. FIG. 61 also shows this sequence of operations in an FSM diagram.

An example of the XPSL specification for SSL#16 is listed in the Computer Program Listing Appendix. Twenty-five components, including 9 data object types, may be developed according to the SSL specification RFC2246 to simplify demonstration and verification. The list of components and data object types is among the components library in the Computer Program Listing Appendix.

It is important to note that this experiment ignores the implementation of many checks (e.g., errors, resource availability, or data types and ranges validations) because such checks may complicate the experiment and verification process. However, one skilled in the art would recognize that such features are needed in real life, and would preferably include such checks to address real life scenarios. In addition, except for the network (TCP), interfaces to application and the operating system are not implemented. TCP may be used to demonstrate that the experiment can run over a network. However, to include these interfaces, a user may manually manage such operations in the experiment.

Since the first four states of the SSL#16 have been described in SSL Handshake, this section describes the remaining five states. In these states, the client and the server may use shared keys developed during the handshake to exchange application data. These keys may be held in an object called SSLSessionState. The structure of the SSLSessionState may be shown in FIG. 62 using Java-like code. This data object may be instantiated at the beginning of each session with null values. During the handshake process the values may be generated and stored for later use by any component during the session.

a. The Client Process

Figure 64:
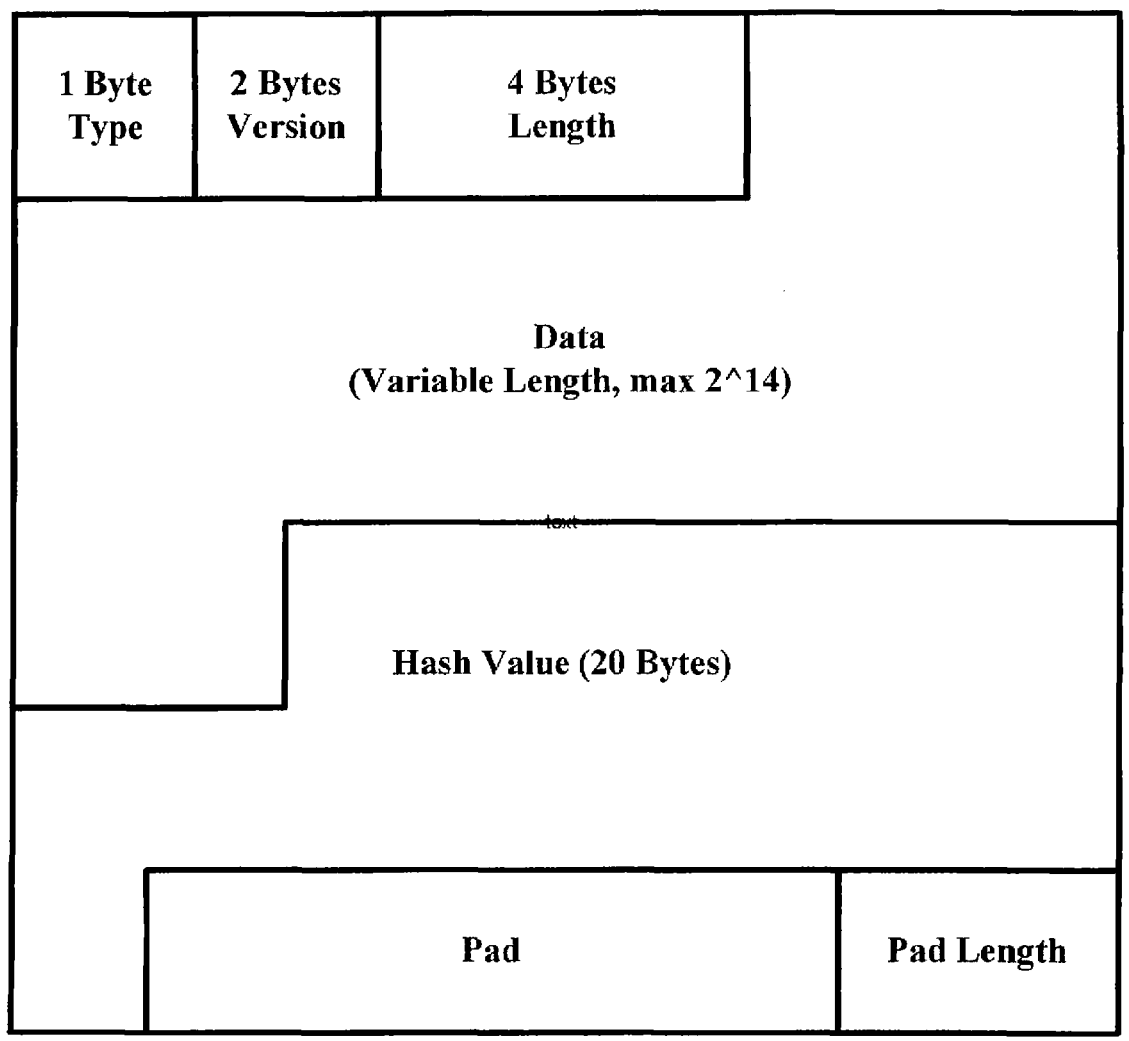
FIG. 64 shows a format of an SSL packet.

This experiment may implement a transfer of files from a client to a server. Implementing the other way around is generally straightforward and can be achieved in two ways: either by switching the XPSL specification or adding the components that are responsible for sending files to the XPSL specification of the server. The client FSM, shown in FIG. 61, may have two loops at states 5, 7 and 8. Each iteration of the first loop may be responsible for transferring a single file. The second loop may be responsible for fragmenting large file sizes (greater than 2^14). However, when it is preferred to simplify the output of the verification process, the second loop is not implemented. SSL#16 secure session may start the process of protecting application data at state 5. At this state, the client may request a file name from the user of the experiment. The file may have to be located in the home directory of the experiment programs. At state 7, the client may load the file, produce an SHA1 hash value, append the hash value to the file, add the SSL header, encrypt the file using DES, and send the encrypted file to the server. FIG. 63 illustrates the list of actions in the XPSL specification of state 7. FIG. 64 shows the format of an SSL packet that is prepared by the client for transfer.

b. The Server Process

FIG. 61 and the Computer Program Listing Appendix show the FSM and the XPSL specification of a server process, respectively. After the handshake is complete, the server process may wait for TCP connections. TCP listen socket may be implemented at state 5 through a component called TCPListen. The files received on this socket may be sent by the client and may be encrypted. FIG. 65 shows a Java implementation of the TCPListen component. In state 6, the received file may be decrypted, the TCP header and the hash value may be striped out, and the hash value may be calculated again by the server for comparison with the received value. FIG. 66 shows an XPSL specification of state 6. Java statements that are embedded within the XPSL specification may be used for simplification or for helping users of the experiments in verifying the output.

Similar to the client process, a loop may be placed between states 5 and 7. One purpose of this loop is to repeat the process of receiving SSL protected files from the client. Human intervention may not be needed. The loop may be indefinite until an empty file is received from the client, which may indicate a request for the end of the connection. It may not be necessary to implement the process of assembling large files at state 7 because the fragmentation process might not be implemented in the client process.

E. The Components Library

Preferably, the present invention uses CBSE. To run these experiments, a library that comprises all the necessary operations may be developed. The library may contain about 86 components and 24 data objects. All may be written in Java and may follow the object-oriented programming paradigm. Therefore, messages and data structures are preferably designed as objects that are passed to the components for processing. Moreover, objects that are shared by more than one protocol (e.g., error message) may be implemented as part of the component library for easier accessibility. Similarly, objects that are shared by more than one component may also be included as part of the component library (e.g., StringObject, BytesObject and TCP diagram). The interfaces and brief description of these components may be found in the Computer Program Listing Appendix.

Most of the components have been developed for the purpose of these experiments. However, some may wrap standard Java crypto functions or modified pieces of borrowed code. The component's interfaces and brief description may be provided in the Computer Program Listing Appendix, which lists all the components that are used by the three protocols: NSAP, TCP's 3-way handshake and SSL Handshake. The information there may also indicate whether the component is general, or specific to NSAP, TCP or SSL.

As an example, FIG. 67 shows an encryption component. This component takes as input three file names and an RSA public key. The first file name is for the file to be encrypted. The second file name is for the encrypted file. The third file name is for the public RSA key file name. This component uses the RSA public key to encrypt a generated 3DES shared key. The generated 3DES shared key may be used to encrypt the file. An objective is to send the encrypted file along with the encrypted key to the owner of the public RSA key. The owner of the RSA public key may use his private key to decrypt the 3DES shared key and the file.

V. Related Work

Related work in the area of communication protocols may be found in several research projects: x-kernel, Cactus, Ensemble and the Click router. The x-kernel is an operating system communication kernel designed to provide configurable communication services in which a communication protocol represents a unit of composition. The x-kernel architecture may be extendable. For example, Horus and Coyote are extensions and applications of the x-kernel architecture to the area of group communications. The present invention differs from these research works in that none of them has proposed high level protocol specifications so users may exchange and produce implementations automatically.

In security protocols, the Conduits+ framework has been used to implement IPsec. Cactus is another framework that may be used to implement a security system called SecCom. Conduits+ and SecComm differ from the present invention in two aspects. The first aspect is that the specification of the required configuration may be transmitted through the header information of the messages. In contrast, the specification of the present invention may be coded in a separate document so that it may be transmitted independently of the messages in a secure fashion. Second, the event-driven approach in Cactus to activate components at runtime may add a layer of delay to the system. In contrast, the sequence of operations in the present invention may be predetermined before runtime based on the specification of the protocol leading to the efficient execution of the selected components.

Protocol implementations may be derived automatically from abstract specifications in languages, such as SDL, Esterel, Estelle, LOTOS, Promela++, SMURPH and Cicero. However these languages follow a low level procedural programming paradigm. Therefore, protocol developers need to work out all the details of the operations of the protocols. Conversely, the present invention tends to capitalize on CBSE to produce a high level specification. Therefore, most of the details of the operations of a protocol are usually hidden inside the components.

Automatic Protocol Generation (APG) work produces protocol designs in an automated way. The APG process takes as input a set of requirements and produces a set of proposed protocol designs. Quite the opposite, unlike APG, the present invention may take a design (i.e., the output of the APG process) and may convert it into a specification used to automatically generate executable code for a protocol.

Cryptographic libraries implement security services as independent components. Examples of such libraries include IBM's CCA, RSA's Cryptokit, Microsoft's CryptoAPI, Sun's JCA/JCE, X/Open's GCS-API and Intel's CSSM-API. However, there is no high level and easy way for producing useful valid compositions out of these libraries. Resolving this issue, the present invention may add a layer of mechanisms that facilitate the generation of useful compositions out of these components.

UML is also used for the purpose of automatic code generation. The UML approach differs from the technique taught by the present invention in two aspects: 1) the present invention is simple because it may depend on FSMs, which provide a simpler graphical representation for protocols than UML diagrams, and 2) the present invention may use XSLT to generate code automatically from an XML-based specification, while UML code generation solutions tend to be proprietary and are based on UML graphical representations. It should be noted that XML Metadata Interchange (XMI) may be used as a model interchange format for UMI, but it is not part of the code generation process.

Related work that includes the use of XML to produce program code, such as Libxml2, may also be found. In such works, an instrument designer produces an XML document that describes the instrument's services. This XML document may be used to produce a user information document in HTML format and source code for the instrument embedded services. Generally, the XML description is just a listing of the services, where each service may be associated with a piece of C code that is loaded from a library by an XSLT transformer.

The present invention distinctly contrasts such works by extending such works to the area of protocol implementations in conjunction with the use of CBSE. The XML specification in the present invention may be based on FSMs to provide a detailed description of the flow of control, handling of data objects and the set of operations.

FSMs have also been used to generate code for protocols. For example, a C++ code skeleton for the flow of control of the protocol may be generated directly out of the FSM diagrams. The present invention is distinguishable from this technique in that the present invention may encode FSMs in XML, allowing for automatic code generation in any programming language.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching without departing from the scope of this invention and its broader aspects. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may be used in search engines, databases and docket systems. Additionally, the present invention may also be used in banks, stock trades, manufacturing of vehicles (e.g., cars, planes, boats, etc.), production plants (e.g., paper mills, oil, etc.), human resources, payroll, etc.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A non-transitory tangible computer readable medium comprising a program of instructions when executed by one or more processors, implements a method of managing protocols, said instructions comprise:

a) agreeing upon at least one protocol specification including:

i) sending at least one protocol proposal from a first communicating party to a second communicating party;

ii) selecting said at least one protocol specification from said at least one protocol proposal at said second communicating party; and iii) notifying said first communicating party of said selection;

b) identifying at least one component required to implement said at least one protocol specification;

c) communicating between said parties at least by exchanging at least one of the following:

i) at least one of said at least one component when said at least one of said at least one component is a missing component; and ii) at least one of said at least one protocol specification; and d) generating at least one machine executable code using:

i) said at least one protocol specification; and ii) said at least one component.

2. A tangible computer readable medium according to claim 1, wherein said instructions further include storing:

a) said at least one protocol specification; and b) said at least one component.

3. A tangible computer readable medium according to claim 1, wherein said instructions further include the step of protecting said method of managing protocols using at least one security measure.

4. A tangible computer readable medium according to claim 1, wherein the agreeing comprises a manual process.

5. A tangible computer readable medium according to claim 1, wherein the agreeing comprises an automatic process.

6. A tangible computer readable medium according to claim 5, wherein the automatic process utilizes a secure channel.

7. A tangible computer readable medium according to claim 5, wherein the automatic process utilizes a customized version of the Internet Security Association and Key Management Protocol (ISAKMP).

8. A tangible computer readable medium according to claim 7, wherein said at least one protocol specification using said customized version of ISAKMP is a bootstrap of said method.

9. A tangible computer readable medium according to claim 1, wherein said communicating includes at least one of the following:

a) retrieving; and b) distributing.

10. A tangible computer readable medium according to claim 1, wherein said communicating includes using at least one directory service.

11. A tangible computer readable medium according to claim 1, wherein said communicating includes distributing at least one digitally signed protocol specification.

12. A tangible computer readable medium according to claim 1, wherein said communicating includes distributing at least one digitally signed component referenced in a protocol specification.

13. A tangible computer readable medium according to claim 1, wherein said communicating includes retrieving said at least one protocol specification from a local cache.

14. A tangible computer readable medium according to claim 1, wherein the generating further includes producing code that implements at least one of said at least one protocol specification automatically using:

a) XML-related technologies, wherein said XML-related technologies include XML schema, XSLT transformations, XSLT processors, XML parsers, and XML editors; and b) a multitude of components referenced in said at least one protocol specification.

15. A tangible computer readable medium according to claim 1, wherein said method uses Component-based Software Engineering to build at least one of said at least one component.

16. A tangible computer readable medium according to claim 1, wherein a single XSLT stylesheet is associated with a single programming language, said XSLT stylesheet capable of generating at least one of said at least one executable code for at least one of said at least one protocol specification, said at least one of said at least one executable code is an implementation of at least one of said at least one protocol specification.

17. A tangible computer readable medium according to 1, wherein said generating further includes communicating at least one of said at least one executable code associated with at least one of said at least one protocol specification from a local cache.

18. A tangible computer readable medium according to 1, further including executing said executable code.

19. A tangible computer readable medium according to 18, wherein said executing includes at least one of the following:

a) delivering requests and feedback; and b) managing internal affairs.

20. A tangible computer readable medium according to claim 1, wherein at least one of said at least one protocol specification includes at least one XML protocol specification.

21. A tangible computer readable medium according to claim 1, wherein at least one of said at least one protocol specification includes a description of a protocol specification language specified in an XML schema.

* * * * *